(12) United States Patent
Nagata

(10) Patent No.: US 11,977,266 B2
(45) Date of Patent: May 7, 2024

(54) LIGHT DETECTION UNIT

(71) Applicant: Keyence Corporation, Osaka (JP)

(72) Inventor: Akinori Nagata, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 651 days.

(21) Appl. No.: 17/128,279

(22) Filed: Dec. 21, 2020

(65) Prior Publication Data

US 2021/0239833 A1 Aug. 5, 2021

(30) Foreign Application Priority Data

Jan. 30, 2020 (JP) ................................. 2020-014010
Jul. 29, 2020 (JP) ................................. 2020-128056

(51) Int. Cl.
G02B 6/42 (2006.01)
G01S 7/481 (2006.01)
G01S 17/04 (2020.01)

(52) U.S. Cl.
CPC .......... *G02B 6/4286* (2013.01); *G01S 7/4812* (2013.01); *G01S 17/04* (2020.01); *G02B 6/4225* (2013.01)

(58) Field of Classification Search
CPC ... G02B 6/4225; G02B 6/4286; G01S 7/4812; G01S 7/4818; G01S 17/04; G01V 8/16; G01V 8/24
See application file for complete search history.

(56) References Cited

U.S. PATENT DOCUMENTS

| 5,414,786 | A  | * | 5/1995  | Ohta    | G02B 6/30 385/63    |
| 7,164,814 | B2 | * | 1/2007  | Ohtsu   | G02B 6/138 385/129  |
| 7,295,743 | B2 | * | 11/2007 | Yatsuda | G02B 6/3644 385/59  |
| 8,554,041 | B2 | * | 10/2013 | Mune    | G02B 6/3897 385/72  |
| 8,724,937 | B2 | * | 5/2014  | Barwicz | G02B 6/30 385/14    |
| 8,845,208 | B2 | * | 9/2014  | Tsujita | G02B 6/389 385/59   |
| 10,203,462 | B2 |   | 2/2019  | Makino et al. |               |
| 2018/0284375 | A1 | * | 10/2018 | Makino  | G01V 8/10         |

FOREIGN PATENT DOCUMENTS

| JP | 2006351380 A | 12/2006 |
| JP | 4177178 B2   | 11/2008 |
| JP | 201961885 A  | 4/2019  |

* cited by examiner

*Primary Examiner* — Daniel Petkovsek
(74) *Attorney, Agent, or Firm* — Kilyk & Bowersox, P.L.L.C.

(57) ABSTRACT

An optical waveguide of a light detection unit is allowed to pass through a thin space or to be installed in the thin space. A light detection unit includes: optical waveguides that are formed in a sheet shape, which is wide in the horizontal direction, and have cores and claddings, respectively, the cores and the claddings being provided in layers in the vertical direction; and sheet-shaped cover members that cover the claddings of the optical waveguides and are integrally formed with the optical waveguides.

19 Claims, 40 Drawing Sheets

LIGHT DETECTION UNIT

CROSS-REFERENCE TO RELATED APPLICATIONS

The present application claims foreign priority based on Japanese Patent Application No. 2020-014010, filed Jan. 30, 2020, and No. 2020-128056, filed Jul. 29, 2020, the contents of which are incorporated herein by references.

BACKGROUND OF THE INVENTION

1. Field of the Invention

The present invention relates to a light detection unit connected to an optical sensor having a light emitting element and a light receiving element.

2. Description of Related Art

Conventionally, there is known a light detection unit which includes a light emitting element that generates detection light to irradiate a detection area and a light receiving element that receives the detection light from the detection area and is configured to compare a light reception signal generated by the light receiving element with a threshold to output a signal related to the presence or absence of an article as a result of the comparison (see, for example, Japanese Patent No. 4177178).

When light detection is performed using such a type of light detection unit, a light detection unit, which has an optical fiber on a light emitting side connected to the light emitting element and an optical fiber on a light reception side connected to the light receiving element, is generally used.

The optical fiber constituting the light detection unit of Japanese Patent No. 4177178 is configured using a bundled optical fiber in which a plurality of optical fiber lines are bundled.

Meanwhile, in the case of the bundled optical fiber in which the plurality of optical fiber lines are bundled as in the optical fiber of Japanese Patent No. 4177178, due to its structure, it is unavoidable that an outer diameter of the optical fiber is several times or more a line diameter of the optical fiber line constituting the optical fiber.

However, the optical fiber of the light detection unit passes through a place where, for example, a portion between parts is narrow and only a thin space can be ensured or is desirably installed in such a thin space in some cases. It is difficult for the bundled optical fiber of Japanese Patent No. 4177178 to handle these cases due to a large outer diameter.

SUMMARY OF THE INVENTION

The present invention has been made in view of this point, and an object thereof is to enable an optical waveguide of a light detection unit to pass through a thin space or to be installed in the thin space.

In order to achieve the above object, according to one embodiment of the invention, a premise is a light detection unit connected to an optical sensor including: a light emitting element that projects detection light toward a detection area; a light receiving element that receives the detection light from the detection area; and a signal generation unit that compares a light reception signal generated by the light receiving element with a threshold and generates a detection signal indicating a comparison result.

The light detection unit includes an optical waveguide and a cover member. The optical waveguide is a member that guides light between a first end and a second end, has a sheet shape which is wide in a horizontal direction, has a core and a cladding surrounding the core, and projects light to the detection area or receives light from the detection area, the core and the cladding being provided in layers in a vertical direction, the first end connected to a light projection connecting section or a light reception connecting section so as to be optically coupled to the light emitting element or the light receiving element of the optical sensor, the second end being used as a light projecting end or a light receiving end. The cover member is a sheet-shaped member that covers the cladding in the vicinity of the second end of the optical waveguide or between the first end and the second end and is integrally formed with the optical waveguide.

According to this configuration, since the optical waveguide forms the sheet which is wide in the horizontal direction and has the core and the cladding provided in layers in the vertical direction, it is possible to ensure the amount of light of the optical waveguide while making the optical waveguide thin. Since the cladding in the vicinity of the light projecting end or the light receiving end of this optical waveguide or between the light projecting end and the light receiving end is covered by the sheet-shaped cover member, the cover member can be used as an installation surface for an attachment target. For example, it is possible to fix the vicinity of the light projecting end or the light receiving end of the optical waveguide to the attachment target or to fix a portion between the light projecting end and the light receiving end to the attachment target. Accordingly, the thin optical waveguide can be easily installed on the attachment target. The cover member can also be used as the installation surface for the attachment target.

According to another embodiment of the invention, the cover member can be configured as a member that has a light-shielding property that shields light emitted from the light emitting element and shields the optical waveguide at a portion other than the light projecting end or the light receiving end in the vicinity of the second end of the optical waveguide.

According to still another embodiment of the invention, the cover member can be configured as a member that covers both main surfaces of the optical waveguide and both side surfaces of the optical waveguide.

According to still another embodiment of the invention, the cover member can be configured as a member that covers both main surface and both side surfaces of an intermediate portion between the first end and the second end of the optical waveguide. The cover member may be a member that covers only both the main surfaces of the optical waveguide.

That is, the core and the cladding that constitute the optical waveguide have different light refractive indexes. Light passing through the core typically travels while being totally reflected at an interface between the core and the cladding, but the light sometimes leaks to the outside, for example, if the optical waveguide is bent, and this light leakage can be suppressed by the cover member.

For example, the cover member can be made of a material having a light-shielding property with respect to light having a wavelength emitted from the light emitting element. Since the portion other than the light projecting end or the light receiving end is shielded from light by the cover member in the vicinity of the light projecting end or the light receiving end of the optical waveguide, the leakage of light from the optical waveguide can be suppressed, and the detection accuracy can be improved.

The cover member can be also provided so as to cover the portion between the first end and the second end of the optical waveguide, that is, the intermediate portion of the optical waveguide. As a result, when the optical waveguide is bent and arranged, for example, the light leakage from the cladding can be suppressed by the cover member.

The cover member can be also provided so as to shield light from the optical waveguide in a portion other than a connection end to the light projection connecting section or the light reception connecting section in the vicinity of the first end of the optical waveguide. In addition, the cover member can be also provided so as to cover a distal end portion of the optical waveguide that faces a traveling direction of light.

According to still another embodiment of the invention, the cover member can be formed like a tape or a sheet having an adhesive layer.

According to this configuration, the cover member can be easily integrated with the optical waveguide by attaching the adhesive layer of the cover member to an outer surface of the cladding of the optical waveguide. The cover member may be, for example, an adhesive tape or an adhesive sheet. The material of the cover member is not particularly limited, and examples thereof can include polyimide, and black-printed polyimide can be used. In addition, when the cover member is integrated with the optical waveguide, the rigidity is enhanced as compared with the optical waveguide alone, and the handleability is improved as compared with the case of handling the optical waveguide alone.

According to still another embodiment of the invention, the optical waveguide includes a light projection optical waveguide which is connected to the light projection connecting section of the optical sensor and projects light to the detection area with the second end as the light projecting end and a light reception optical waveguide which is connected to the light reception connecting section of the optical sensor and receives light from the detection area with the second end as the light receiving end. In this case, the cover member can be integrally formed with the light projection optical waveguide and the light reception optical waveguide.

According to this configuration, the light projection optical waveguide and the light reception optical waveguide can be integrated by a cover member. As a result, workability is improved when the light projection optical waveguide and the light reception optical waveguide pass through the same path or are installed in the same installation target.

According to still another embodiment of the invention, the cover member is a member capable of integrating the light projection optical waveguide and the light reception optical waveguide in a state of being separated from each other in a width direction. In this case, a portion between the light projection optical waveguide and the light reception optical waveguide can be fixed to the installation target by a member such as a screw.

According to still another embodiment of the invention, an insertion hole through which a fixing member used when installing the installation target is inserted can be formed in a portion of the cover member corresponding to the portion between the light projection optical waveguide and the light reception optical waveguide.

According to this configuration, since the light projection optical waveguide and the light reception optical waveguide are separated in the width direction in the state where the light projection optical waveguide and the light reception optical waveguide are integrated by the cover member, the insertion hole can be formed so as to pass between the light projection optical waveguide and the light reception optical waveguide. The fixing member can be inserted through this insertion hole for fixing to the installation target. The fixing member may be a fastening member such as a screw and a bolt, or a member such as a clip and a fastener.

According to still another embodiment of the invention, a light extraction member, which is provided to extend from the second end of the light projection optical waveguide to the second end of the light reception optical waveguide and includes a light emitting section that is optically coupled to the second end of the light projection optical waveguide and emits light from a main surface side of the light projection optical waveguide to the detection area and a light incident section that is optically coupled to the second end of the light reception optical waveguide and receives light from a main surface side of the light reception optical waveguide, may be provided. The light extraction member can be configured using a member similar to an optical light guide path.

According to this configuration, the light extraction member is provided to extend from the second end of the light projection optical waveguide to the second end of the light reception optical waveguide. Light from the light projection optical waveguide is emitted from the light emitting section of the light extraction member to the detection area. The light from the detection area enters from the light incident section of the light extraction member and travels through the light reception optical waveguide. Therefore, the light extraction member changes the traveling direction of the light such that the light can be emitted from the main surface and received from the main surface. That is, it is possible to project light in a thickness direction of the optical waveguide and receive light from the thickness direction.

According to still another embodiment of the invention, the optical waveguide has a plurality of the cores arrayed in the horizontal direction, and the light extraction member can be configured to have a single core that is optically coupled to the plurality of cores.

According to this configuration, the amount of light can be increased since there are the plurality of cores of the optical waveguide, and further, the optical waveguide can be made thin since the cores are arrayed in the horizontal direction. In addition, since the light extraction member is configured to have the single core, the light extraction member can be easily manufactured. Note that a cladding that covers the core of the light extraction member may be provided.

According to still another embodiment of the invention, the cover member may be provided with a through-hole for fixing to the attachment target.

According to this configuration, the optical waveguide can be arranged at a predetermined position by fixing the through-hole of the cover member to the attachment target. The through-hole can be fixed to the attachment target by a fastening member, a clip, a fastener, a binding band, or the like.

The cover member may be a member that has a laminated structure having a first cover member that covers the cladding and a second cover member that covers the first cover member, the first cover member covering a main surface of the cladding, the second cover member covering a main surface of the first cover member and both the side surfaces of the optical waveguide.

A reinforcing plate, which has a higher rigidity than the optical waveguide, may be further provided on the main surface in the vicinity of the second end of the optical waveguide.

The sheet-shaped cover member may be provided on the main surface in the vicinity of the second end of the optical waveguide, and a reinforcing plate having a higher rigidity than the optical waveguide may be further provided on a main surface of the sheet-shaped cover member.

The sheet-shaped cover member may be black in appearance, and the light detection unit having the optical waveguide covered by the sheet-shaped cover member may have a sheet shape.

An end that projects light to the detection area from the optical waveguide or receives light from the detection area may be any of a main surface, a side surface close to the second end, or a horizontal side surface of the optical waveguide.

A connecting portion of the light detection unit with respect to the light projection connecting section or the light reception connecting section of the optical sensor may be an optical fiber optically coupled to the optical waveguide or the optical waveguide.

The light detection unit may be a definite reflective light detection unit.

The reinforcing version may have a through-hole, and the through-hole of the reinforcing version may communicate with a through-hole of the sheet-shaped cover member.

An indicating lamp that extracts light passing through the core of the optical waveguide to the outside may be provided between the first end and the second end of the optical waveguide on the light projection side or the light reception side.

As described above, since the optical waveguide in which the core and the cladding are provided in layers in the vertical direction has the sheet shape which is wide in the horizontal direction, it is possible to enable the optical waveguide to pass through the thin space or to be installed in the thin space while ensuring the amount of light of the optical waveguide. Since the cover member that covers the cladding in the vicinity of the light projecting end or the light receiving end of the optical waveguide can be used as the installation surface, the thin optical waveguide can be easily installed on the attachment target.

DETAILED DESCRIPTION OF PREFERRED EMBODIMENTS

Hereinafter, an embodiment of an aspect will be described in detail with reference to the drawings. Note that the following preferred embodiment is described merely as examples in essence, and there is no intention to limit the aspect, its application, or its use.

Figure 1:
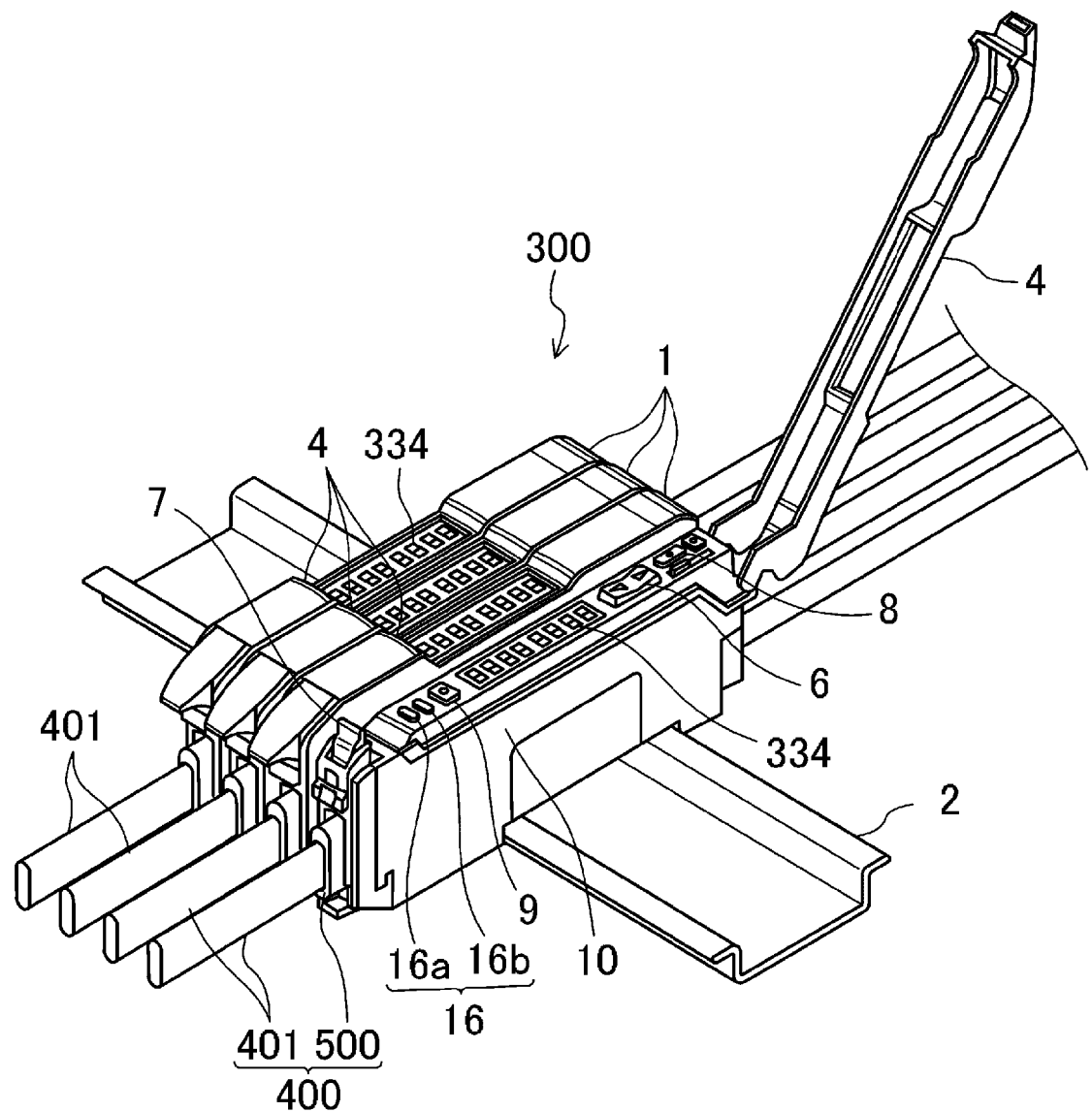
FIG. 1 is a perspective view illustrating a use state of an optical sensor to which a light detection unit according to an embodiment of an aspect is connected.

FIG. 1 is a perspective view illustrating a use state of an optical sensor 1 to which a light detection unit 400 according to an embodiment of the aspect is connected. An optical detection device 300 is constituted by the light detection unit 400 and the optical sensor 1. FIG. 1 is a perspective view of the optical detection device 300 as viewed from diagonally above, illustrates an example in which four optical detection devices 300 are installed to be adjacent to each other on a DIN rail 2, and one optical detection device 300 among them is illustrated with a top lid 4 open.

One of the plurality of the optical detection devices 300 adjacently installed on the DIN rail 2 is a master device, and the others are slave devices. For example, when light projection of the master device is completed, a signal for starting light projection is supplied from the master device to a first slave device, and the light projection of the first slave device is executed. When the light projection of the first slave device is completed, a signal for starting light projection is supplied from the first slave device to a second slave device, and the light projection of the second slave device is executed. Thereafter, light projections of the third and fourth slave devices are sequentially started.

Note that a use example illustrated in FIG. 1 is an example, and only the single optical detection device 300 can be used, and the optical detection device 300 can also be fixed to a member other than the DIN rail 2 and used.

(Configuration of Optical Sensor 1)

Figure 2:
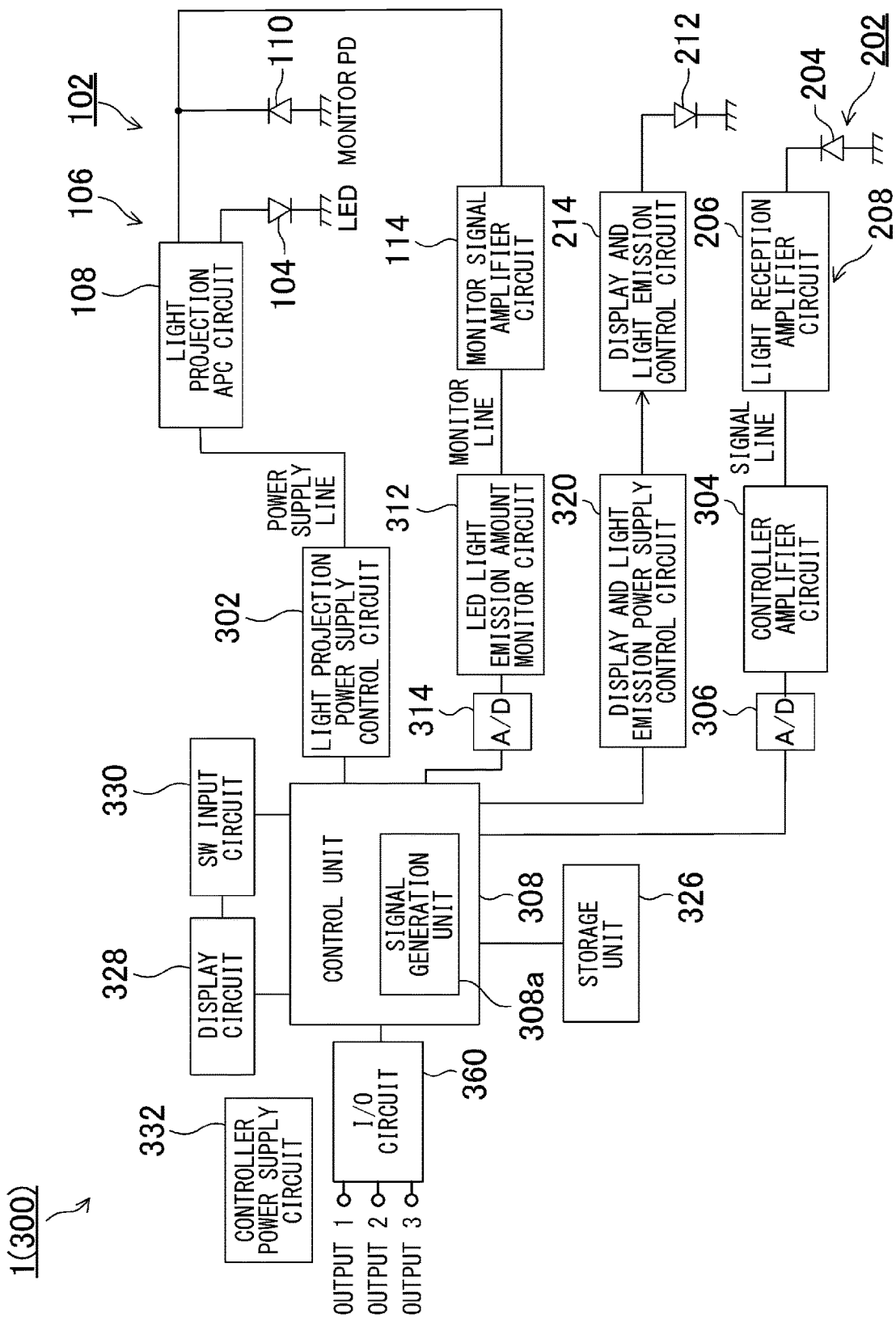
FIG. 2 is a block diagram of an optical sensor.

As illustrated in a block diagram of the optical detection device 300 in FIG. 2, the optical sensor 1 constituting the optical detection device 300 includes a light projecting unit 102 and a light receiving unit 202. The light projecting unit 102 outputs a predetermined pulsed light to the light detection unit 400. A light emitting element 104 of the light projecting unit 102 is driven by an oscillating pulse supplied from a light projection power supply control circuit 302 to emit the pulsed light. Meanwhile, light received by the light receiving unit 202 is photoelectrically converted by a light receiving element 204 and is sent to a control unit 308 via a light receiving element amplifier circuit 206, an amplifier circuit 304, and an A/D converter 306. As a result, detection synchronized with the pulsed light is performed, and a detection signal is further converted into a DC signal or the like, and then, is output as an ON/OFF signal indicating a detection result from an I/O circuit 360 constituting an interface unit.

The optical sensor 1 includes a light projection circuit 106 configured to drive the light emitting element 104. The light emitting element 104 is a member configured to project detection light toward a detection area, and a typical example of the light emitting element 104 is a light emitting diode (LED) but is not limited thereto.

The light projection circuit 106 includes a light projection APC circuit 108 and a monitor light receiving element 110 such as a monitor PD. The light projection APC circuit 108 performs control such that an output, that is, the amount of light emission of the light emitting element 104 is a predetermined value. The monitor light receiving element 110 of the light projecting unit 102 is connected to a monitor signal amplifier circuit 114, and transmits the amount of light reception to an LED light emission amount monitor circuit 312 via a monitor line. The LED light emission amount monitor circuit 312 supplies a light reception amount signal converted into a digital signal to the control unit 308 via the A/D converter 314. The control unit 308 controls the light projection power supply control circuit 302 such that the light emission amount becomes the predetermined value based on the light emission amount detected by the monitor light receiving element 110, and performs feedback control to adjust the amount of current in the light projection APC circuit 108 and to drive the light emitting element 104.

The optical sensor 1 includes a light reception circuit 208 configured to drive the light receiving element 204. The light receiving element 204 is a member that receives detection light from a detection area, and is connected to the light receiving element amplifier circuit 206. The amount of light received by the light receiving element 204 is amplified by the light receiving element amplifier circuit 206 and sent to the amplifier circuit 304, and then, is amplified by the controller amplifier circuit 304. An analog signal amplified by the controller amplifier circuit 304 is converted into a digital signal via the A/D converter 306 and input to a signal generation unit 308a of the control unit 308. The signal generation unit 308a detects the light reception amount of the light receiving element (photodiode PD) 204 and compares a light reception signal generated by the light receiving element 204 with a predetermined threshold to generate a detection signal indicating a comparison result. The detection signal generated by the signal generation unit 308a is finally output from the I/O circuit 360.

The control unit 308 is connected with a storage unit 326 configured to store various set values and the like, a display circuit 328 configured to display information on the optical sensor 1 side, a switch input circuit 330 to which operation buttons 6 and 8 (illustrated in FIG. 1) as user interfaces configured to receive set value adjustment are connected, and the I/O circuit 360 that performs input/output with the outside, and the like, and these circuits are driven by the controller power supply circuit 332.

Note that the control unit 308 can be configured using, for example, an IC such as a central processing unit, an FPGA, and an ASIC. Each of the various circuits (reference signs 108, 114, 206, 214, 302, 304, 306, 312, 314, 320, 328, 330, 332, and 360) may be configured using the IC. Each of the various circuits may be configured using one IC, or the control unit 308 and each of the various circuits may be configured using one IC.

As illustrated in FIG. 1, a display unit 334 is provided on an upper surface of a housing 10 of the optical sensor 1. Although the side located above in the use state illustrated in FIG. 1 is referred to as "up" in this description, this is only defined for convenience of the description, and the optical sensor 1 may be installed with any surface facing up.

The display unit 334 is configured using, for example, an organic EL display, a flat display, or the like, and is controlled by the display circuit 328 illustrated in FIG. 2. The display unit 334 may be a segment display as illustrated in FIG. 1. A detection value (light reception amount), a threshold, and the like are displayed using the display unit 334. The display unit 334 may be configured using seven segment displays arranged side by side.

As illustrated in FIG. 1, operation buttons such as the up/down button 6, the mode button 8, and a set button 9 are arranged to be adjacent to the display unit 334 on an upper surface of the housing 10 of the optical sensor 1. The optical sensor 1 has two channels for output, but is not limited thereto. Reference sign 16 indicates an operation indicating lamp configured to display a current output or detection state, reference sign 16a indicates an operation indicating lamp of a first channel, and reference sign 16b indicates an operation indicating lamp of a second channel.

As the above buttons 6, 8, and 9, and the like are operated, it is possible to perform switch between a non-conversion display mode for directly displaying the detection value (light reception amount) and the threshold and a conversion display mode for displaying a display detection value (display light reception amount) and a display threshold converted with a display conversion rate or a display conversion formula, sensitivity setting, threshold setting, and the like. Note that that a display target, a display mode, a display switching operation, and display mode switching of the optical sensor 1 are described in detail in JP 2006-351380 A and JP-2019-61885 A, and thus, the description thereof will be omitted by referring to JP 2006-351380 A and JP 2019-61885 A.

Figure 3:
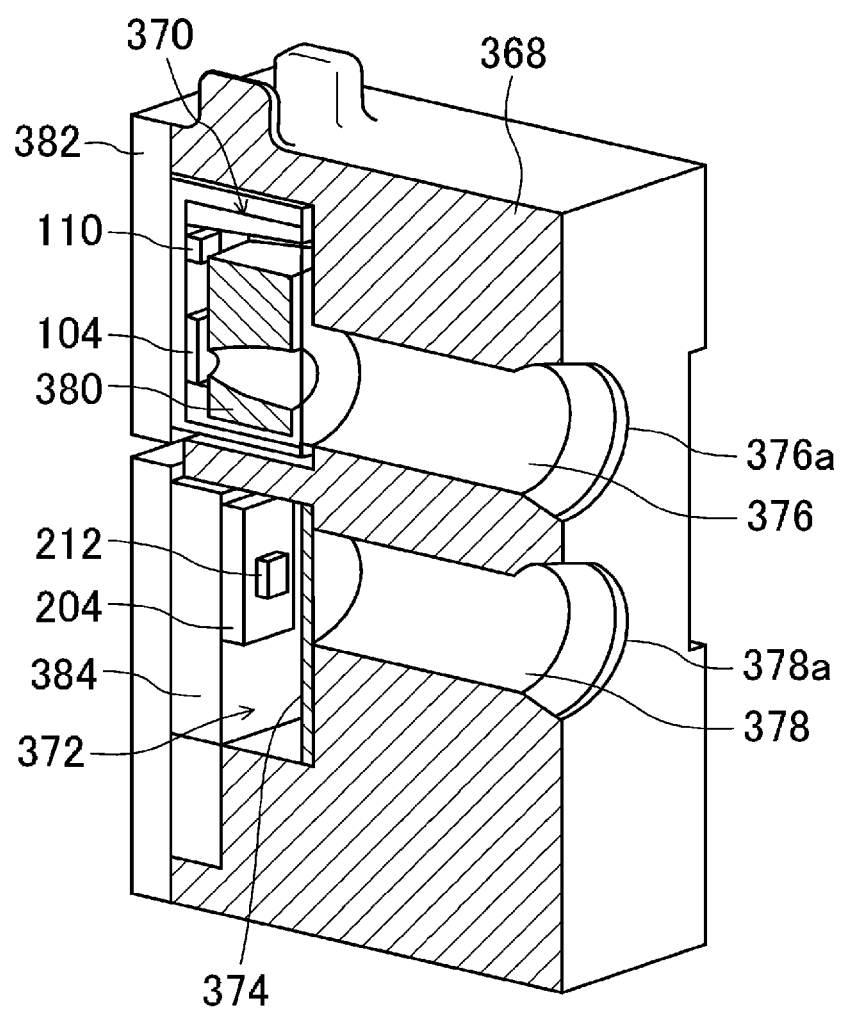
FIG. 3 is a vertical cross-sectional perspective view for describing an element holder and a member held by the element holder.

An element holder 368 as illustrated in FIG. 3 is provided inside the housing 10 of the optical sensor 1. The element holder 368 is a member that holds the light emitting element 104 and the light receiving element 204. A light projecting member 370 and a light receiving member 372 are accommodated in the element holder 368. The light projecting member 370 is a member that substantially constitutes the above-mentioned light projecting unit 102, and includes the light emitting element 104, the monitor light receiving element 110, and a reflector 380. The light receiving member 372 is a member that substantially constitutes the above-mentioned light receiving unit 202, and includes the light receiving element 204 and an LED 212 as an optical display and light emitting element. In this mode, the light emitting element 104 and the light receiving element 204 are arrayed in the up-down direction, and specifically, the light emitting element 104 is located above the light receiving element 204. However, the light receiving element 204 may be located above the light emitting element 104, or the light emitting element 104 and the light receiving element 204 may be arrayed in the left-right direction (horizontal direction).

The element holder 368 has a light projection hole 376 and a light reception hole 378 to which the light detection unit 400 is connected. The light projection hole 376 and the light reception hole 378 are configured as through-holes each having a circular cross section, and are formed so as to penetrate through the element holder 368. The light projection hole 376 forms a light projection connecting section configured for optical coupling with the light emitting element 104 by direct or indirect connection with a light projection optical waveguide 410 (illustrated in FIG. 4) provided in the light detection unit 400. In addition, the light reception hole 378 forms a light reception connecting section configured for optical coupling with the light receiving element 204 by direct or indirect connection with a light reception optical waveguide 420 provided in the light detection unit 400. Specific configurations of the light projection optical waveguide 410 and the light reception optical waveguide 420 will be described later.

That is, ends of the light projection hole 376 and the light reception hole 378 respectively have a first insertion port 376a and a second insertion port 378a that are open to an outer surface of the element holder 368, respectively. The light emitting element 104 is arranged at the back side of the light projection hole 376. The light emitting element 104 is mounted on a light projection mounting substrate 382. A position of the light emitting element 104 is set such that a center of a light emitting surface of the light emitting element 104 is located on an extension line of a center line of the light projection hole 376.

The light receiving element 204 is arranged at the back side of the light reception hole 378. The light receiving element 204 is mounted on a light reception mounting substrate 384. A position of the light receiving element 204 is set such that a center of a light receiving surface of the light receiving element 204 is located on an extension line of a center line of the light reception hole 378. A space in which the light emitting element 104 is arranged and a space in which the light receiving element 204 is arranged are optically isolated. A glass plate 374, which is a light-transmissive member, is interposed between the light receiving element 204 and an end on the back side of the light reception hole 378.

(Clamping Mechanism)

The optical sensor 1 has a clamping mechanism configured to clamp the light detection unit 400 in a connection state. The clamping mechanism is provided inside the housing 10, and is configured to be capable of sandwiching portions of the light detection unit 400 inserted into the light projection hole 376 and the light reception hole 378 (details will be described later) in the radial direction of the holes 376 and 378. When the portions of the light detection unit 400 inserted into the light projection hole 376 and the light reception hole 378 are clamped by the clamping mechanism, the inserted portions are prevented from coming off from the light projection hole 376 and the light reception hole 378.

Meanwhile, an operation lever 7 configured to operate the clamping mechanism from the outside is provided on the outside of the housing 10 as illustrated in FIG. 1. As the operation lever 7 is moved in a predetermined direction, the clamping mechanism can be set to a clamping state. As the operation lever 7 is moved in a direction opposite to the predetermined direction, the clamping mechanism can be set to an unclamping state.

The configurations of the clamping mechanism and the operation lever 7 are not limited to the above-mentioned configurations, and any configuration that enables the clamping of the portions of the light detection unit 400 inserted into the light projection hole 376 and the light reception hole 378 may be adopted.

(Overall Configuration of Light Detection Unit 400)

Figure 4:
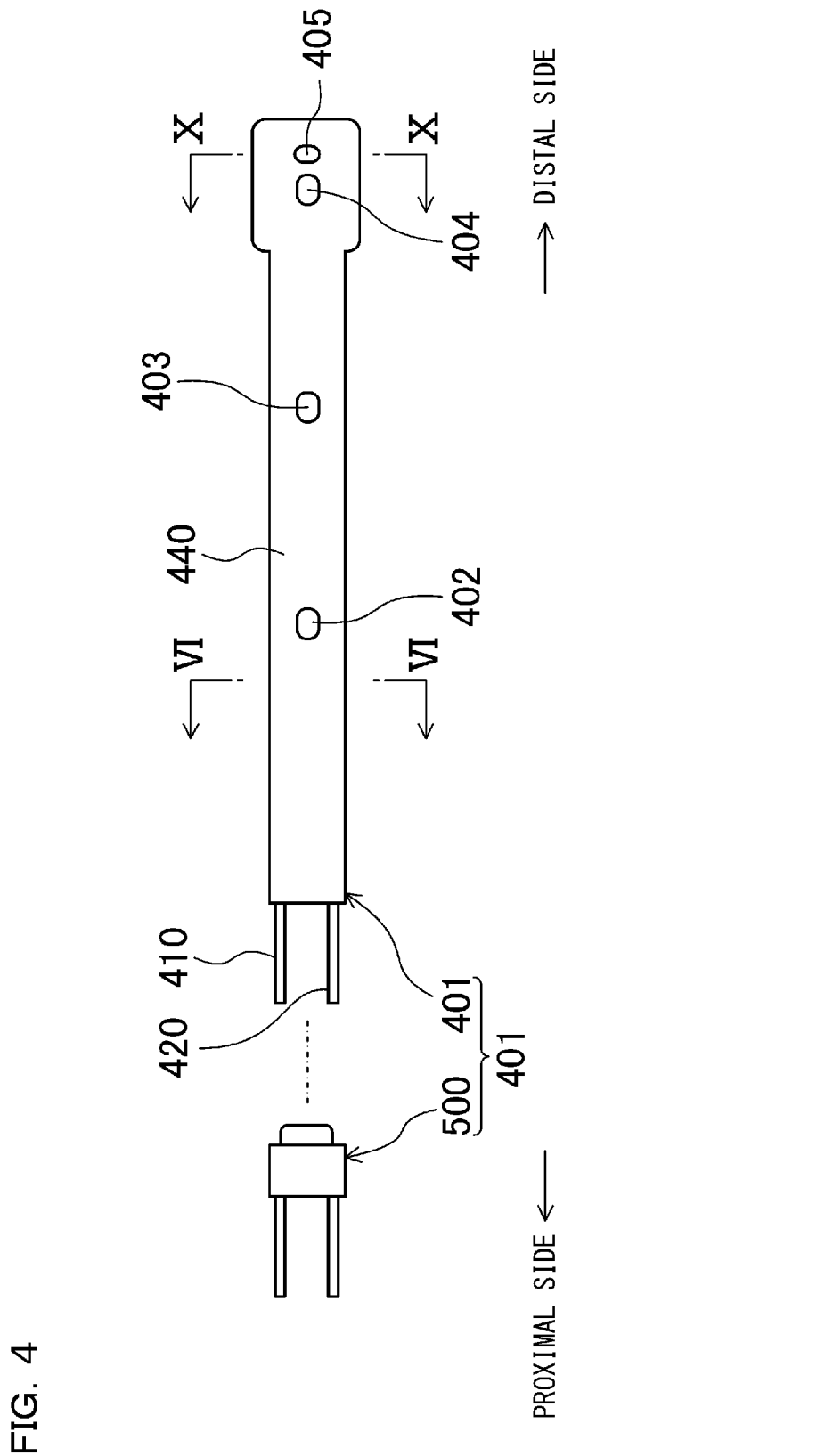
FIG. 4 is a plan view illustrating a state where a light guide section and a connector section of the light detection unit are separated.

As an example illustrated in FIG. 4, the light detection unit 400 is a unit that includes a light guide section 401 and a connector section 500 and enables detection of a workpiece WK (illustrated in FIG. 10) by definite reflection (it may be called limited or convergent reflection). The connector section 500 will be described later.

Here, a sensor that detects the workpiece WK by definite reflection is a sensor that emits light for detection by limiting a detection area of an object and receives the reflected light reflected by the workpiece WK in the detection area by a light receiving unit to detect whether or not the workpiece WK exists at a predetermined position.

Although details will be described later, the light detection unit 400 is provided with first to fourth insertion holes 402 to 405 through which fixing members such as a screw are inserted.

Figure 5:
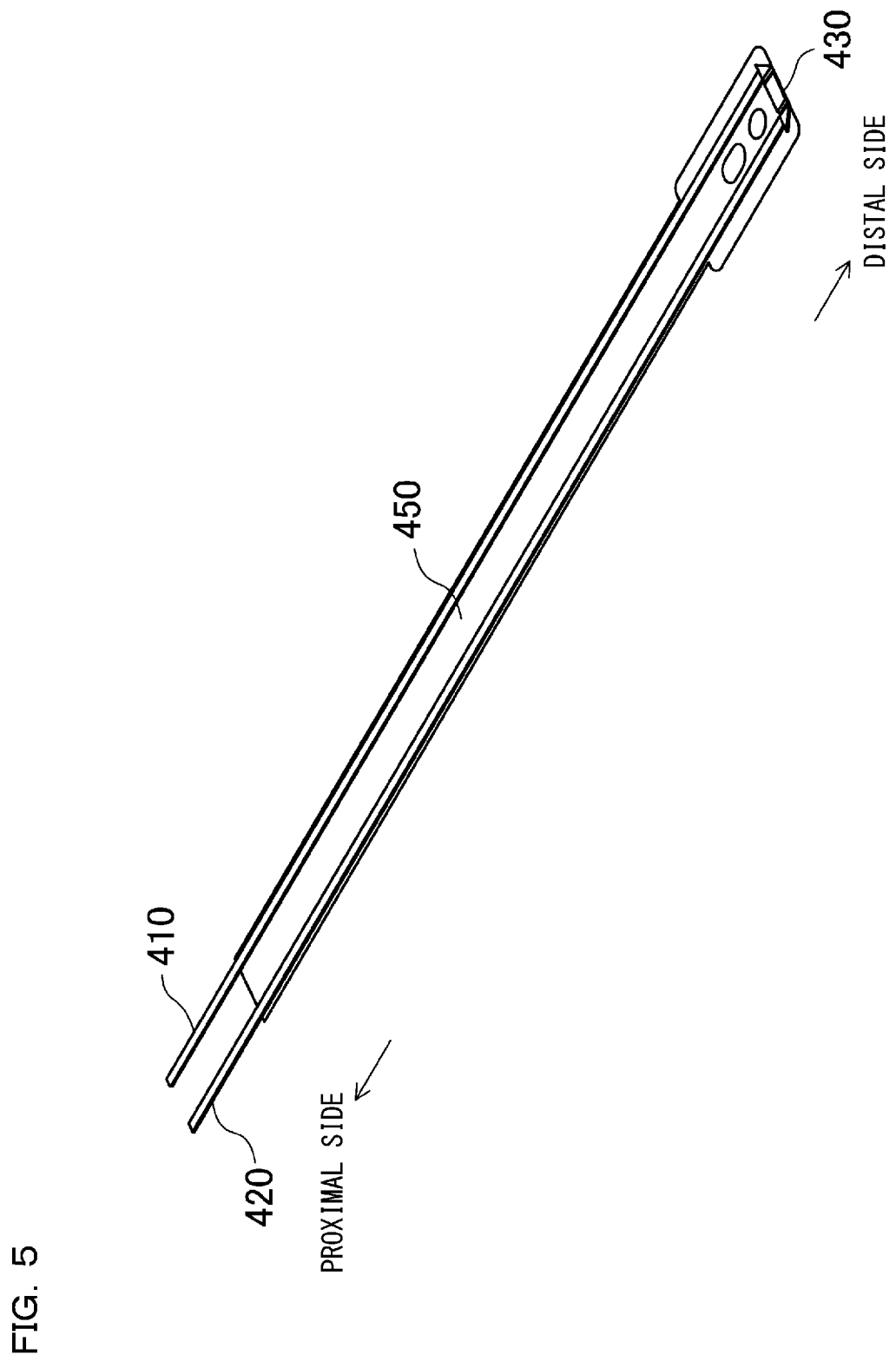
FIG. 5 is a perspective view in which an upper cover member of the light guide section of the light detection unit is omitted.
Figure 6:
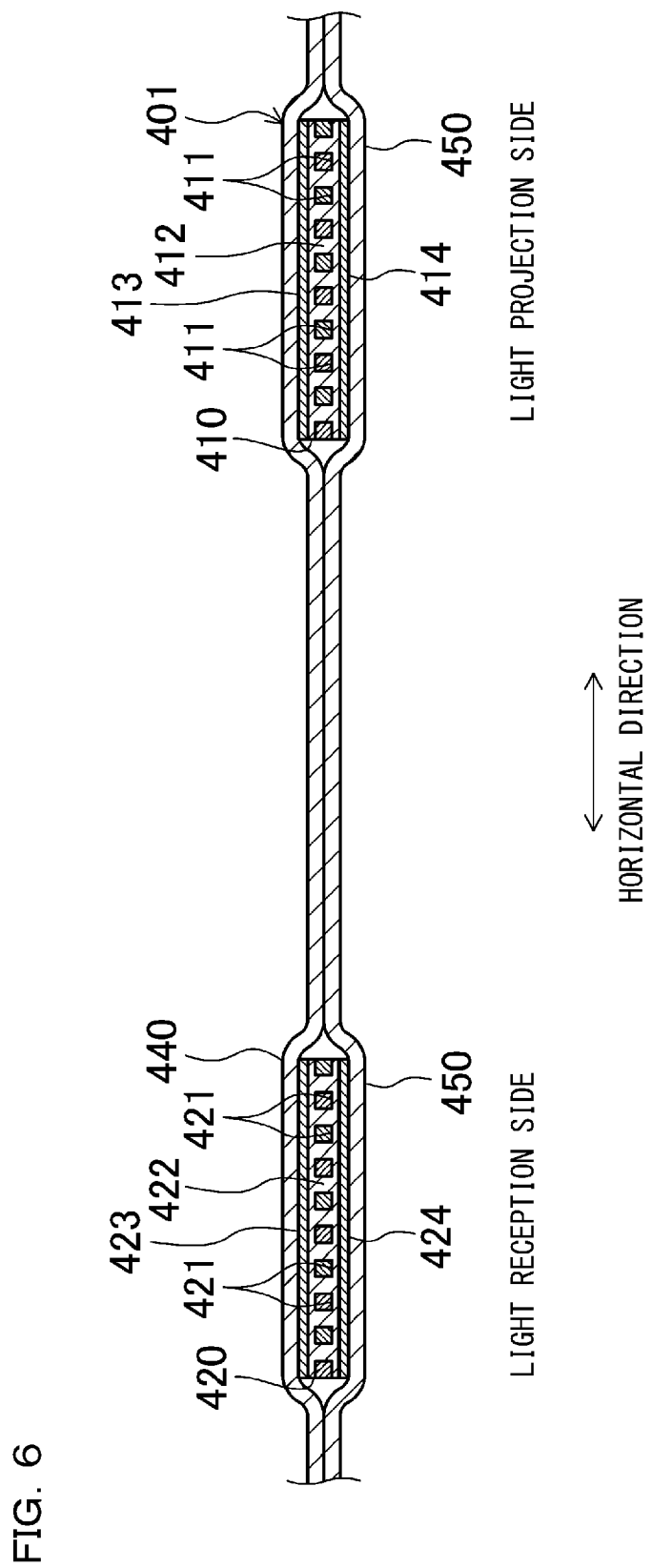
FIG. 6 is a cross-sectional view taken along line VI-VI in FIG. 4.

As illustrated in FIGS. 5 and 6, the light guide section 401 includes the light projection optical waveguide 410, the light reception optical waveguide 420, a light extraction member 430, an upper cover member 440, and a lower cover member 450. Note that a distal side and a proximal side of the light detection unit 400 are defined as illustrated in FIGS. 4 and 5. The proximal side of the light detection unit 400 is the side connected to the optical sensor 1 and is the side on which the connector section 500 is provided. The distal side of the light detection unit 400 is the side where the detection of the workpiece WK (illustrated in FIG. 9 and the like) is performed.

Figure 8A:
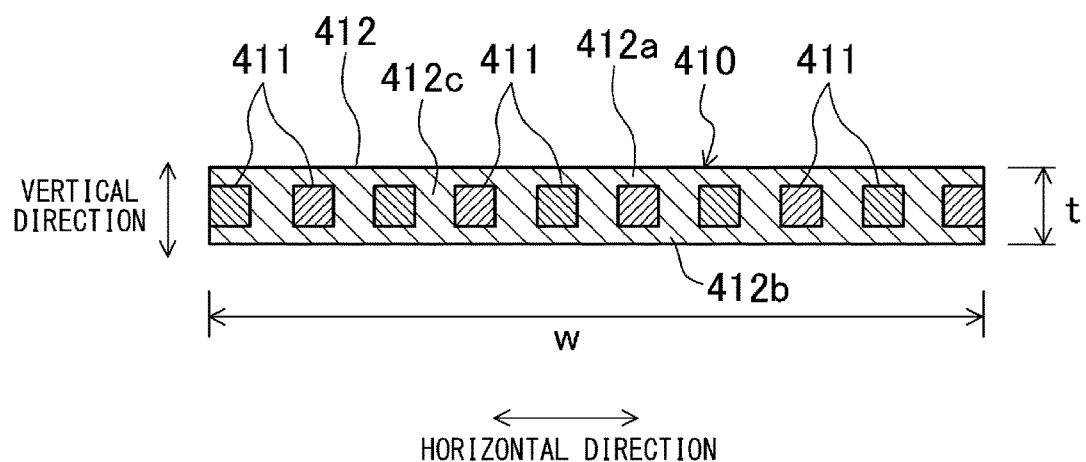
FIG. 8A is an enlarged cross-sectional view of the optical waveguide having a plurality of cores.

As illustrated in FIG. 5, the light projection optical waveguide 410 is formed in an elongated strip shape so as to guide light between a proximal end (first end) and a distal end (second end) of the light detection unit 400. The proximal end is a sensor-side end, and the distal end is a detection end. The light projection optical waveguide 410 has a sheet shape which is wide in the horizontal direction in which a horizontal dimension (width dimension W) is set to be longer than a vertical dimension (thickness dimension t) as illustrated in FIG. 8A. Main surfaces of the light projection optical waveguide 410 are an upper surface and a lower surface. Side surfaces of the light projection optical waveguide 410 are surfaces located on both sides in the width direction. Note that the light projection optical waveguide 410 can be used in a posture in which the horizontal direction illustrated in FIG. 6 faces the vertical direction, or can be used in a posture in which the horizontal direction illustrated in FIG. 6 is inclined.

As illustrated in FIG. 8A, the light projection optical waveguide 410 has a plurality of cores 411 arrayed to be spaced apart from each other in the horizontal direction, and a cladding 412 surrounding the core 411. As refractive indices of the core 411 and the cladding 412 are changed, light incident on the core 411 travels while causing total reflection at an interface between the core 411 and the cladding 412. There is almost no loss of light at this time.

The number of the cores 411 can be set to any number and is not limited to the number illustrated in the drawings. It is preferable to provide the plurality of cores 411 since the amount of light can be increased without increasing the thickness of the light projection optical waveguide 410. A cross-sectional shape of the core 411 is not particularly limited, and may be, for example, a rectangular shape. The cladding 412 has an upper portion 412a covering the core 411 from above, a lower portion 412b covering the core 411 from below, and an intermediate portion 412c interposed between the core 411 and the core 411 arrayed in the horizontal direction. The upper portion 412a of the cladding 412, the core 411, and the lower portion 412b of the cladding 412 are provided in layers in the vertical direction and integrated.

The intermediate portion 412c of the cladding 412 extends from the upper portion 412a to the lower portion 412b. A structure is formed such that the upper portion 412a and the lower portion 412b are connected by the intermediate portion 412c. Although the cores 411 located at both ends in the width direction of the light projection optical waveguide 410 are exposed without being covered by the cladding 412 in the example illustrated in FIG. 8A, the cores 411 located at both the ends in the width direction of the light projection optical waveguide 410 may be covered by the cladding 412.

Figure 7:
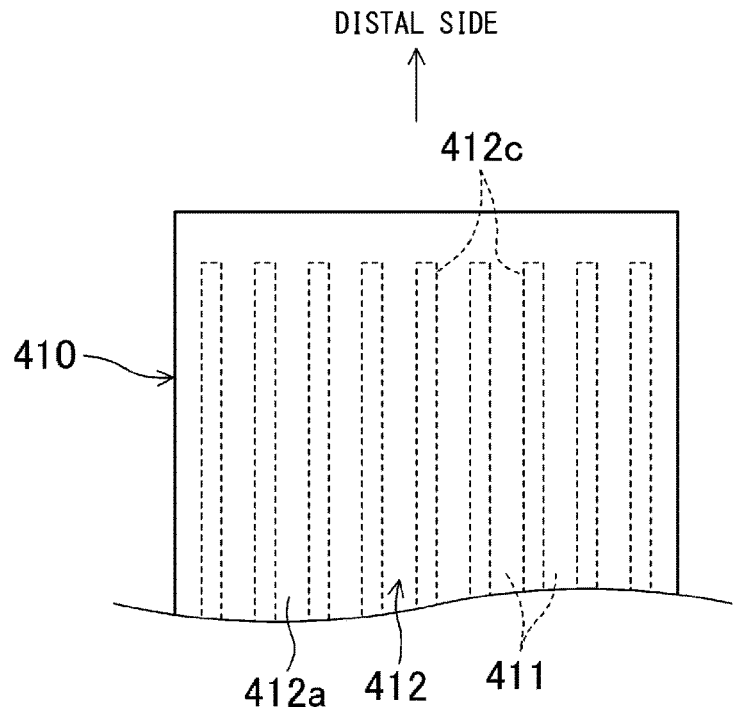
FIG. 7 is an enlarged plan view illustrating the vicinity of an end of an optical waveguide.

As illustrated in FIG. 7, which is an enlarged plan view of the vicinity of a distal end of the light projection optical waveguide 410, a distal end of the intermediate portion 412c of the cladding 412 does not necessarily reach the distal end of the light projection optical waveguide 410.

Figure 8B:
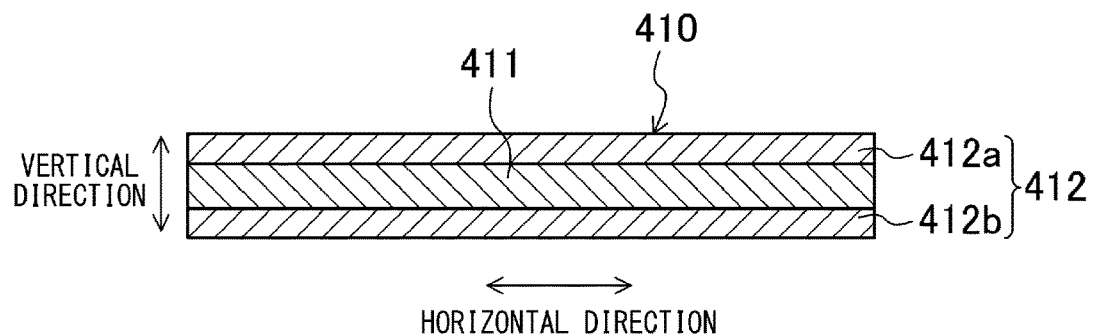
FIG. 8B is an enlarged cross-sectional view of the optical waveguide having one core.

As illustrated in FIG. 8B, the number of cores 411 may be one. When there is one core 411, the core 411 can be formed so as to have a long cross section in the width direction of the light projection optical waveguide 410. In this case, the intermediate portion 412c of the cladding 412 is omitted, and the cladding 412 is constituted by the upper portion 412a and the lower portion 412b. Both side surfaces in the width direction of the core 411 may be exposed or covered by the cladding 412.

The light projection optical waveguide 410 is a so-called polymer optical light guide path. Examples of a material of the light projection optical waveguide 410 can include resin such as acrylic, epoxy, siloxane, silicone, polyimide, polysilane, polynorbornene, and fluororesin, but the material is not limited to these, and a material satisfying desired optical properties and physical properties can be appropriately used. Only one kind of the material may be used, or any plurality of kinds may be mixed and used. In addition, an additive for improving optical properties and physical properties can be added to the material. As the light projection optical waveguide 410 is made of the above-mentioned resin, the light projection optical waveguide 410 has flexibility and plasticity, and also has a predetermined heat resistance.

A method for forming the core 411 of the light projection optical waveguide 410 can be selected according to a material. For example, the method can be selected from among a physical etching method (RIE method), a stamping method (molding method), a photobleaching method (UV conversion method), a direct light exposure method (UV curing method), and the like, but is limited thereto.

As illustrated in FIG. 6, the light reception optical waveguide 420 can be configured in the same manner as the light projection optical waveguide 410, and includes cores 421 and a cladding 422. The light reception optical waveguide 420 and the light projection optical waveguide 410 may be exactly the same, or may have different dimensions or the like. The light projection optical waveguide 410 and the light reception optical waveguide 420 are arranged with an interval in the width direction. The interval between the light projection optical waveguide 410 and the light reception optical waveguide 420 is not particularly limited, but can be set to 5 mm or more, for example, in consideration of screwing which will be described later.

The light projection optical waveguide 410 and the light reception optical waveguide 420 are covered by an upper cover member 413 and a lower cover member 414 as reinforcing materials on the outside of the light projection optical waveguide 410, covered by an upper cover member 423 and a lower cover member 424 as reinforcing materials on the outside of the light reception optical waveguide 420, and are covered by an upper cover member 440 and a lower cover member 450 which are opaque. The upper cover member 413, the lower cover member 414, the upper cover member 423, and the lower cover member 424 serve as a first cover member. The upper cover member 440 and the lower cover member 450 serve as a second cover member. Therefore, the light detection unit 400 includes the cover members having a laminated structure.

That is, a lower surface of the cladding 412 of the light projection optical waveguide 410 is covered by the lower cover member 414, a lower surface of the cladding 421 of the light reception optical waveguide 420 is covered by the lower cover member 424, and the lower cover member 414 and the lower cover member 424 are covered by the lower cover member 450. In addition, an upper surface of the cladding 412 of the light projection optical waveguide 410 is covered by the upper cover member 413, an upper surface of the cladding 421 of the light reception optical waveguide 420 is covered by the upper cover member 423, and the upper cover member 413 and the upper cover member 423 are covered by the upper cover member 440. As illustrated in FIGS. 4 and 5, the upper cover member 440 and the lower cover member 450 are formed in a sheet shape extending from the distal ends of the light projection optical waveguide 410 and the light reception optical waveguide 420 to the proximal side. The proximal ends of the light projection optical waveguide 410 and the light reception optical waveguide 420 protrude from proximal ends of the upper cover member 440 and the lower cover member 450, and are not covered by the upper cover member 440 and the lower cover member 450. Portions of the light projection optical waveguide 410 and the light reception optical waveguide 420 which are not covered by the cover members 440 and 450 are portions that are inserted to and removed from the optical sensor 1.

Hereinafter, the upper cover member 413, the lower cover member 414, the upper cover member 423, and the lower cover member 424 are provided on upper and lower surfaces of the optical waveguide 410 or the optical waveguide 420, and the description thereof will be omitted. That is, the upper cover member 413 and the lower cover member 414 can serve as members that form a part of the optical waveguide 410. In this case, the upper cover member 413 and the lower cover member 414 can be collectively referred to as the optical waveguide 410. For example, when it is described that "a hole is formed in the optical waveguide 410", a hole is formed even in the upper cover member 413 and the lower cover member 414 on the upper and lower surfaces of the optical waveguide 410, but the description thereof is omitted due to complexity. Similarly, the upper cover member 423 and the lower cover member 424 can serve as members that form a part of the optical waveguide 420. In this case, the upper cover member 423 and the lower cover member 424 can be collectively referred to as the optical waveguide 420. Note that it goes without saying that the upper cover member 413, the lower cover member 414, the upper cover member 423, and the lower cover member 424 may be provided, some of them may be provided, or none of them may be provided. In addition, the upper cover member 413 and the lower cover member 414 may be handled as members different from the optical waveguide 410, and the upper cover member 423 and the lower cover member 424 may be handled as members different from the optical waveguide 420.

The upper cover member 440 and the lower cover member 450 have a light-shielding property of shielding light emitted from the light emitting element 104. The upper cover member 440 and the lower cover member 450 do not necessarily shield 100% of the light emitted from the light emitting element 104, and preferably have the light-shielding property of, for example, 90% or more. The upper cover member 440 and the lower cover member 450 preferably have the light-shielding property according to a wavelength of the light emitted from the light emitting element 104 and an attenuation effect of attenuating the light. Colors of the upper cover member 440 and the lower cover member 450 may be, for example, dark blue other than black in appearance. Resin materials forming the upper cover member 440 and the lower cover member 450 can be colored by printing.

The light projection optical waveguide 410 and the light reception optical waveguide 420 are made of materials which are transparent to light propagating therein. The upper cover member 413, the lower cover member 414, the upper cover member 423, and the lower cover member 424 are made of opaque materials to have roles of reinforcement with respect to the light projection optical waveguide 410 and the light reception optical waveguide 420 and to cause reflection at interfaces with respect to the light projection optical waveguide 410 and the light reception optical waveguide 420. Examples of the materials can include polyimide. As described above, the upper cover member 440 and the lower cover member 450 provided on the outer side have the light-shielding property, and are subjected to processing such as coloring so as to have a higher light-shielding property than the upper cover member 413, the lower cover member 414, the upper cover member 423, and the lower cover member 424. The upper cover member 440, the lower cover member 450, the upper cover member 413, the lower cover member 414, the upper cover member 423, and the lower cover member 424 may be made of polyimide, which is the same material, and a difference in light-shielding property may be provided by printing black on the upper cover member 440 and the lower cover member 450. Note that portions at two horizontal places between the light reception optical waveguide 420 and each of the upper cover member 440 and the lower cover member 450 in FIG. 6 and at two horizontal places between the light projection optical waveguide 410 and each of the upper cover member 440 and the lower cover member 450 are air-filled portions. The air may enter when a laminate formed of the light projection optical waveguide 410, the upper cover member 413, and the lower cover member 414 and a laminate formed of the light reception optical waveguide 420, the upper cover member 423, and the lower cover member 424 are covered by the upper cover member 440 and the lower cover member 450. As a result, light leakage can be reduced by a difference in refractive index between each of the light projection optical waveguide 410 and the light reception optical waveguide 420 and the air.

An adhesive layer and a bonding layer are provided on the back surface of the upper cover member 440. The upper cover member 440 is attached or bonded to the upper surface of the cladding 412 of the light projection optical waveguide 410 and the upper surface of the cladding 421 of the light reception optical waveguide 420. As a result, the upper cover member 440 is integrally configured with the light projection optical waveguide 410 and the light reception optical waveguide 420.

An adhesive layer and a bonding layer are also provided on the back surface of the lower cover member 450. The lower cover member 450 is attached or bonded to the lower surface of the cladding 412 of the light projection optical waveguide 410 and the lower surface of the cladding 421 of the light reception optical waveguide 420. As a result, the lower cover member 450 is integrally configured with the light projection optical waveguide 410 and the light reception optical waveguide 420.

The upper cover member 440 and the lower cover member 450 are attached or bonded to each other on both sides in the width direction. As a result, it is possible to suppress light leakage from both the sides in the width direction. Further, the upper cover member 440 and the lower cover member 450 are also attached or bonded to each other between the light projection optical waveguide 410 and the light reception optical waveguide 420. As a result, the light projection optical waveguide 410 and the light reception optical waveguide 420 can be optically isolated.

The upper cover member 440 and the lower cover member 450 can be made of, for example, a resin tape, a resin sheet, a resin film, or the like which is flexible. Examples of a resin material that can be used can include polyimide and the like, but the resin material is not limited thereto, and any resin material having flexibility, plasticity, and strength that prevents breakage during fixing, which will be described later, may be used. When the upper cover member 440 and the lower cover member 450 are colored, the coloring may be performed using a pigment or a dye.

In addition, the light projection optical waveguide 410 and the light reception optical waveguide 420 may be covered by one cover member without being separated into the upper cover member 440 and the lower cover member 450. In addition, the cover member may have a bag shape, and the shape thereof is not particularly limited. The upper cover member 440 and the lower cover member 450 are formed so as not to cover a light projecting end, which is the distal end of the light projection optical waveguide 410 and a light receiving end, which is the distal end of the light reception optical waveguide 420, and can optically couple the light extraction member 430 with the light projecting end of the light projection optical waveguide 410 and the light receiving end of the light reception optical waveguide 420.

On the upper cover member 440 and the lower cover member 450, for example, characters, symbols, marks, and the like indicating a manufacturer name, a product number, a model, or the like of the light detection unit 400 can be written. When the upper cover member 440 and the lower cover member 450 are formed with a dark color such as black and the characters, symbols, marks, and the like are configured with a light color such as white, the characters, symbols, marks, and the like become more conspicuous. When writing the characters, symbols, marks, and the like only on an upper surface, for example, a user can easily determine which is the upper surface. For example, the characters, symbols, marks, and the like may be written on the upper cover member 440 or the lower cover member 450 as a direction display unit indicating directions of up, down, front, back, and the like.

Since the upper cover member 440 and the lower cover member 450 are provided, it is possible to suppress light leakage from the light projection optical waveguide 410 and the light reception optical waveguide 420 when the light detection unit 400 is bent and installed. In addition, the light projection optical waveguide 410 and the light reception optical waveguide 420 can be reinforced to enhance the strength by integrating the upper cover member 440 and the lower cover member 450 with the light projection optical waveguide 410 and the light reception optical waveguide 420. For example, when the light detection unit 400 is bent and installed, the breakage of the light projection optical waveguide 410 and the light reception optical waveguide 420 can be suppressed by the upper cover member 440 and the lower cover member 450. Meanwhile, since the upper cover member 440, the lower cover member 450, the light projection optical waveguide 410, and the light reception optical waveguide 420 are flexible, it is possible to bend, twist, and warp the light detection unit 400, for example, when bypassing an obstacle, and the degree of freedom of handling is improved. Since it is possible to suppress the light leakage from the light projection optical waveguide 410 and the light reception optical waveguide 420 even in this way, there is no adverse effect on the detection performance.

In addition, the light projection optical waveguide 410 and the light reception optical waveguide 420 are characterized by being sheet-shaped and thin in this mode, and thus, the light detection unit 400 can be arranged in a thin space. On the other hand, it is also considered that bending is easy during handling and twining is easy so that the handleability deteriorates if the light projection optical waveguide 410 and the light reception optical waveguide 420 are thin. However, since the upper cover member 440 and the lower cover member 450 are provided, the bending of the light projection optical waveguide 410 and the light reception optical waveguide 420 is appropriately suppressed, and the twining is less likely to occur so that the handleability becomes favorable.

The rigidity of the resin material forming the upper cover member 440 and the lower cover member 450 can be set to be higher than the rigidity of the resin material forming the light projection optical waveguide 410 and the light reception optical waveguide 420. As a result, the reinforcing effect of the upper cover member 440 and the lower cover member 450 is further enhanced. In addition, the resin material forming the upper cover member 440 and the lower cover member 450 can be made less slippery than the resin material forming the light projection optical waveguide 410 and the light reception optical waveguide 420. As a result, the light detection unit 400 becomes less slippery at the time of installing the light detection unit 400.

In addition, the cores 411 are partially exposed on horizontal end surfaces of the light projection optical waveguide 410 as illustrated in FIGS. 8A and 6. This aims to strengthen the end surfaces. For example, when the cladding constituting the light projection optical waveguide 410 is manufactured by modifying the core, the core 411 becomes stronger than cladding 412. Therefore, the strength on the end surface side can be enhanced by exposing the core 411.

In addition, an end surface on the distal side of the light projection optical waveguide 410 is the core 411 as illustrated in FIG. 7. In addition, the horizontal end surfaces (left and right ends on the paper surface in FIG. 7) are also the cores 411. The portion exposed to the outside is formed with the core 411 instead of the cladding 412 since the core 411 is stronger than the cladding 412.

Figure 9:
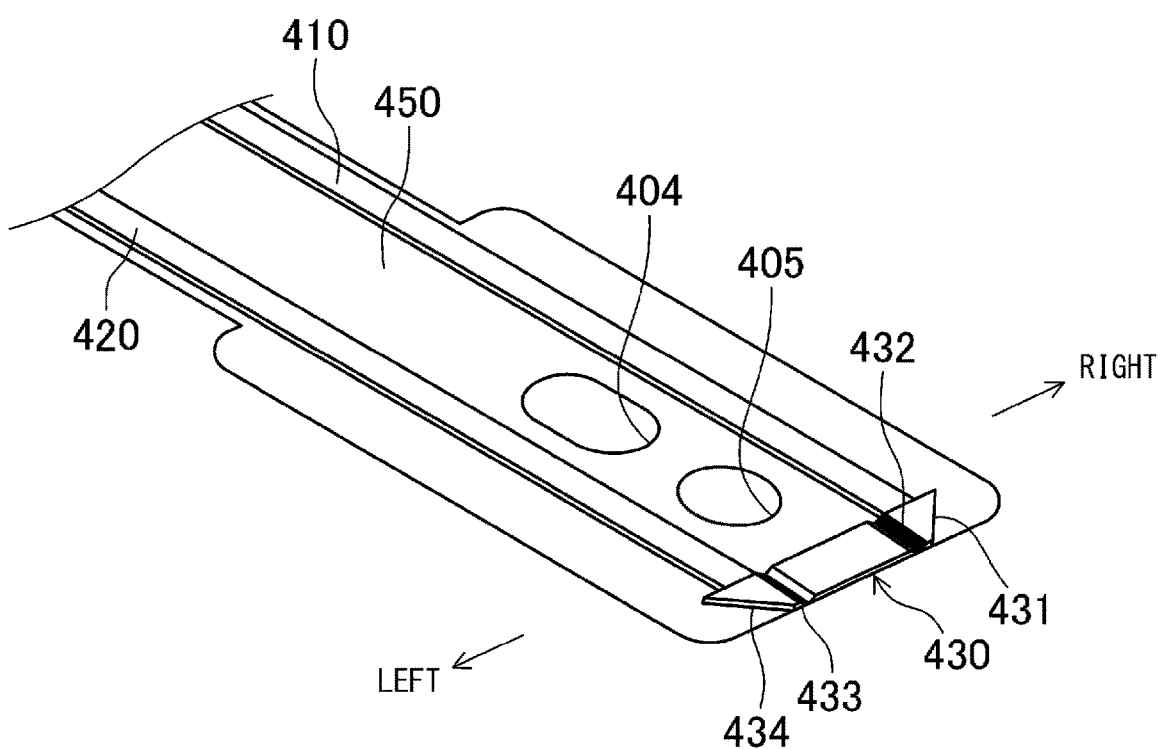
FIG. 9 is an enlarged view of a distal side of the light guide section of the light detection unit illustrated in FIG. 5.

As illustrated in FIG. 9, the light extraction member 430 is arranged at the distal end of the light detection unit 400, and is formed in a plate shape provided from the distal end of the light projection optical waveguide 410 to the distal end of the light reception optical waveguide 420. The thickness of the light extraction member 430 is set to be approximately the same as the thickness of the light projection optical waveguide 410 or the light reception optical waveguide 420. Note that the left and right of the light detection unit 400 are defined as illustrated in FIG. 9, but this is given for convenience of description only, and does not limit an actual use state.

Figure 10:
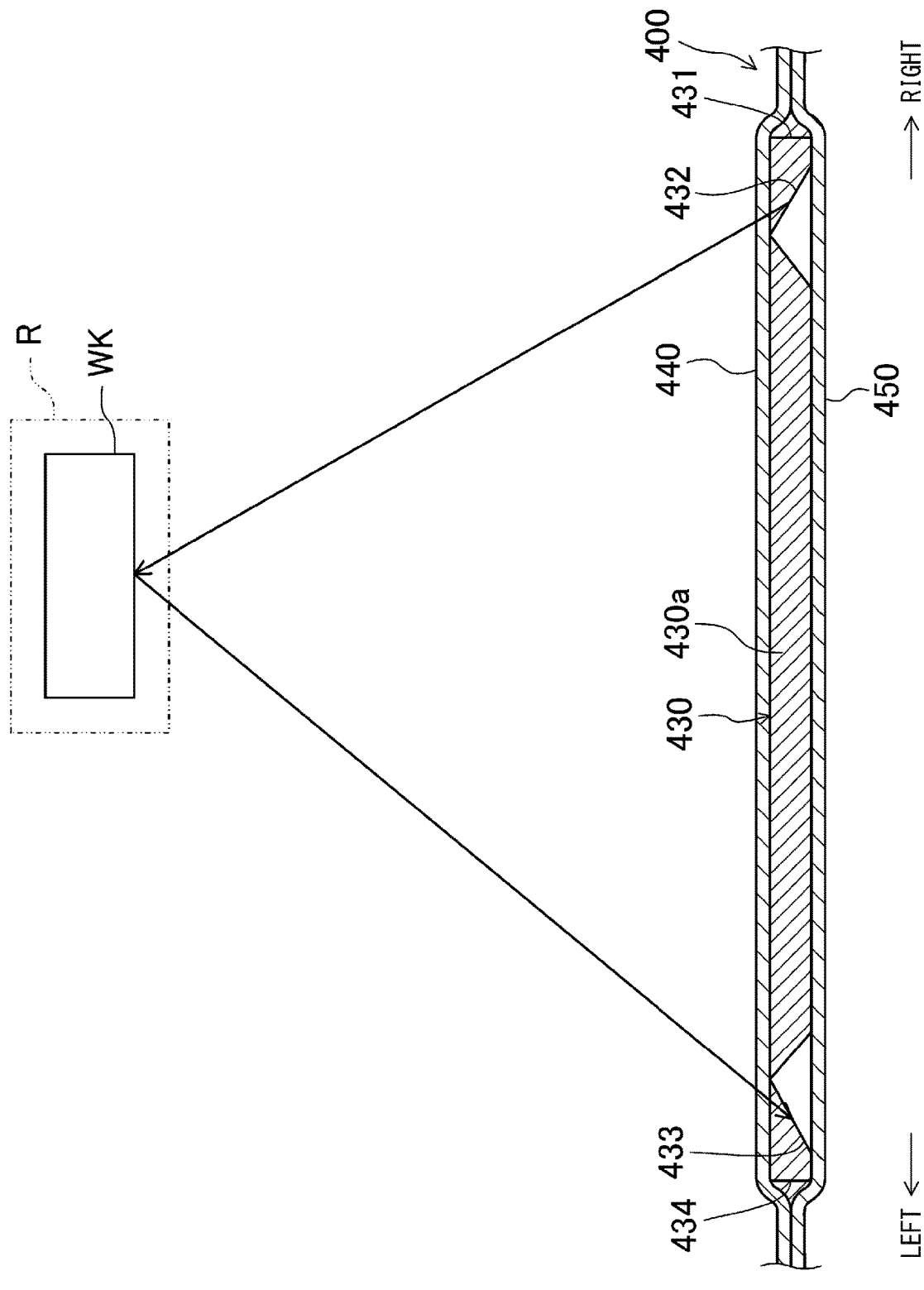
FIG. 10 is a cross-sectional view taken along line X-X of FIG. 4 illustrating a detection state of a workpiece.

The light extraction member 430 can be made of a material having the same light guide property as the material of the core 411 of the light projection optical waveguide 410. As illustrated in FIG. 10, the light extraction member 430 is configured using a single core 430a. The light extraction member 430 may have a cladding similar to the cladding 412 of the light projection optical waveguide 410. A lower surface of the light extraction member 430 is attached or bonded to the lower cover member 450, and an upper surface of the light extraction member 430 is attached or bonded to the upper cover member 440. As a result, relative positions of the light extraction member 430 with the light projection optical waveguide 410 and the light reception optical waveguide 420 can be prevented from deviating, and the light extraction member 430 can be covered by the upper cover member 440 and the lower cover member 450.

As illustrated in FIG. 9, the right side of the light extraction member 430 abuts against the distal end of the light projection optical waveguide 410. As a result, the light extraction member 430 and the plurality of cores 411 of the light projection optical waveguide 410 are optically coupled, and thus, the light traveling through the cores 411 of the light projection optical waveguide 410 is incident on the right portion of the light extraction member 430. A transparent elastic material or a transparent bonding material may be interposed between the light extraction member 430 and the distal end of the light projection optical waveguide 410.

A right inclined surface 431 is formed at a distal end on the right side of the light extraction member 430. The right inclined surface 431 is a reflective surface, and the traveling direction of light incident on the right side of the light extraction member 430 is converted to the left side by the right inclined surface 431. An inclination angle of the right inclined surface 431 with respect to the longitudinal direction of the light projection optical waveguide 410 is set such that the direction of the light incident on the right side of the light extraction member 430 is converted to the left side.

A light emitting mirror surface 432 as a light emitting section is provided on the right side of the upper surface of the light extraction member 430. The light emitting mirror surface 432 is configured as a surface inclined at a predetermined angle with respect to the upper surface of the light extraction member 430, and the light, which has been incident on the right side of the light extraction member 430 and converted to the left side by the right inclined surface 431, is directed and emitted toward a detection area R (illustrated in FIG. 10) from the main surface side (upper surface side) of the light projection optical waveguide 410 by the light emitting mirror surface 432. The distal end of the light projection optical waveguide 410 serves as the light projecting end, and the light is projected onto the detection area R through the light extraction member 430. The light emitting mirror surface 432 can be obtained by, for example, laser processing. A vapor-deposition film on which metal has been vapor-deposited to improve the reflectance may be formed on the light emitting mirror surface 432.

Entrance and exit aperture angles of light can be set to about NA=0.2, which makes it possible to realize small light projection spot and light receiving field of view without adding a lens or the like. Note that the optical paths illustrated in each drawing may be reversely provided. That is, it is also possible to set the light projection side in each drawing as the light reception side and to set the light reception side as the light projection side. In addition, a distance between the light detection unit 400 and the workpiece WK is not particularly limited, but can be set to, for example, about 0 mm to 3 mm.

The detection area R is an area in which the workpiece WK to be detected is arranged, and is a planned arrangement area of the workpiece WK. In this mode, the detection area R is located above the light extraction member 430. The exit angle of light can be changed with the angle of the light emitting mirror surface 432.

In addition, the left side of the light extraction member 430 abuts against the distal end of the light reception optical waveguide 420. As a result, the light extraction member 430 and the light reception optical waveguide 420 are optically coupled, and thus, the light traveling through the left portion of the light extraction member 430 is incident on the core 421 of the light reception optical waveguide 420. A transparent elastic material or a transparent bonding material may be interposed between the light extraction member 430 and the distal end of the light reception optical waveguide 420.

As illustrated in FIG. 10, when the workpiece WK is arranged in the detection area R, the light emitted to the workpiece WK is reflected and travels downward, and a light incident mirror surface 433 as a light incident section is provided on the upper surface of the light extraction member 430 so as to correspond to a portion where the light reaches. The light incident mirror surface 433 is configured as a surface inclined at a predetermined angle with respect to the upper surface of the light extraction member 430, and an inclination angle of the light incident mirror surface 433 is set such that the incident light travels to the left side.

As illustrated in FIG. 9, a left inclined surface 434 is formed at a distal end on the left side of the light extraction member 430. The left inclined surface 434 is a reflective surface, and the traveling direction of the light incident on the light extraction member 430 from the light incident mirror surface 433 and traveling to the left side is converted by the left inclined surface 434 and incident on the light reception optical waveguide 420. The inclination angle of the left inclined surface 434 with respect to the longitudinal direction of the light reception optical waveguide 420 is set such that the direction of the light incident on the left side of the light extraction member 430 is converted to the proximal side of the light detection unit 400. The distal end of the light reception optical waveguide 420 serves as the light receiving end that receives light from the detection area R through the light extraction member 430. The light emitting mirror surface 432 and the light incident mirror surface 433 are not covered by the upper cover member 440 and are exposed.

The plurality of cores 411 and 421 are arranged in the light projection optical waveguide 410 and the light reception optical waveguide 420, but the light extraction member 430 has the single core. When the plurality of cores are provided, it is difficult to align the cores during optical coupling, but it is easy to optically couple the plurality of cores to form a core having a larger cross-sectional area. Therefore, as the light projection optical waveguide 410 and the light reception optical waveguide 420 abut on the light extraction member 430, the optical coupling can be performed while suppressing the light loss so that the assembleability is favorable.

(Fixing Structure of Light Detection Unit 400)

Figure 11:
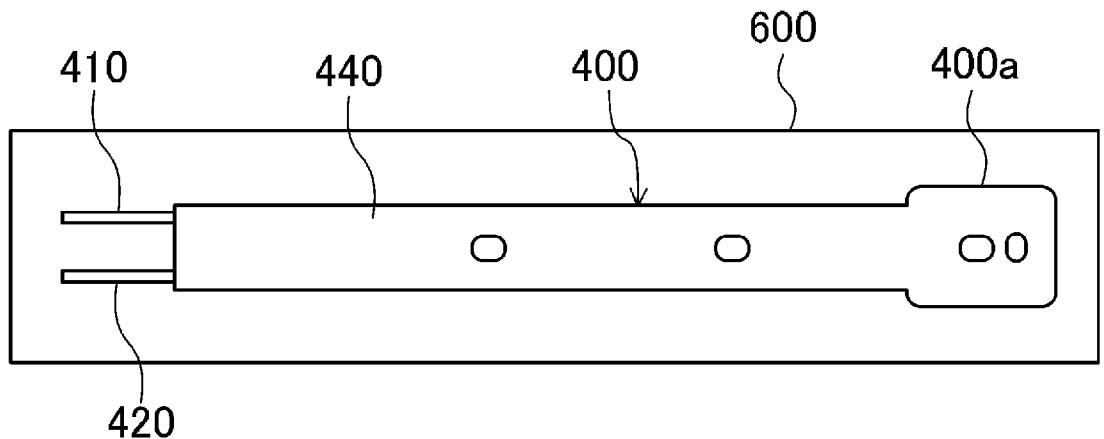
FIG. 11 is a plan view illustrating an example in which the light detection unit is fixed to an attachment member by a fixing member.
Figure 12:
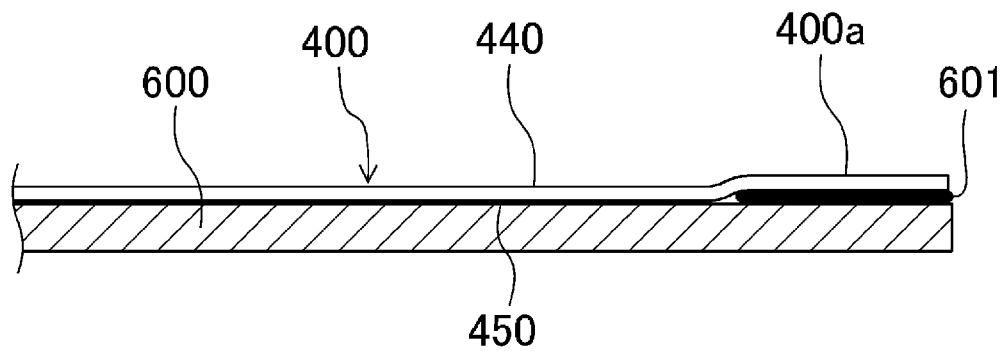
FIG. 12 is a vertical cross-sectional view illustrating an example in which the light detection unit is fixed to the attachment member by the fixing member.

When installed as illustrated in FIGS. 11 and 12, the light detection unit 400 can be fixed to, for example, an attachment member 600 which is an attachment target. The attachment member 600 may be, for example, a member forming a part of various devices, and may be a surface plate or the like. In the examples illustrated in FIGS. 11 and 12, the light detection unit 400 is fixed to a surface of the attachment member 600 by a fixing member 601 made of an adhesive material, a bonding material, a double-sided tape, or the like. At this time, a lower surface of the lower cover member 450 is an installation surface, and is a surface fixed to the attachment member 600. When the installation surface is horizontal, the light projection optical waveguide 410 and the light reception optical waveguide 420 are arrayed horizontally, but it is necessary to handle the light projection optical waveguide 410 and the light reception optical waveguide 420 so as to twist in the middle since the light projection hole 376 and the light reception hole 378 of the optical sensor 1 are arrayed in the up-down direction as illustrated in FIG. 3. Even in this case, such handling can be easily performed since the light projection optical waveguide 410 and the light reception optical waveguide 420 covered by the upper cover member 440 and the lower cover member 450 have the sheet shape and have predetermined flexibility and plasticity.

A wide portion 400a, which is wider than the proximal side, is provided on the distal side of the light detection unit 400. As the wide portion 400a is fixed to the attachment member 600 by the fixing member 601, the area of the fixed portion can be made wide.

Figure 13:
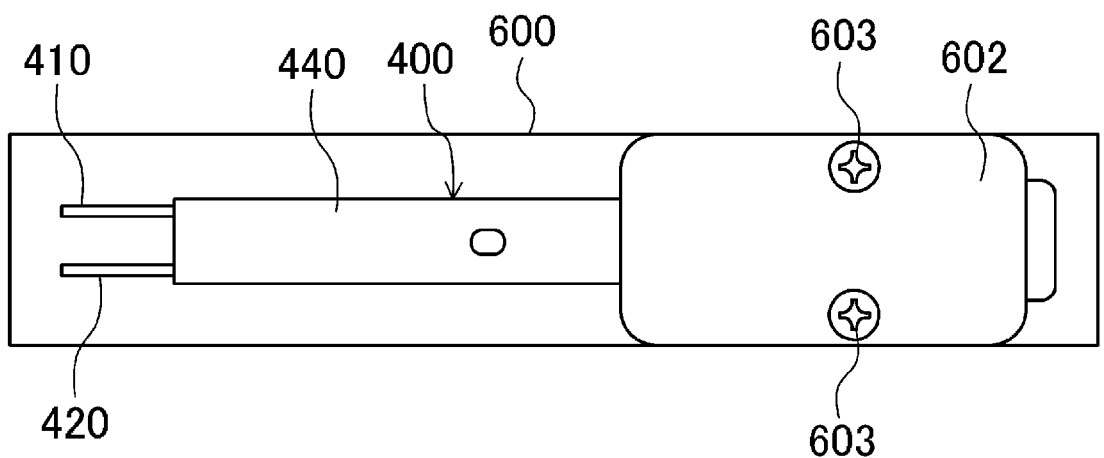
FIG. 13 is a plan view illustrating an example in which the light detection unit is fixed to the attachment member by a fixing plate.
Figure 14:
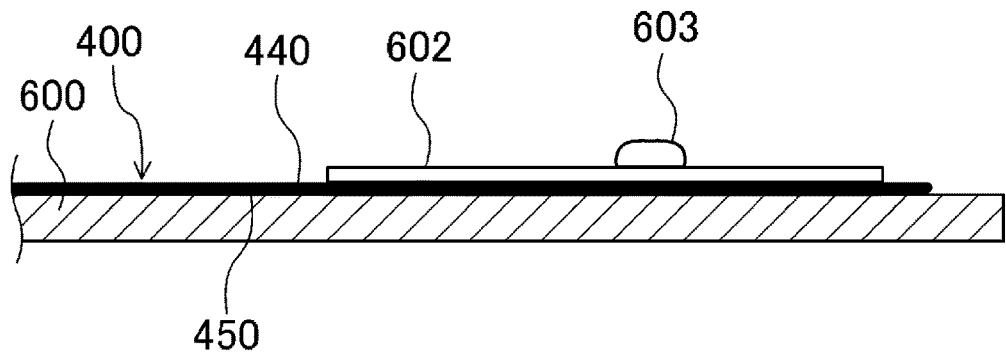
FIG. 14 is a vertical cross-sectional view illustrating an example in which the light detection unit is fixed to the attachment member by the fixing plate.

FIGS. 13 and 14 illustrate an example in which the light detection unit 400 is screwed to the attachment member 600 using a fixing plate 602. The fixing plate 602 is made of, for example, a hard resin or a metal material, and is formed so as to extend along an upper surface of the attachment member 600. The fixing plate 602 is formed to be wider than the width of the distal side of the light detection unit 400. Insertion holes (not illustrated) through which screws 603 are inserted are formed on both sides of the fixing plate 602 in the width direction. These insertion holes are located on the outer side of the distal side of the light detection unit 400. When the screws 603 are inserted through the insertion holes and screwed into the attachment member 600 in a state where the fixing plate 602 is placed on the upper surface on the distal side of the light detection unit 400, the fixing can be performed by sandwiching the distal side of the light detection unit 400 between the fixing plate 602 and the attachment member 600 in the thickness direction. The fixing plate 602 is arranged so as not to cover the light emitting mirror surface 432 and the light incident mirror surface 433. A nail, a stapler, or the like can be used instead of the screw 603.

Figure 15:
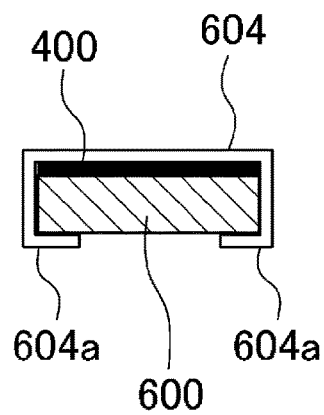
FIG. 15 is a view illustrating an example in which the light detection unit is fixed to the attachment member by a hook-shaped member.

FIG. 15 illustrates an example in which the light detection unit 400 is fixed to the attachment member 600 using a hook-shaped member 604. FIG. 15 is a vertical cross section orthogonal to the longitudinal direction of the light detection unit 400. The hook-shaped member 604 is formed so as to surround the attachment member 600, and is made of, for example, a hard resin or a metal material. The hook-shaped member 604 has a pair of legs 604a. As the hook-shaped member 604 is engaged with the attachment member 600 from above on the distal side of the light detection unit 400, the fixing can be performed by sandwiching the distal side of the light detection unit 400 between the hook-shaped member 604 and the attachment member 600 in the thickness direction. The hook-shaped member 604 is arranged so as not to cover the light emitting mirror surface 432 and the light incident mirror surface 433.

Figure 16:
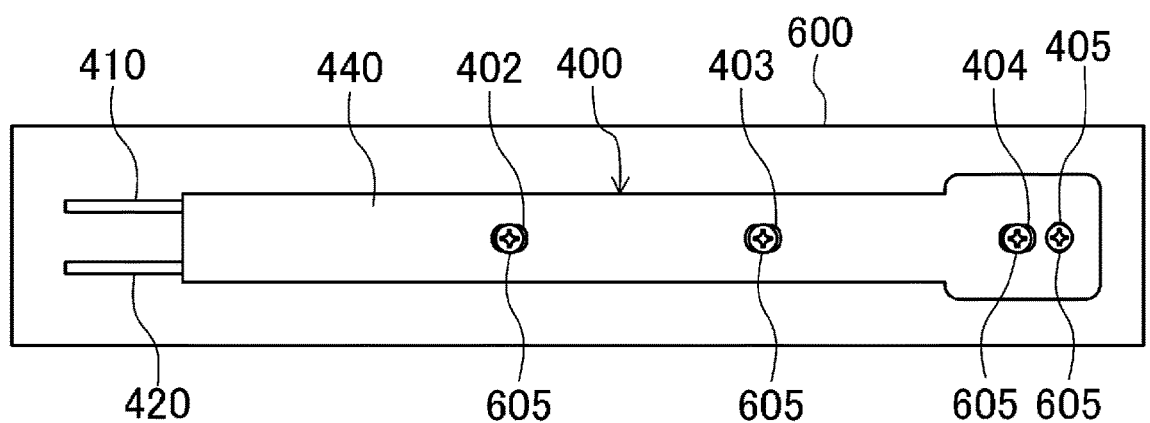
FIG. 16 is a plan view illustrating an example in which the light detection unit is directly fixed to the attachment member by a screw.
Figure 17:
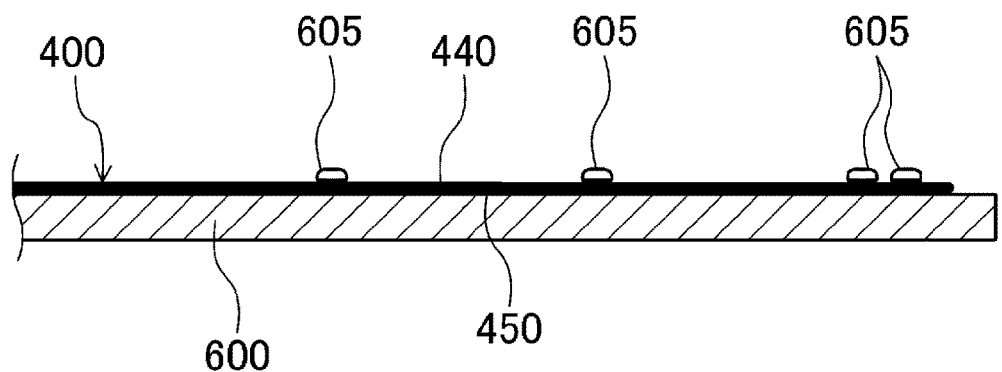
FIG. 17 is a vertical cross-sectional view illustrating an example in which the light detection unit is directly fixed to the attachment member by the screw.

FIGS. 16 and 17 illustrate an example of fixing obtained by directly screwing the light detection unit 400 to the attachment member 600. The light detection unit 400 is provided with the first to fourth insertion holes 402 to 405 (illustrated in FIG. 4) through which the screws 605 as fixing members used when installing the attachment member 600 are inserted. The first to fourth insertion holes 402 to 405 penetrate the upper cover member 440 and the lower cover member 450 in the up-down direction. That is, the upper cover member 440 and the lower cover member 450 respectively have portions covering the claddings 412 and 422 between the light projecting end and the light receiving end of the light projection optical waveguide 410 and the light reception optical waveguide 420, and the portions covering the claddings 412 and 422 between the light projecting end and the light receiving end are portions fixed to the attachment member 600.

The first insertion hole 402 is located on the most proximal side, and the fourth insertion hole 405 is located on the most distal side. The second insertion hole 403 and the third insertion hole 404 are located between the first insertion hole 402 and the fourth insertion hole 405, and the second insertion hole 403 is closer to the proximal side than the third insertion hole 404. The third insertion hole 404 is close to the fourth insertion hole 405. The first to fourth insertion holes 402 to 405 can also be configured using elongated holes. The first to fourth insertion holes 402 to 405 are located at corresponding portions of the cover members 440 and 450 between the light projection optical waveguide 410 and the light reception optical waveguide 420 so as not to affect the light projection optical waveguide 410 and the light reception optical waveguide 420.

When the screws 605 are inserted through the first to fourth insertion holes 402 to 405 and screwed into the attachment member 600 as illustrated in FIGS. 16 and 17, the fixing can be performed by sandwiching peripheral edges of the first to fourth insertion holes 402 to 405 between heads of the screws 605 and the attachment member 600. The number of the insertion holes and the number of the screws 605 are not limited to four, and may be one, for example. The peripheral edges of the first to fourth insertion holes 402 to 405 serve as fixed portions which are fixed to the attachment member 600. Washers (not illustrated) may be interposed between the heads of the screws 605 and the peripheral edges of the first to fourth insertion holes 402 to 405.

Figure 18:
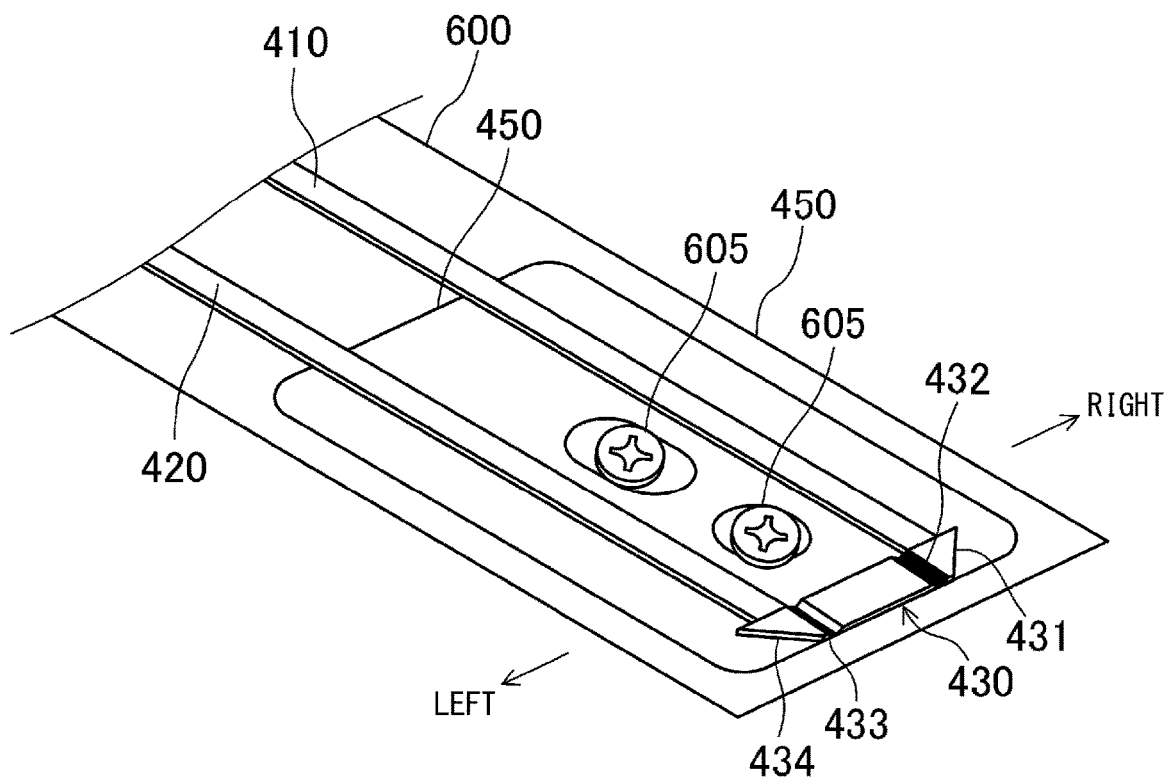
FIG. 18 is a perspective view illustrating an example in which a cover member is provided at a fixed portion of the light detection unit.

As illustrated in FIG. 18, the cover member 450 may be provided at a portion which is fixed to the attachment member 600. In this case, the screw 605 is preferably arranged so as to penetrate the cover member 450 and screwed into the attachment member 600. As a result, the fixing can be performed by sandwiching the cover member 450 between the head of the screw 605 and the attachment member 600.

Figure 19:
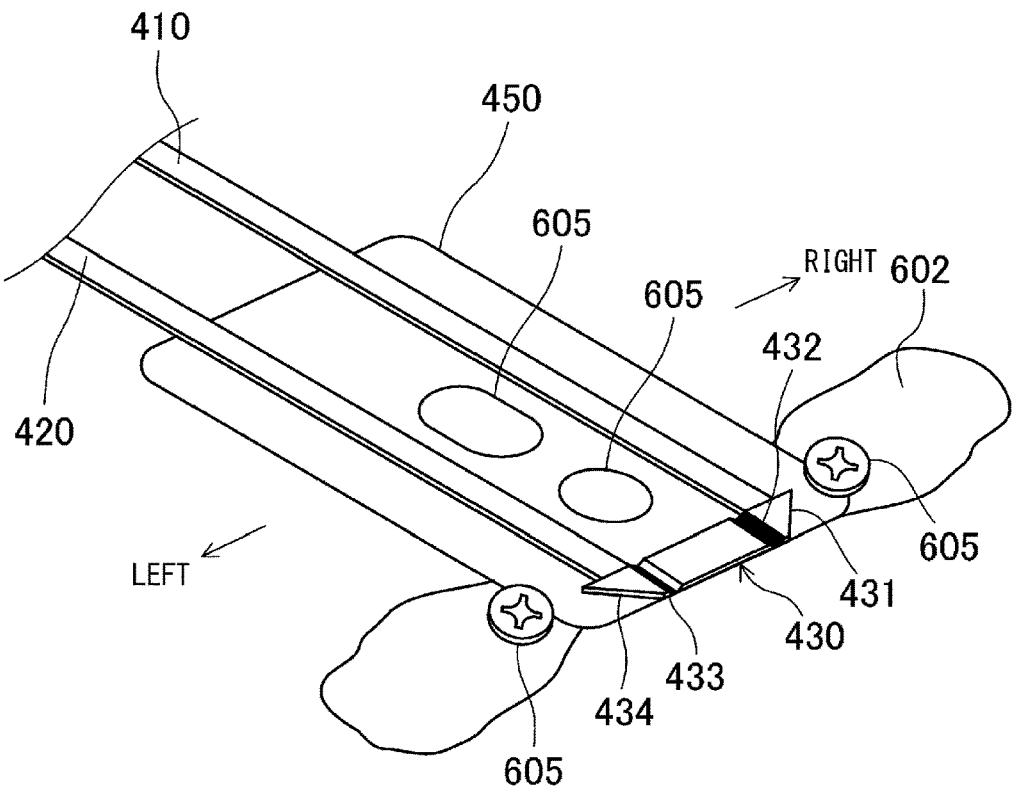
FIG. 19 is a perspective view illustrating an example in which the cover member is provided at the fixed portion of the light detection unit to fix both sides of the cover member in a width direction.

When the cover member 450 is provided at a portion which is fixed to the attachment member 600 as illustrated in FIG. 19, attachment areas 602, obtained by spreading the light projection optical waveguide 410, the light reception optical waveguide 420, and/or the cover member 450, may be provided on both sides of the cover member 450 in the width direction, and holes provided in the attachment areas 602 may be fixed with the screws 605, respectively. In this case, the fixing can be performed by sandwiching both the sides of the cover member 450 in the width direction between the head of the screw 605 and the attachment member 600.

Figure 20:
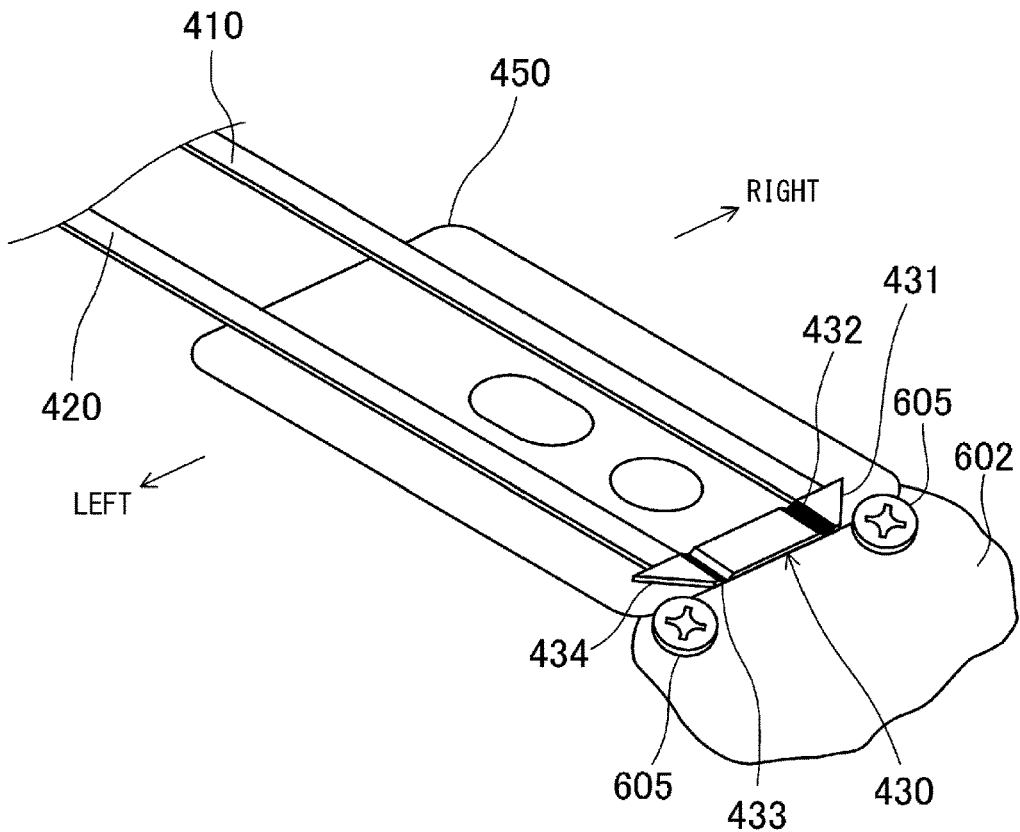
FIG. 20 is a perspective view illustrating an example in which the cover member is provided at the fixed portion of the light detection unit to fix a distal side of the cover member.

When the cover member 450 is provided at a portion which is fixed to the attachment member 600 as illustrated in FIG. 20, the attachment area 602, obtained by spreading the light projection optical waveguide 410, the light reception optical waveguide 420, and/or the cover member 450, may be provided on the distal side of the cover member 450, and holes provided in the attachment areas 602 may be fixed with the screws 605. In this case, the fixing can be performed by sandwiching the distal side of the cover member 450 between the head of the screw 605 and the attachment member 600.

Figure 21:
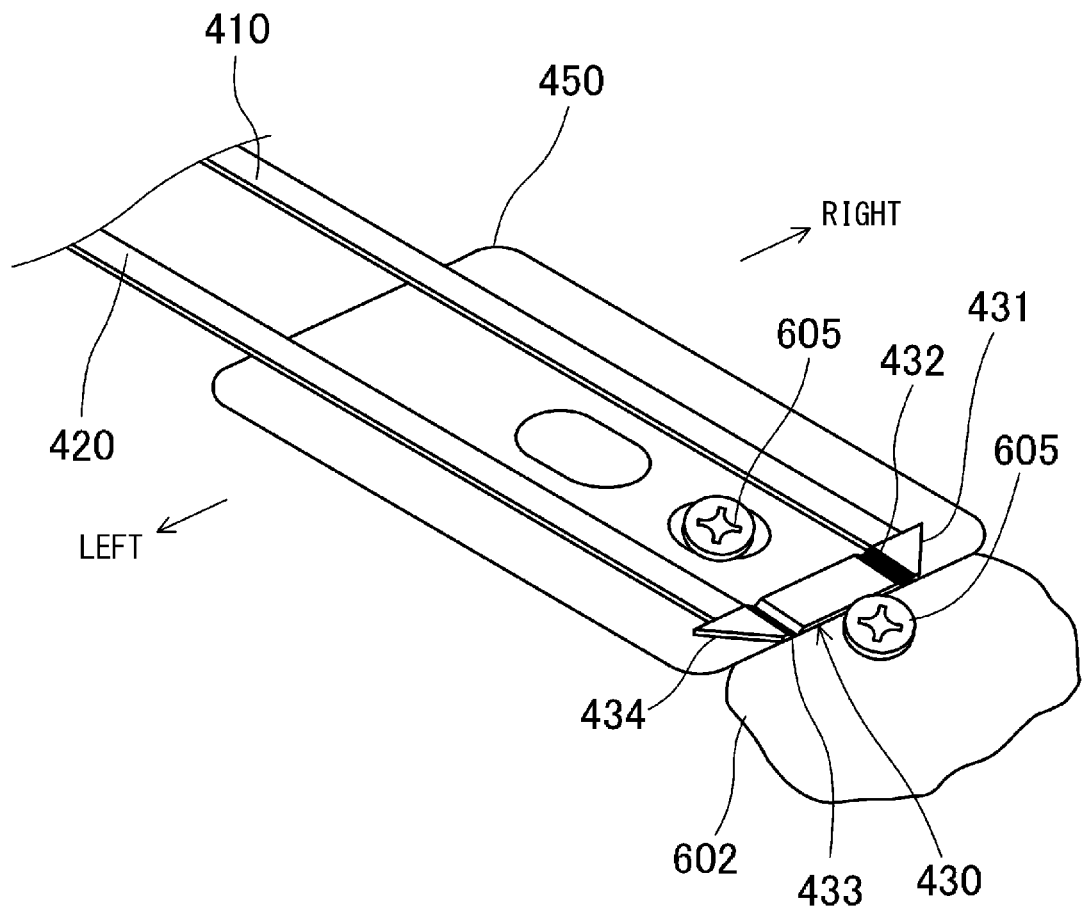
FIG. 21 is a perspective view illustrating an example in which the cover member is provided at the fixed portion of the light detection unit to fix the distal side of the cover member and a portion between a light projection optical waveguide and a light reception optical waveguide.

When the cover member 450 is provided at a portion which is fixed to the attachment member 600 as illustrated in FIG. 21, the attachment area 602, obtained by spreading the light projection optical waveguide 410, the light reception optical waveguide 420, and/or the cover member 450, may be provided on the distal side of the cover member 450 and in a portion between the light projection optical waveguide 410 and the light reception optical waveguide 420, and holes provided in the attachment areas 602 may be fixed. The distal side of the cover member 450 can be fixed by being sandwiched between the head of the screw 605 and the attachment member 600, and the portion of the cover member 450 between the light projection optical waveguide 410 and the light reception optical waveguide 420 can be fixed by causing the screw 605 to penetrate therethrough for screwing into the attachment member 600.

Figure 22:
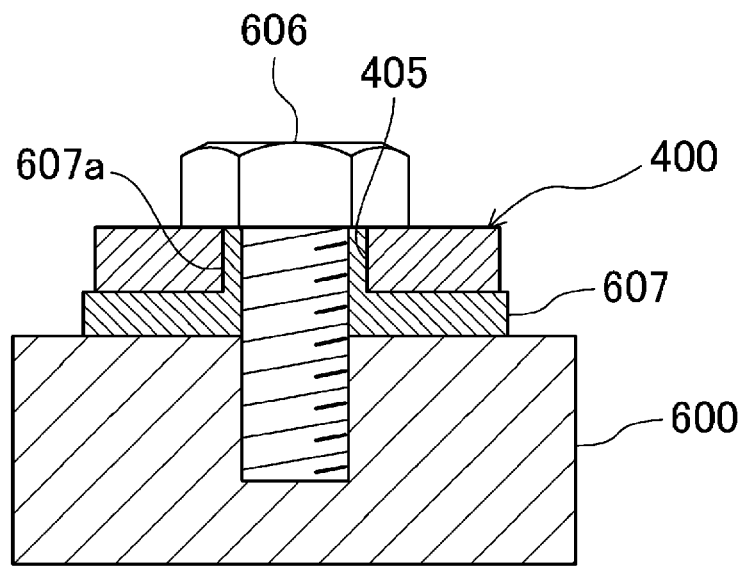
FIG. 22 is a vertical cross-sectional view illustrating an example of fixing the light detection unit using a washer.

As illustrated in FIG. 22, the light detection unit 400 can also be fixed using a screw 606 and a washer 607. FIG. 22 is a vertical cross section orthogonal to the longitudinal direction of the light detection unit 400, and illustrates a portion where the fourth insertion hole 405 is formed. The washer 607 is arranged below the light detection unit 400. The washer 607 is formed with an annular portion 607a which is inserted into the fourth insertion hole 405. The screw 606 is inserted through the annular portion 607a of the washer 607 and screwed into the attachment member 600. At this time, a head of the screw 606 can be received by an upper end of the annular portion 607a of the washer 607, and thus, it becomes difficult for a strong force to act in the up-down direction on the light detection unit 400, and it is possible to suppress damage to the light projection optical waveguide 410, the light reception optical waveguide 420, and the light extraction member 430. A fixing site is not limited to the fourth insertion hole 405, but may be any of the first to third insertion holes 402 to 404, and a similar fixing method can be adopted for any plurality of the through-holes 402 to 405.

The above-mentioned fixing method is an example, and various methods can be adopted as long as the light detection unit 400 is fixed to the attachment member 600 with the method. For example, a fixing method using a binding band, a wire, or the like can also be adopted. In addition, the light detection unit 400 can be fixed to the attachment member 600 by combining any two or more fixing methods among the above-mentioned plurality of fixing methods.

In addition, the connector section 500 may be omitted, and the proximal ends of the light projection optical waveguide 410 and the light reception optical waveguide 420 may be fixed to the optical sensor 1 so that they cannot be removed.

(Connecting Structure of Optical Waveguide)

Figure 23A:
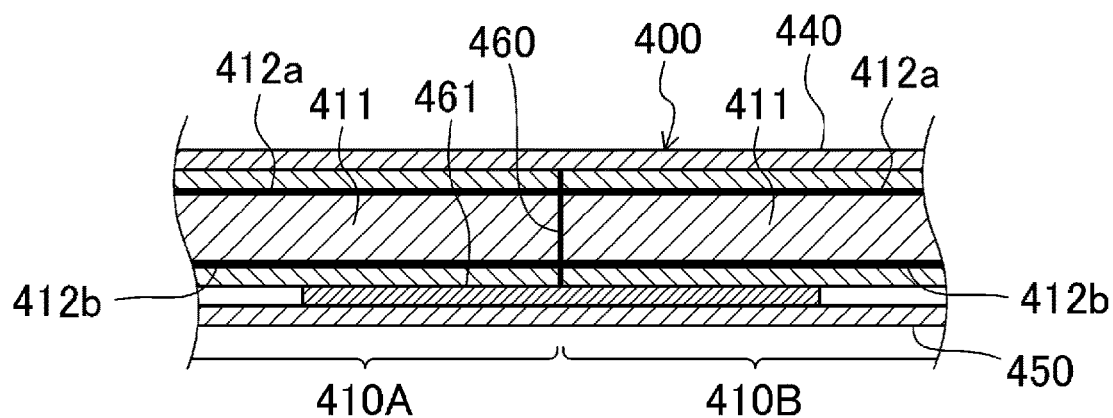
FIG. 23A is a vertical cross-sectional view of a portion where the optical waveguides are connected to each other.

FIG. 23A is a vertical cross-sectional view of a connecting portion between two light projection optical waveguides 410A and 410B, and the two light projection optical waveguides 410A and 410B can be connected and used as illustrated in this drawing. The connection may be achieved by causing an end surface of the light projection optical waveguide 410A and an end surface of the light projection optical waveguide 410B to directly abut against each other or by interposing a transparent elastic material 460 or a transparent bonding material between the end surface of the light projection optical waveguide 410A and the end surface of the light projection optical waveguide 410B so as not to leave any air layer.

It is also possible to provide a reinforcing material 461 continuous from the light projection optical waveguide 410A to the light projection optical waveguide 410B. The reinforcing material 461 is a tape-shaped member which is attached to a lower surface of the light projection optical waveguide 410A and a lower surface of the light projection optical waveguide 410B, and has flexibility. The reinforcing material 461 preferably has a property of not extending and contracting in the longitudinal direction of the light projection optical waveguide 410A. Accordingly, it is possible to prevent generation of a gap between the two light projection optical waveguides 410A and 410B, for example, when the two light projection optical waveguides 410A and 410B are pulled away from each other so that a decrease in efficiency can be suppressed. The reinforcing material 461 may be provided on upper surfaces of the light projection optical waveguide 410A and the light projection optical waveguide 410B.

Figure 23B:
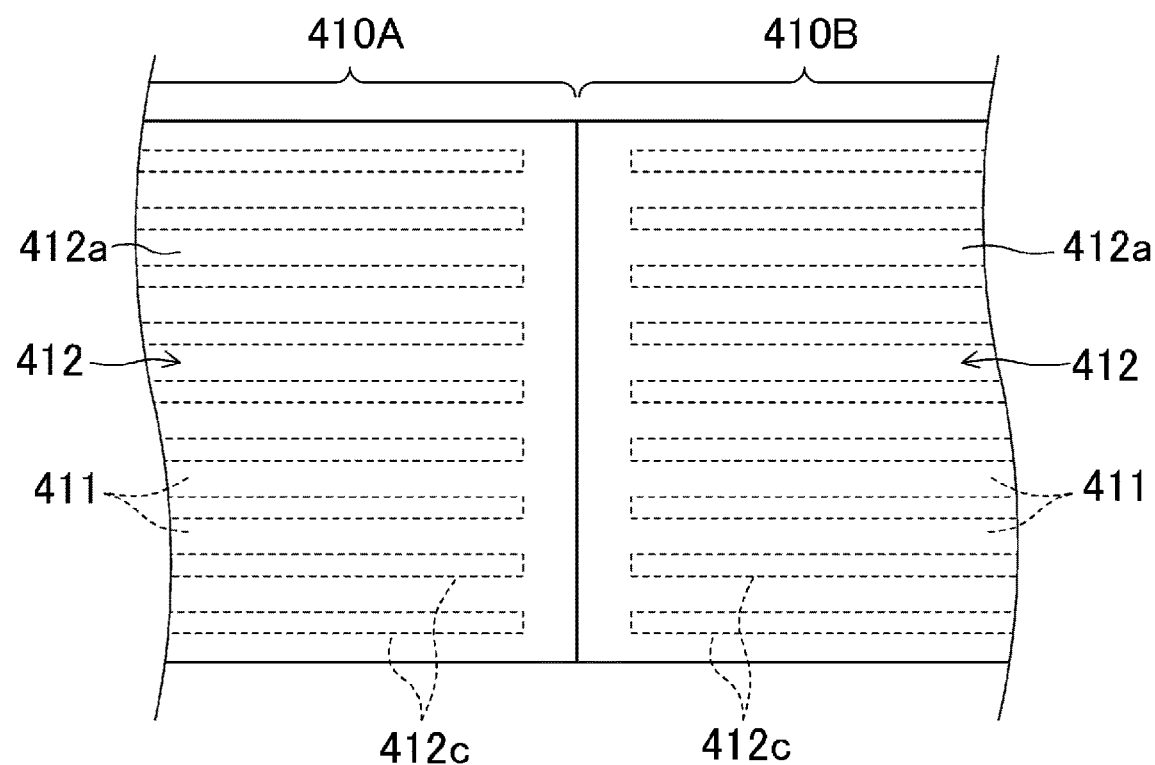
FIG. 23B is a plan view of a portion where the optical waveguides are connected to each other.

FIG. 23B is a plan view of the connecting portion between the two light projection optical waveguides 410A and 410B, and the two light projection optical waveguides 410A and 410B can be connected and used as illustrated in this drawing. As illustrated in the connecting portion located at the center in the left-right direction in FIG. 23B, the cladding 412 does not necessarily extend up to the vicinity of the interface. As the cores 411 abut against each other, the optical coupling sufficient to allow light to propagate can be obtained. Note that the cores 411 may abut against each other.

(Formation Examples of Optical Waveguides)

Figure 24:
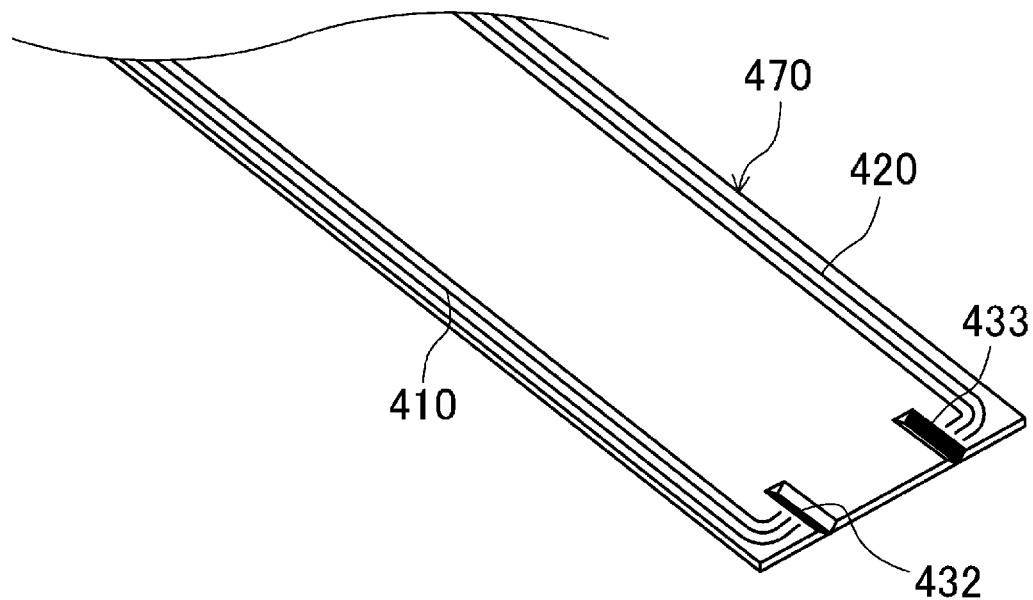
FIG. 24 is a perspective view illustrating a configuration example in which the light projection optical waveguide and the light reception optical waveguide are formed on a single member to realize definite reflection.

FIG. 24 illustrates a configuration example in which the light projection optical waveguide 410 and the light reception optical waveguide 420 are formed on a single optical waveguide forming member 470 to realize definite reflection. The light projection optical waveguide 410 and the light reception optical waveguide 420 are provided on both sides of the optical waveguide forming member 470 in the width direction, respectively.

Although not illustrated in this drawing, each of the light projection optical waveguide 410 and the light reception optical waveguide 420 is constituted by the cores and the cladding as illustrated in FIG. 8A and the like.

The distal side of the light projection optical waveguide 410 is bent in a direction approaching the light reception optical waveguide 420 on a distal side of the optical waveguide forming member 470. The light emitting mirror surface 432 is formed on the optical waveguide forming member 470 so as to correspond to the distal end of the light projection optical waveguide 410. As a result, the distal end of the light projection optical waveguide 410 serves as the light projecting end, and light is projected to the detection area R via the light emitting mirror surface 432.

In addition, the distal side of the light reception optical waveguide 420 is bent in a direction approaching the light projection optical waveguide 410 on the distal side of the optical waveguide forming member 470. The light incident mirror surface 433 is formed on the optical waveguide forming member 470 so as to correspond to the distal end of the light reception optical waveguide 420. As a result, the distal end of the light reception optical waveguide 420 serves as the light receiving end, and receives light from the detection area R via the light incident mirror surface 433. In this example, the light emitting mirror surface 432 and the light incident mirror surface 433 can be provided on the optical waveguide forming member 470 provided with the light projection optical waveguide 410 and the light reception optical waveguide 420 without providing the light extraction member 430 as a separate body. Thus, the relative positional deviation between the members does not occur, and a decrease in detection accuracy can be suppressed. This can also be said as the configuration in which the light extraction member is incorporated into and integrated with the light projection optical waveguide 410 and the light reception optical waveguide 420.

Figure 25:
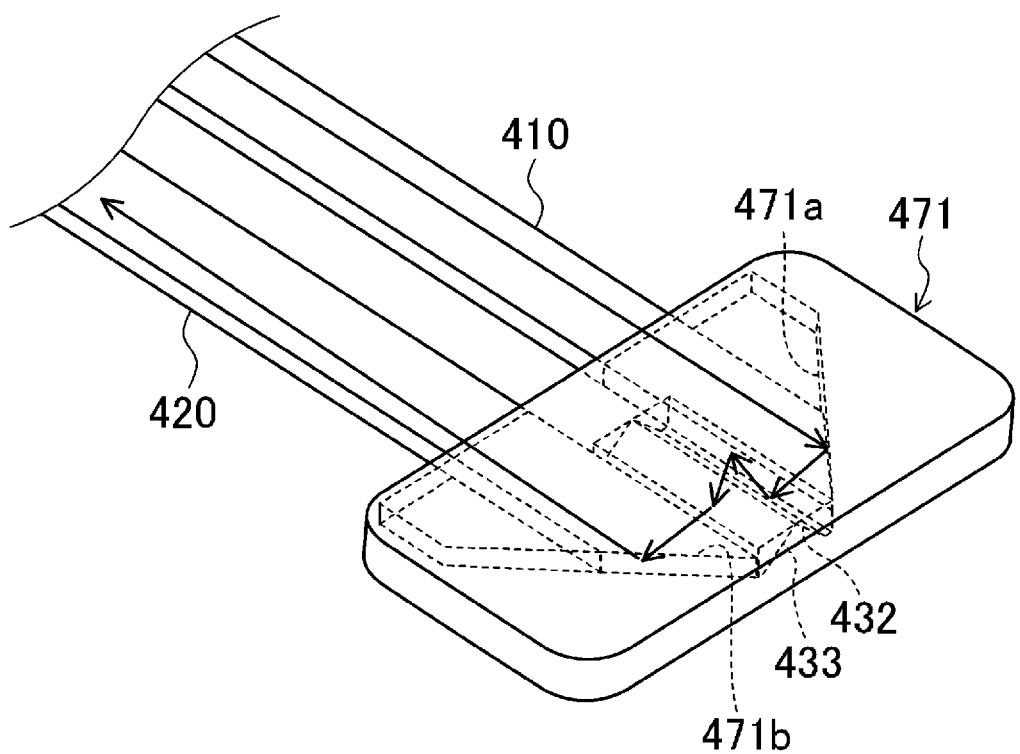
FIG. 25 is a perspective view illustrating a configuration example in which a reflector made of a separate member is provided at distal ends of the light projection optical waveguide and the light reception optical waveguide to realize the definite reflection.

FIG. 25 illustrates a configuration example in which a reflector 471 made of a separate member is provided at the distal ends of the light projection optical waveguide 410 and the light reception optical waveguide 420 to realize definite reflection. The reflector 471 is made of a resin material having a high light reflectance such as white, and allows the distal ends of the light projection optical waveguide 410 and the distal end of the light reception optical waveguide 420 to be inserted and held therein. The distal end of the light projection optical waveguide 410 is cut in a direction inclined with respect to the longitudinal direction of the light projection optical waveguide 410, and abuts against a first inner surface 471a of the reflector 471. Light traveling through the light projection optical waveguide 410 is reflected by the first inner surface 471a of the reflector 471, and its traveling direction is changed toward the light reception optical waveguide 420. The reflector 471 is provided with the light emitting mirror surface 432. When the light that has traveled through the light projection optical waveguide 410 is reflected by the first inner surface 471a of the reflector 471, the light reaches the light emitting mirror surface 432 and travels to the detection area R by the light emitting mirror surface 432.

In addition, the distal end of the light reception optical waveguide 420 is also cut in a direction inclined with respect to the longitudinal direction of the light reception optical waveguide 420, and abuts against a second inner surface 471b of the reflector 471. The reflector 471 is provided with the light incident mirror surface 433 to be adjacent to the light emitting mirror surface 432. Light from the detection area R is incident on the second inner surface 471b of the reflector 471 via the light incident mirror surface 433, is reflected by the second inner surface 471b, and is incident on the light reception optical waveguide 420. Since the distal ends of the light projection optical waveguide 410 and the light reception optical waveguide 420 can be held by the reflector 471 in this example, it is possible to suppress the relative positional deviation between the members.

Figure 26:
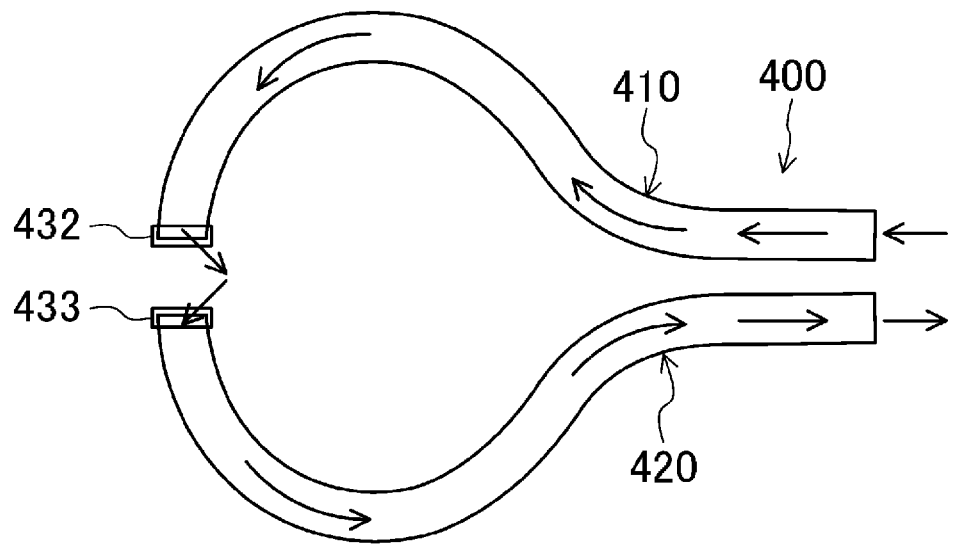
FIG. 26 is a plan view of the light detection unit illustrating an example of a pattern of the optical waveguides considering reduction of light loss.

FIG. 26 is a plan view of the light detection unit 400 illustrating an example of a pattern of the optical waveguides considering reduction of light loss. The vicinity of the distal side of the light projection optical waveguide 410 extends so as to be curved in the state of maintaining a large curvature, and the vicinity of the distal side of the light reception optical waveguide 420 also extends so as to be curved in the state of maintaining a large curvature. The width of the light detection unit 400 becomes wider by increasing the curvatures of the light projection optical waveguide 410 and the light reception optical waveguide 420, but the light loss can be reduced using the pattern with the large curvatures as in this example when the layout of the light detection unit 400 allows the wide width of the light detection unit 400.

Figure 27A:
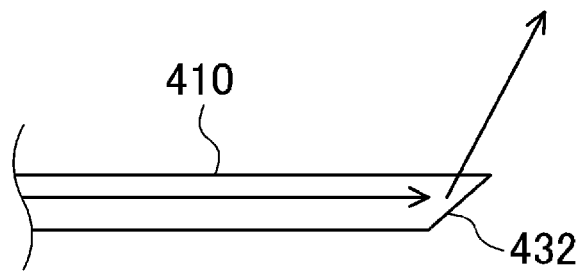
FIG. 27A is a view illustrating an example in which a light emitting mirror surface is provided on a distal end surface of the light projection optical waveguide.

As illustrated in FIG. 27A, the light emitting mirror surface 432 can be provided at the distal end of the light projection optical waveguide 410. Similarly, the light incident mirror surface 433 can be provided at the distal end of the light reception optical waveguide 420 (see FIG. 26).

Figure 27B:
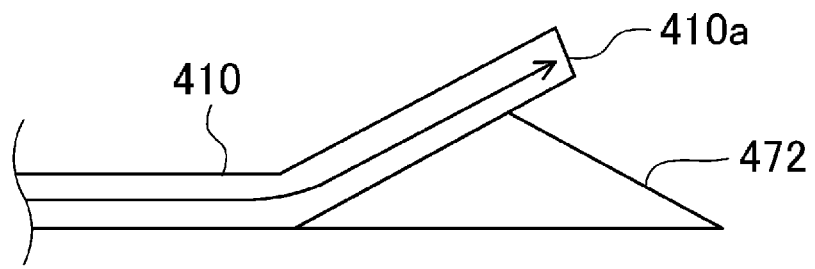
FIG. 27B is a view illustrating an example in which a direction of the distal end surface of the light projection optical waveguide is set by a direction setting member.

When a direction of the distal end surface 410a of the light projection optical waveguide 410 is set by a direction setting member 472 as illustrated in FIG. 27B, a light emission direction can be set to a direction in which definite reflection is possible. Similarly, the light incident side can be set by a direction setting member (not illustrated).

Figure 28:
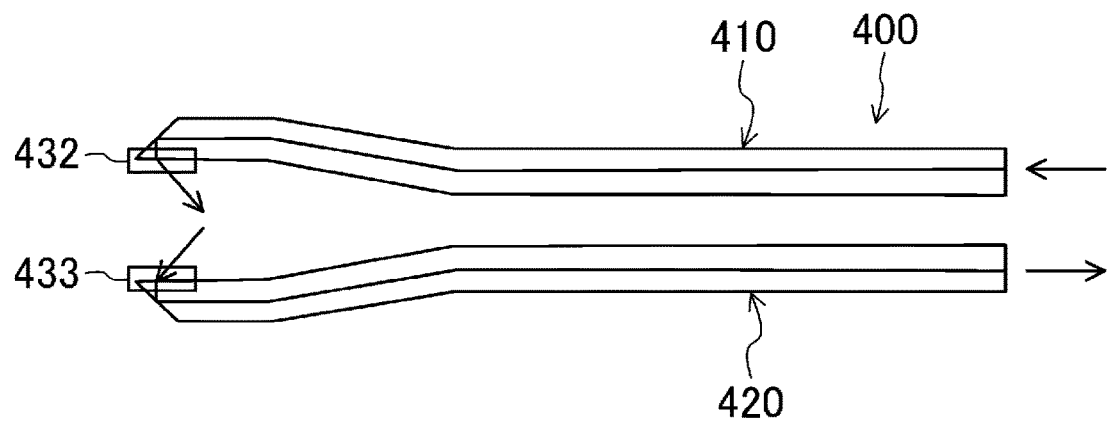
FIG. 28 is a plan view of the light detection unit illustrating an example of a pattern of the optical waveguides in which an outer size is prioritized.

FIG. 28 is a plan view of the light detection unit 400 illustrating an example of a pattern of the optical waveguides in which an outer size is prioritized. The vicinity of the distal side of the light projection optical waveguide 410 extends in a direction away from the light reception optical waveguide 420, and the vicinity of the distal side of the light reception optical waveguide 420 extends in a direction away from the light projection optical waveguide 410, but a distance between the vicinity of the distal side of the light projection optical waveguide 410 and the vicinity of the distal side of the light reception optical waveguide 420 is set to be shorter than that in the example illustrated in FIG. 26. As a result, the width of the light detection unit 400 can be narrowed, which can support a case where the width of an installation place is narrow. The light emitting mirror surface 432 can be provided at the distal end of the light projection optical waveguide 410, and the light incident mirror surface 433 can be provided at the distal end of the light reception optical waveguide 420. The configurations illustrated in FIGS. 27A and 27B can also be applied to the example illustrated in FIG. 28.

Figure 29:
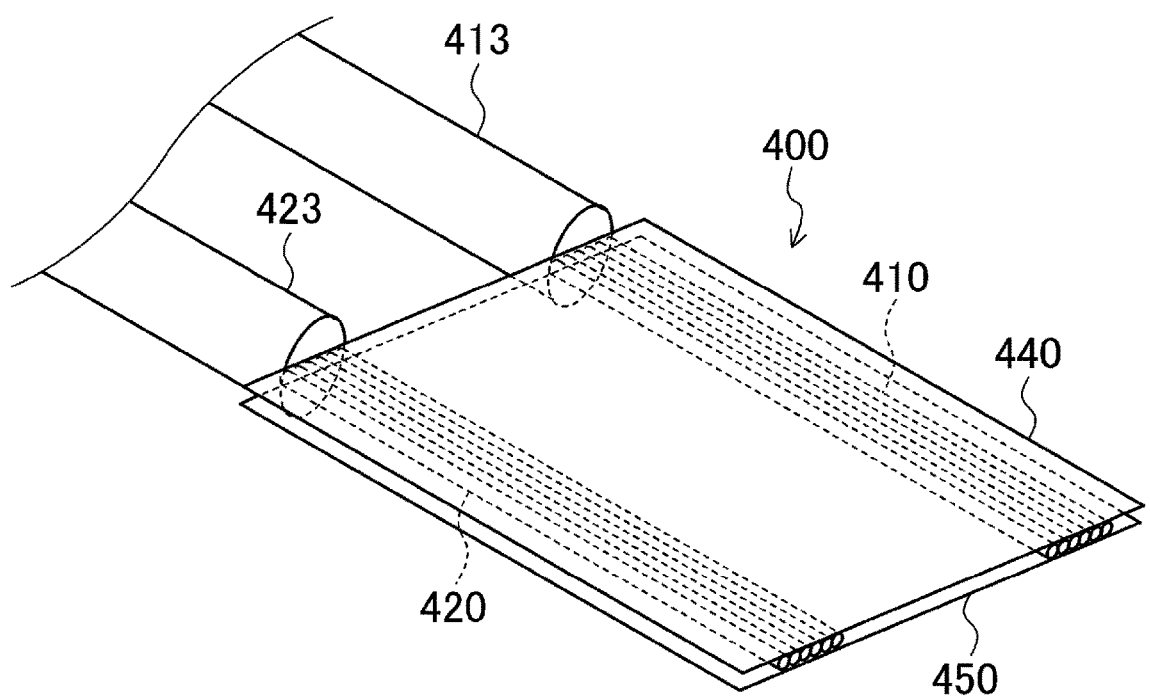
FIG. 29 is a perspective view illustrating an example in which the light projection optical waveguide and the light reception optical waveguide are configured by arraying a plurality of optical fibers in a horizontal direction.

FIG. 29 illustrates an example in which each of the light projection optical waveguide 410 and the light reception optical waveguide 420 is configured by arraying a plurality of optical fibers in the horizontal direction. That is, the light projection optical waveguide 410 is configured using a bundled optical fiber 413 in which a plurality of optical fiber lines are bundled, and the light projection optical waveguide 410 is formed by arraying the optical fiber lines of the bundled optical fiber 413 in the horizontal direction. The light reception optical waveguide 420 is also configured using a bundled optical fiber 423, and the light reception optical waveguide 420 is formed by arraying the optical fiber lines of the bundled optical fiber 423 in the horizontal direction. The optical fiber lines of the light projection optical waveguide 410 and the optical fiber lines of the light reception optical waveguide 420 are covered by the upper cover member 440 and the lower cover member 450. Although not illustrated, the cover member 440 and the lower cover member 450 can be attached and fixed at the ends of the upper cover member 440 and the lower cover member 450 in the horizontal direction of FIG. 29 which sandwich the light projection optical waveguide 410 and the light reception optical waveguide 420 from above and below.

Figure 30:
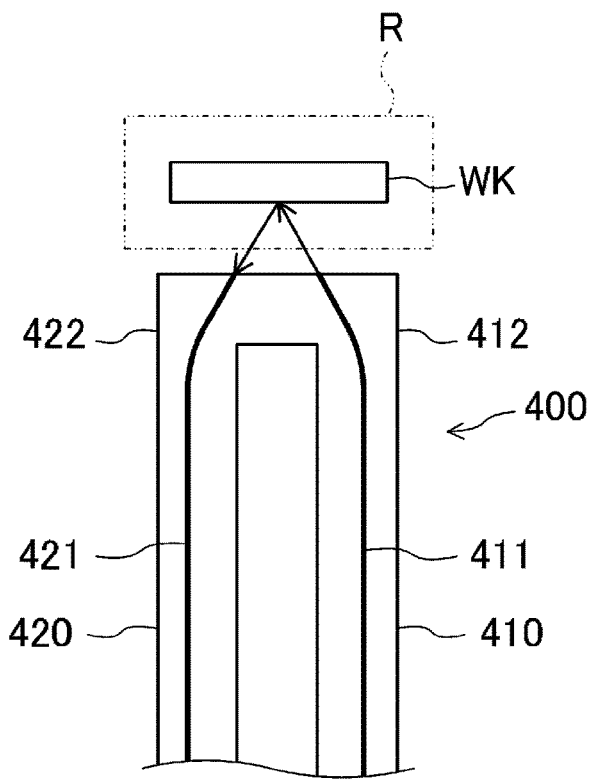
FIG. 30 is a plan view illustrating an example of definite reflection in which light is emitted from the distal end of the optical waveguide.

FIG. 30 illustrates an example of definite reflection in which light is emitted from the distal end of the optical waveguide. In this example, the core 411 of the light projection optical waveguide 410 reaches the distal end of the light projection optical waveguide 410, and the core 421 of the light reception optical waveguide 420 reaches the distal end of the light reception optical waveguide 420. Therefore, light can be emitted from the distal end of the light projection optical waveguide 410 in the longitudinal direction of the light projection optical waveguide 410 to irradiate the workpiece WK. The light from the detection area R can be incident on the distal end of the light reception optical waveguide 420.

In the example illustrated in FIG. 5, light is emitted from the main surface of the light projection optical waveguide 410 to the detection area, and the light reflected by the workpiece WK is received by the main surface of the light reception optical waveguide 420. In the example illustrated in FIG. 30, however, the end surface (side surface) on the distal side of the light projection optical waveguide 410 serves as a light projecting surface, and the end surface (side surface) on the distal side of the light reception optical waveguide 420 serves as the light receiving surface. In this manner, portions other than the main surfaces of the light projection optical waveguide 410 and the light reception optical waveguide 420 can be used as the light projecting and receiving surfaces.

In addition, as illustrated in FIGS. 24, 26, 28, and 30, a core pattern can be freely drawn within a plane in addition to the linear pattern in the optical waveguides 410 and 420, and the degree of freedom in designing an optical path in the optical waveguides 410 and 420 is high.

Figure 31:
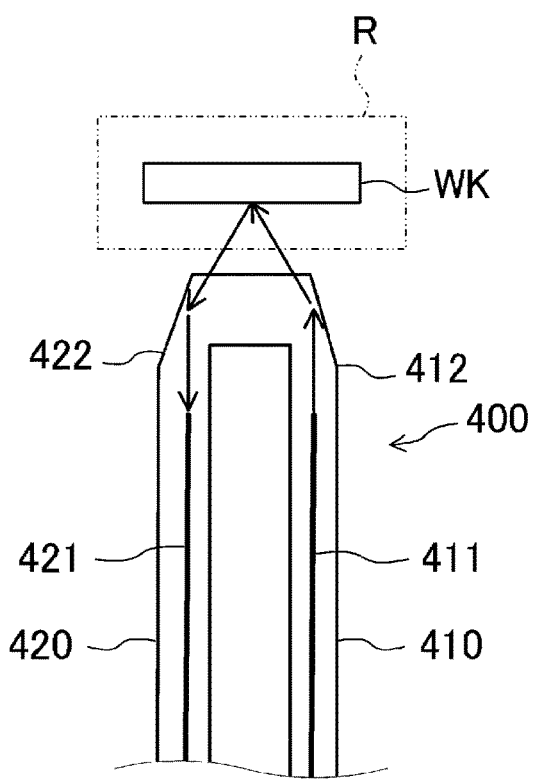
FIG. 31 is a plan view illustrating another example of definite reflection in which light is emitted from the distal end of the optical waveguide.

FIG. 31 illustrates another example of definite reflection in which light is emitted from the distal end of the optical waveguide. In this example, light traveling through the core 411 of the light projection optical waveguide 410 can be emitted from the distal end of the light projection optical waveguide 410 in the longitudinal direction of the light projection optical waveguide 410 to irradiate the workpiece WK. The light from the detection area R can be incident on the distal end of the light reception optical waveguide 420. The example illustrated in FIG. 31 has the same optical path as in FIG. 30, but is not the pattern in the optical waveguide, and can change an optical path using a difference in refractive index between the optical waveguide and the outside by diagonally cutting the side surface of the optical waveguide.

Figure 32:
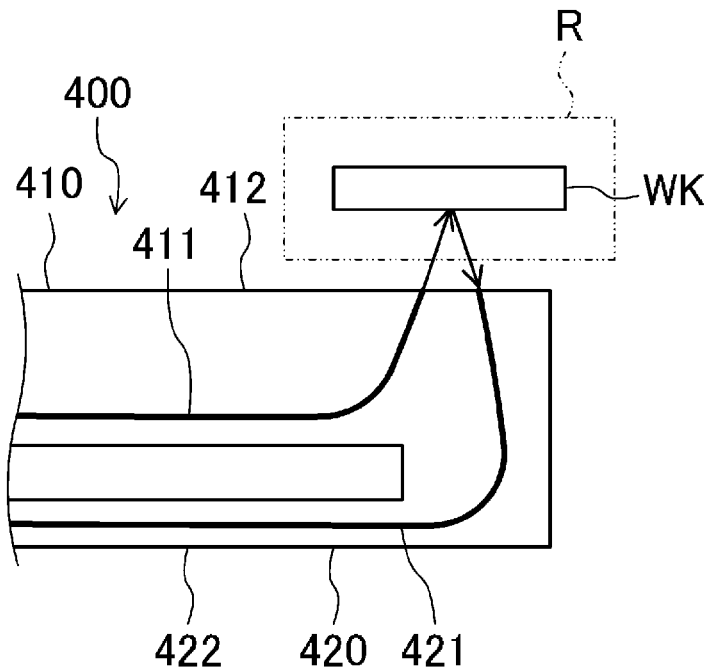
FIG. 32 is a plan view illustrating an example of definite reflection in which light is emitted from a side surface of the optical waveguide.

As illustrated in FIG. 32, light can be emitted from and incident on the side surface of the optical waveguide. In this example, the light traveling through the core 411 of the light projection optical waveguide 410 can irradiate the workpiece WK from the side surface of the light projection optical waveguide 410. Similarly, the light from the detection area R can be incident on the light reception optical waveguide 420 from the side surface. This can be realized by formation pattern of the cores 411 and 412.

Figure 33:
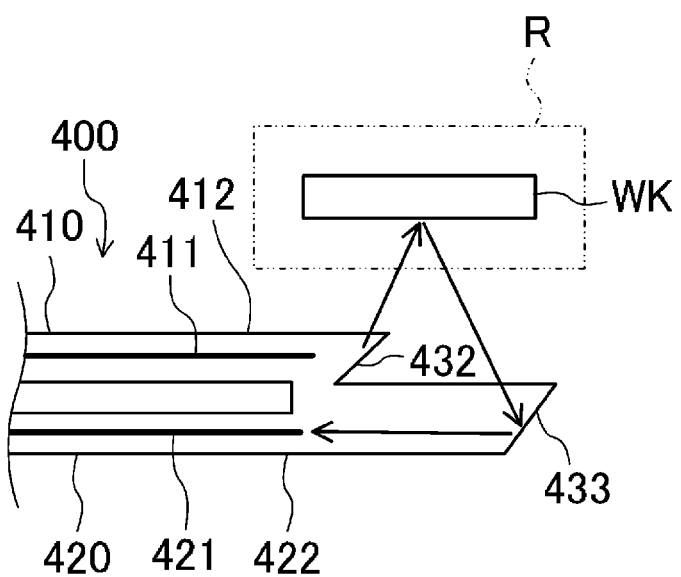
FIG. 33 is a plan view illustrating another example of the definite reflection in which light is emitted from a side surface of the optical waveguide.

FIG. 33 illustrates another example of definite reflection in which light is emitted from the side surface of the optical waveguide. As the light emitting mirror surface 432 is provided at the distal end of the light projection optical waveguide 410, the workpiece WK can be irradiated with light from the side surface of the light projection optical waveguide 410. As the light incident mirror surface 433 is provided at the distal end of the light reception optical waveguide 420, the light from the detection area R can be incident on the light reception optical waveguide 420 from the side surface. In this example, the formation pattern of the cores 411 and 412 may remain linear.

Figure 34:
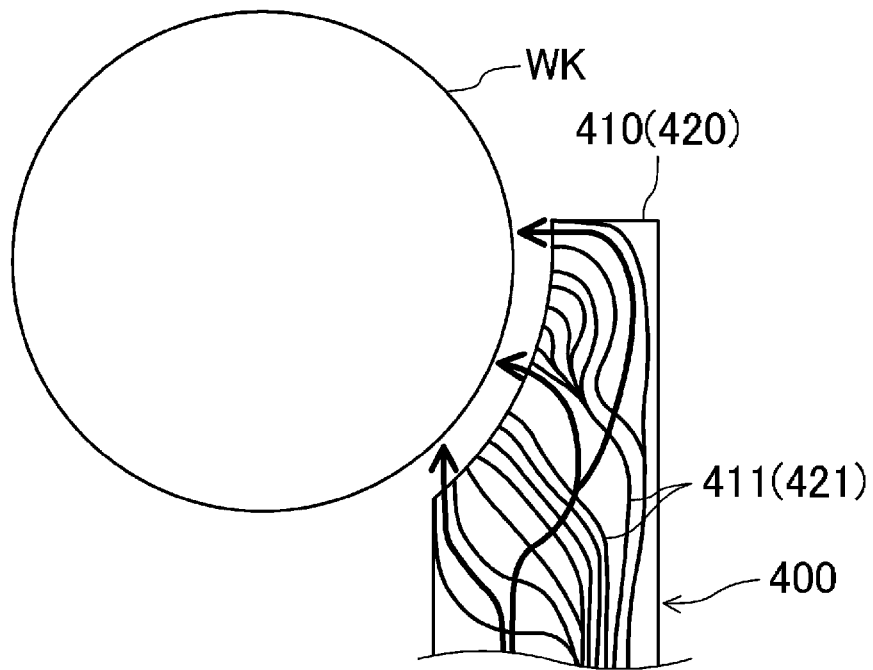
FIG. 34 is a plan view illustrating an example of using as a multi-point reflective light detection unit.

FIG. 34 illustrates an example of using the light detection unit 400 as a multi-point reflective light detection unit. The cores 411 (421) capable of projecting light in multiple directions and receiving light from multiple directions are formed in the light detection unit 400. As a result, light is emitted from the distal end of the light detection unit 400 in multiple directions, and the light from the multiple directions can be received at the distal end of the light detection unit 400, and thus, the detection accuracy can be improved by reducing the influence of irregularities, for example, even if the surface of the workpiece WK has the irregularities or the like.

Figure 35:
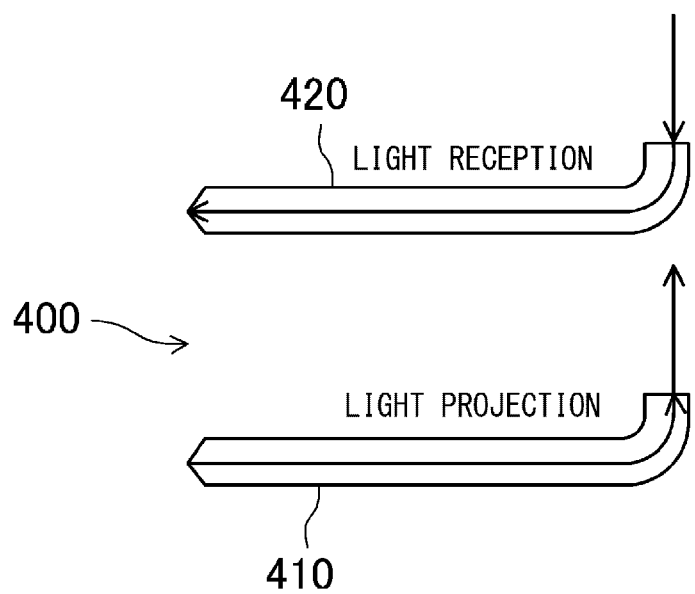
FIG. 35 is a view illustrating an example in which the distal ends of the optical waveguides are bent.

As illustrated in FIG. 35, the distal end of the light projection optical waveguide 410 and the distal end of the light reception optical waveguide 420 of the light detection unit 400 may be bent. As a result, light of the light projection optical waveguide 410 can be emitted in the bent direction, and light from the detection area R can be received from the direction in which the light reception optical waveguide 420 is bent. In addition, the bending is also achieved using the core pattern within the plane without bending the distal end of the light projection optical waveguide 410 and the distal end of the light reception optical waveguide 420.

Figure 36A:
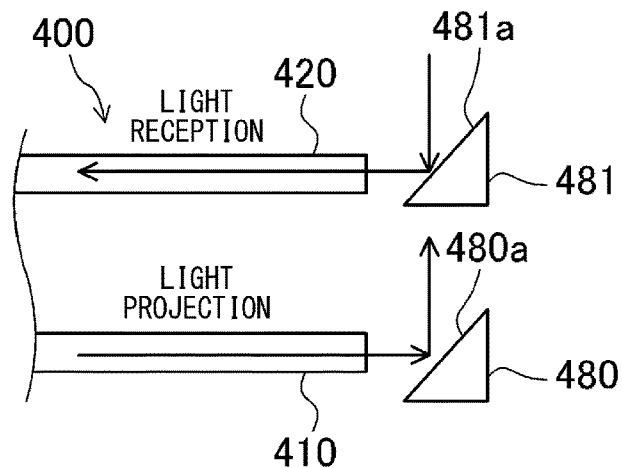
FIG. 36A is a view illustrating an example in which the optical waveguides and mirror members are combined.

FIG. 36A illustrates an example of combining the optical waveguides and mirror members. A light projection mirror member 480 is arranged so as to face the distal end of the light projection optical waveguide 410. A light emitting mirror surface 480*a* is formed on the light projection mirror member 480, and light can be emitted above the light projection optical waveguide 410 by the light emitting mirror surface 480*a*. In addition, a light reception mirror member 481 is arranged so as to face the distal end of the light reception optical waveguide 420. A light incident mirror surface 481*a* is formed on the light reception mirror member 481, and light can be incident from above the light reception optical waveguide 420 by the light incident mirror surface 481*a*.

Figure 36B:
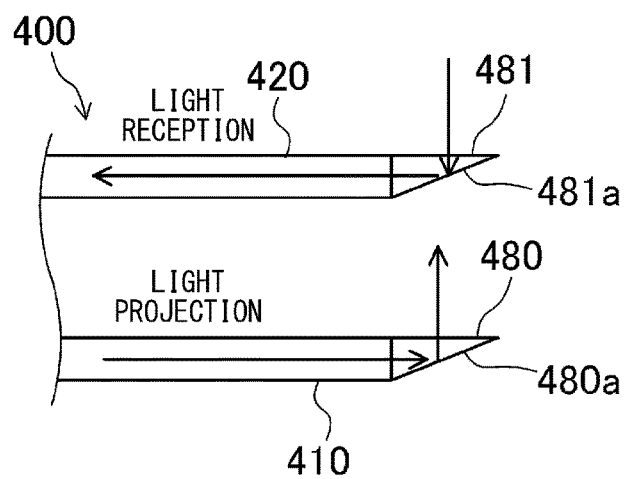
FIG. 36B is a view illustrating another example in which the optical waveguides and the mirror members are combined.

FIG. 36B illustrates another example of combining the optical waveguides and the mirror members. The distal end of the light projection optical waveguide 410 and the light projection mirror member 480 are arranged to abut against each other. Even with this configuration, light can be emitted above the light projection optical waveguide 410 by the light emitting mirror surface 480*a*. In addition, the distal end of the light reception optical waveguide 420 and the light reception mirror member 481 are arranged to abut against each other. Even with this configuration, light can be incident from above the light reception optical waveguide 420.

Figure 37:
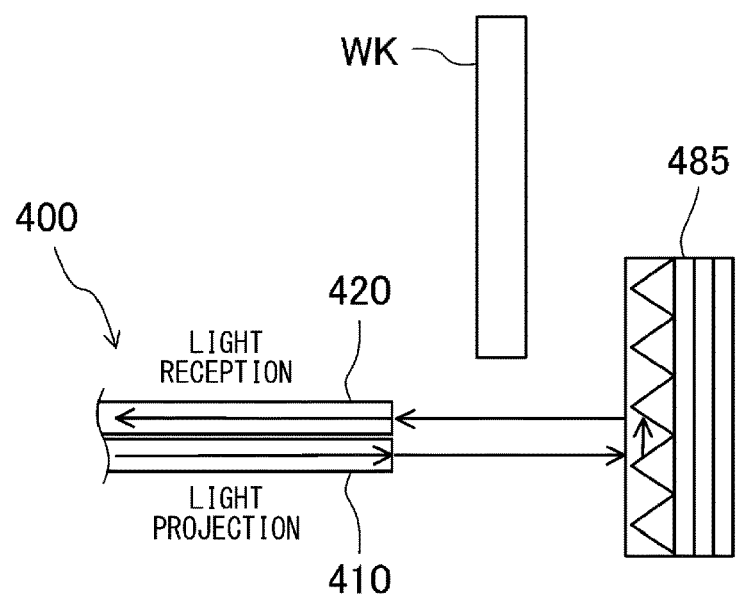
FIG. 37 is a view illustrating an example of installing a regressive reflection plate.

FIG. 37 illustrates an example of irradiating a regressive reflection plate 485 with light emitted from the light projection optical waveguide 410. In this example, the light reflected from the regressive reflection plate 485 can be received at the distal end of the light reception optical waveguide 420. When the workpiece WK exists between the regressive reflection plate 485, and the light projection optical waveguide 410 and the light reception optical waveguide 420, the light is shielded by the workpiece WK so that it is difficult for the light reception optical waveguide 420 to receive the light. This example can be applied to a detection method utilizing this.

(Transmissive Light Detection Unit)

Although the case has been mainly described in the above example where the aspect is applied to the detection method using the definite reflection, but the aspect can also be used as the transmissive light detection unit 400.

Figure 38A:
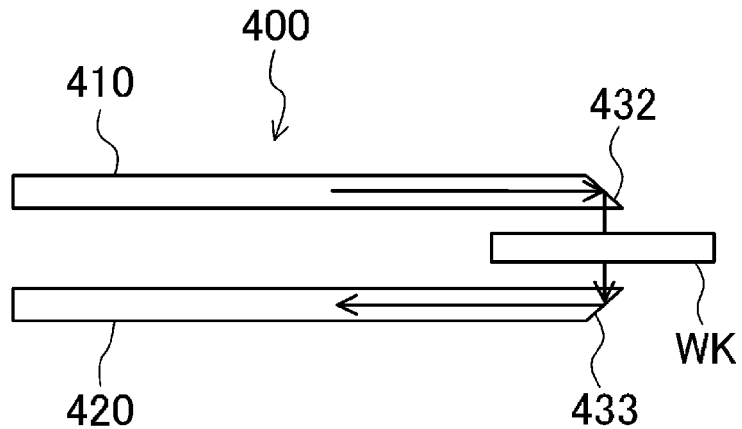
FIG. 38A is a view illustrating an example of a transmissive light detection unit in a case where the light projection optical waveguide and the light reception optical waveguide extend in the same direction.

FIG. 38A illustrates an example of the transmissive light detection unit 400 in a case where the light projection optical waveguide 410 and the light reception optical waveguide 420 extend in the same direction. A direction of light traveling through the light projection optical waveguide 410 is converted toward the light reception optical waveguide 420 by the light emitting mirror surface 432 provided at the distal end of the light projection optical waveguide 410. The light emitted from the light projection optical waveguide 410 is received by the light reception optical waveguide 420, and the direction thereof is converted by the light incident mirror surface 433 to travel through the light reception optical waveguide 420.

Figure 38B:
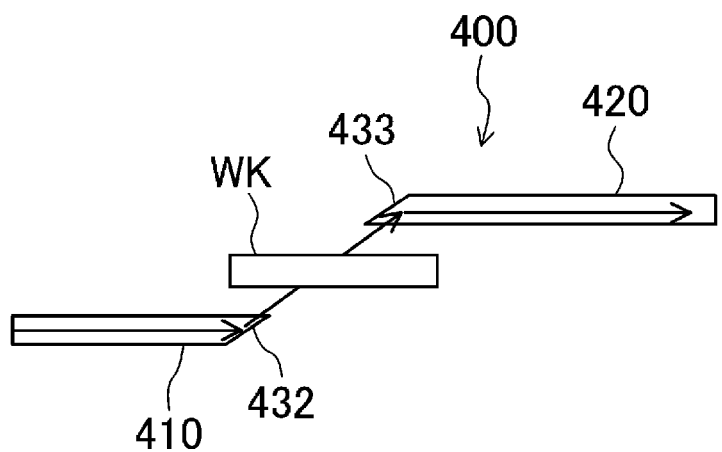
FIG. 38B is a view illustrating an example of the transmissive light detection unit in a case where the light projection optical waveguide and the light reception optical waveguide extend in opposite directions.

FIG. 38B illustrates an example of the transmissive light detection unit 400 in a case where the light projection optical waveguide 410 and the light reception optical waveguide 420 extend in opposite directions. As in this example, a reflection angle of light traveling through the light projection optical waveguide 410 can be set by the light emitting mirror surface 432. As a result, the workpiece WK can be detected even if the light projection optical waveguide 410 and the light reception optical waveguide 420 are arranged so as to extend in opposite directions.

Figure 39:
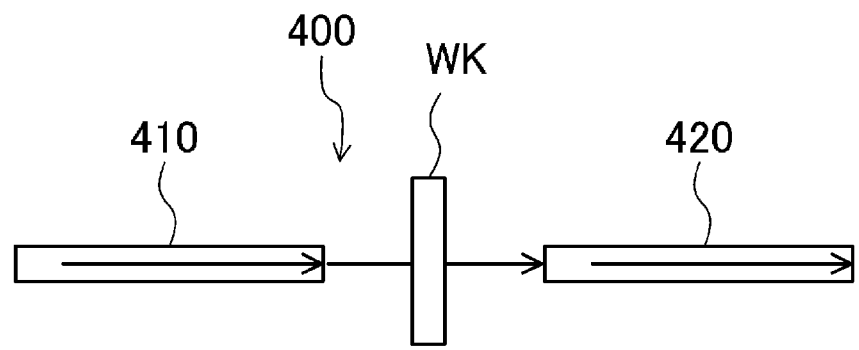
FIG. 39 is a view illustrating an example of the transmissive light detection unit in a case where a distal end of the light projection optical waveguide and a distal end of the light reception optical waveguide face each other.

FIG. 39 illustrates an example in which the distal end of the light projection optical waveguide 410 and the distal end of the light reception optical waveguide 420 face each other. As in this example, the distal end of the light projection optical waveguide 410 and the distal end of the light reception optical waveguide 420 can be arranged with a predetermined interval from each other, and the light emitted from the distal end of the light projection optical waveguide 410 can be received by the distal end of the light reception optical waveguide 420. In this case, the workpiece WK between the distal end of the light projection optical waveguide 410 and the distal end of the light reception optical waveguide 420 can be detected.

Figure 40:
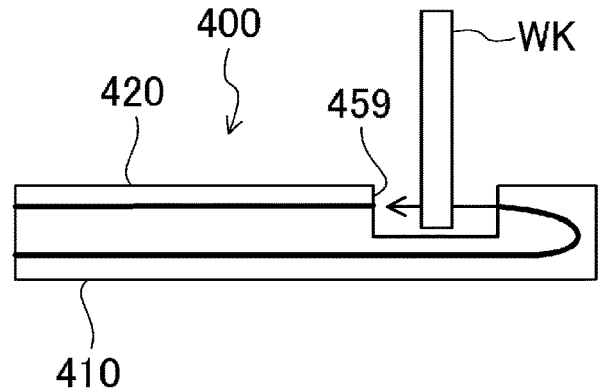
FIG. 40 is a view illustrating an example of the transmissive light detection unit in a case where a workpiece is detected in the light detection unit.

FIG. 40 illustrates an example of detecting the workpiece WK in the light detection unit 400. The light detection unit 400 is provided with an inserting section 459 for the workpiece WK formed of a concave portion or a hole portion. Light that has traveled through the light projection optical waveguide 410 can be projected into the inserting section 459 and can be received at the distal end of the light reception optical waveguide 420. When the workpiece WK is inserted into the inserting section 459, the light projected from the light projection optical waveguide 410 is shielded.

Figure 41:
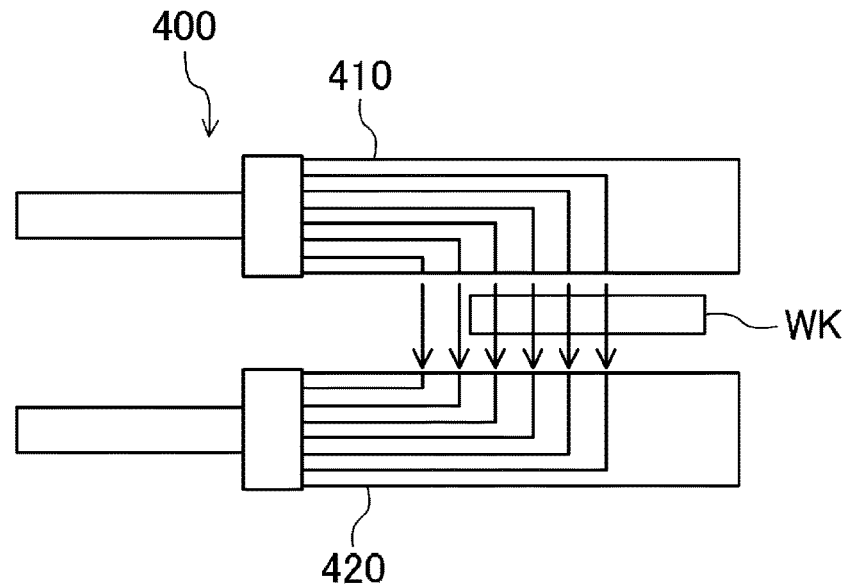
FIG. 41 is a view illustrating an example of the transmissive light detection unit in which a large number of optical paths are formed.
Figure 42:
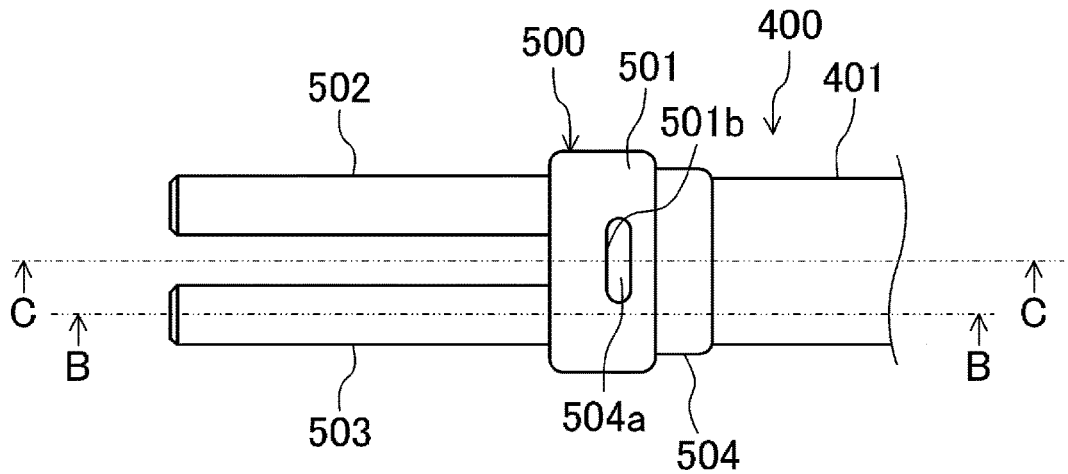
FIG. 42 is a plan view of a connector section according to a first example.
Figure 43:
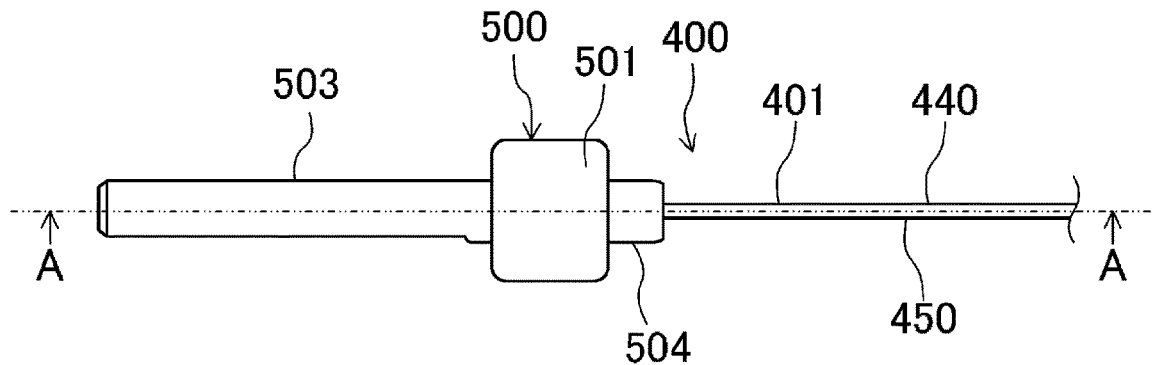
FIG. 43 is a side view of the connector section according to the first example.

FIG. 41 illustrates an example of the transmissive light detection unit 400 in which a large number of optical paths are formed. Light is projected from the distal end of the light projection optical waveguide 410 so as to form a large number of optical paths. In response, the distal end of the light reception optical waveguide 420 can receive light from the large number of optical paths. In this example, a detection range can be widened.

(Connector Section 500)

The mode illustrated in FIG. 4 is the mode including the connector section 500, and illustrates a state before the connector section 500 is connected to the light projection optical waveguide 410 and the light reception optical waveguide 420. The connector section 500 is a member which is connected with the proximal end of the light projection optical waveguide 410 and the proximal end of the light reception optical waveguide 420. The connector section 500 is a member that optically connects the proximal end of the light projection optical waveguide 410 and the proximal end of the light reception optical waveguide 420 to the light projection hole 376 and the light reception hole 378 of the optical sensor 1, respectively, in a direct or indirect manner, and is detachably attached to the light projection hole 376 and the light reception hole 378. A material forming the connector section 500 may be, for example, a resin material, and a color of the resin material is preferably a color that does not transmit light or a color that hardly transmits light.

The connector section 500 according to a first example of the present embodiment illustrated in FIGS. 42 to 46 has a body portion 501 and a light-projection-side convex portion 502 and a light-reception-side convex portion 503 that protrude from the body portion 501, and the light projection optical waveguide 410 and the light reception optical waveguide 420 can be integrated by the connector section 500. The light-projection-side convex portion 502 and the light-reception-side convex portion 503 are portions which are inserted into the light projection hole 376 and the light reception hole 378 (illustrated in FIG. 3) of the optical sensor 1, respectively. Therefore, an interval between the light-projection-side convex portion 502 and the light-reception-side convex portion 503 substantially coincides with an interval between the light projection hole 376 and the light reception hole 378 of the optical sensor 1.

A cross section of the light-projection-side convex portion 502 is a substantially circular shape surrounding the light projection optical waveguide 410, and substantially coincides with a cross section of the light projection hole 376 of the optical sensor 1. An outer diameter of the light-projection-side convex portion 502 is set to be larger than a thickness dimension of the light projection optical waveguide 410. In addition, the outer diameter of the light-projection-side convex portion 502 can be set to be slightly smaller than that of the light projection hole 376 of the optical sensor 1, but a gap formed therebetween is small in a state where the light-projection-side convex portion 502 is inserted into the light projection hole 376. As a result, the light-projection-side convex portion 502 is positioned in the radial direction. In addition, the length of the light-projection-side convex portion 502 corresponds to the depth of the light projection hole 376 such that a distal end surface of the light-projection-side convex portion 502 is in contact with or close to an end surface of the reflector 380 illustrated in FIG. 3 in the state where the light-projection-side convex portion 502 is inserted into the light projection hole 376. The insertion depth of the light-projection-side convex portion 502 can be defined by bringing the distal end surface of the light-projection-side convex portion 502 into contact with the end surface of the reflector 380. The insertion depth of the light-projection-side convex portion 502 can also be defined by pressing the body portion 501 against a part of the optical sensor 1.

The light-reception-side convex portion 503 is also configured in the same manner as the light-projection-side convex portion 502, and has a substantially circular shape surrounding the light reception optical waveguide 420. The light-reception-side convex portion 503 is positioned in the radial direction and the insertion direction in the state of being inserted into the light reception hole 378 of the optical sensor 1.

Figure 44:
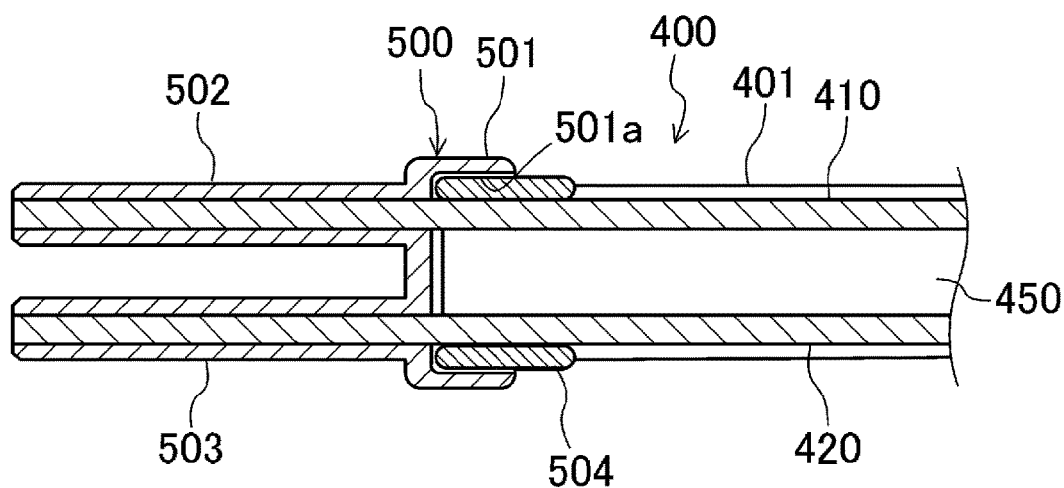
FIG. 44 is a cross-sectional view taken along line A-A in FIG. 43.
Figure 45:
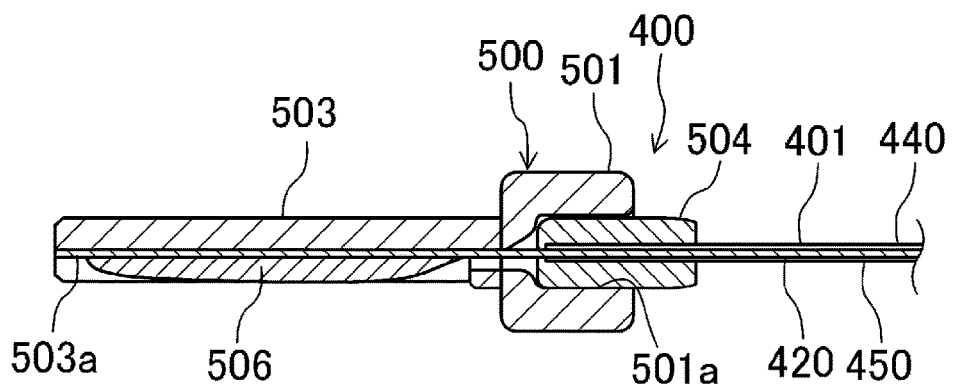
FIG. 45 is a cross-sectional view taken along line B-B in FIG. 42.
Figure 46:
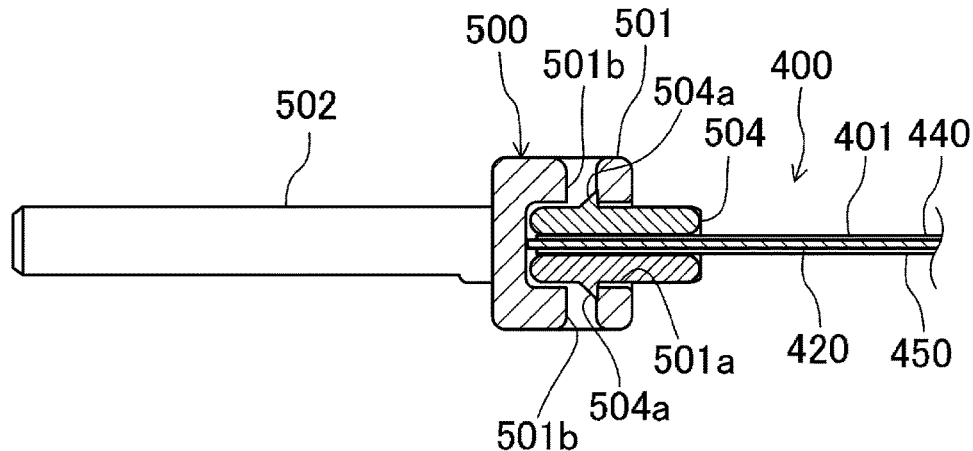
FIG. 46 is a cross-sectional view taken along line C-C in FIG. 43.

As illustrated in FIG. 44, the body portion 501 is formed with a light guide section insertion hole 501a into which a proximal end of the light guide section 401 is inserted. An elastic material 504 made of rubber, an elastomer, or the like is provided between the proximal end of the light guide section 401 and an inner surface of the light guide section insertion hole 501a. The elastic material 504 is formed so as to cover an outer peripheral surface of the proximal end of the light guide section 401. A plurality of engaging protrusions 504a are formed on the elastic material 504. The body portion 501 is formed with engaging holes 501b with which the engaging protrusions 504a of the elastic material 504 are engaged. The elastic material 504 is prevented from coming off from the body portion 501 in a state where the engaging protrusions 504a of the elastic material 504 are engaged with the engaging holes 501b of the body portion 501. Note that the elastic material 504 may be omitted.

Figure 47:
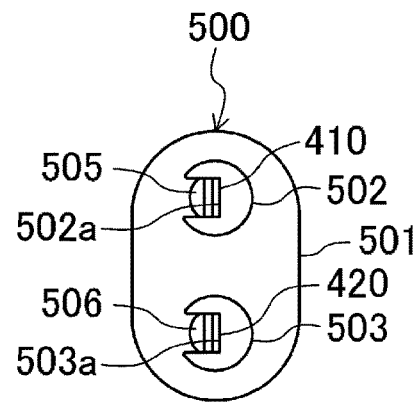
FIG. 47 is a view of the connector section according to the first example as viewed from a distal side.

The light projection optical waveguide 410 of the light guide section 401 passes through the inside of the light-projection-side convex portion 502. As in the first example illustrated in FIG. 47, the distal end of the light projection optical waveguide 410 reaches the distal end surface of the light-projection-side convex portion 502 and is exposed to the distal end surface. The distal end of the light projection optical waveguide 410 and the distal end surface of the light-projection-side convex portion 502 may be flush with each other, or the distal end of the light projection optical waveguide 410 may be recessed from the distal end surface of the light-projection-side convex portion 502. When being recessed, the distal end of the light projection optical waveguide 410 can be prevented from being damaged. In addition, when being recessed, the distal end of the light projection optical waveguide 410 preferably has a distance from the distal end surface of the light-projection-side convex portion 502 set to 0.5 mm or less. This aims to suppress a decrease in the amount of light.

Figure 48:
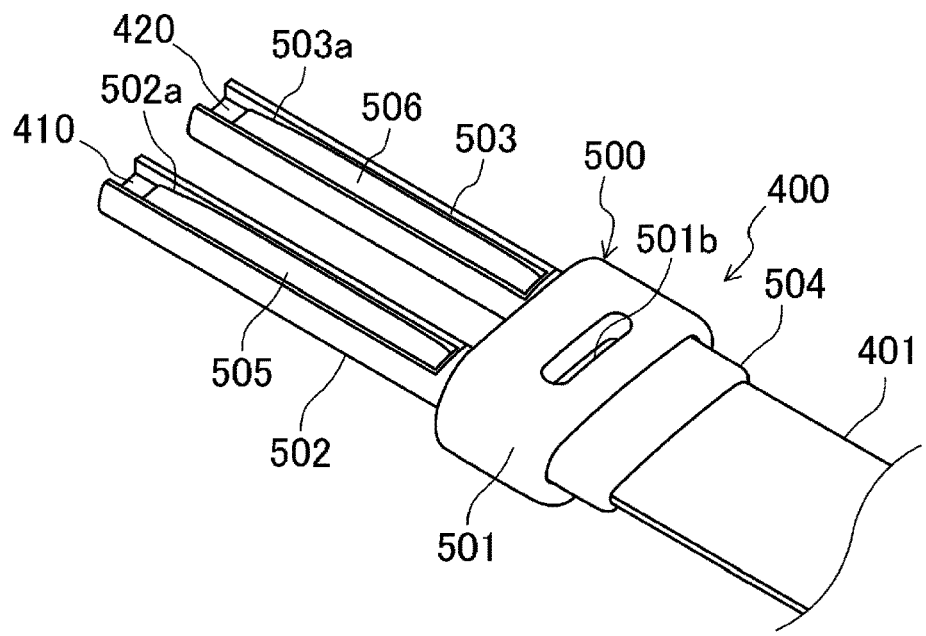
FIG. 48 is a perspective view of the connector section according to the first example as viewed from a side where a pressing member is arranged.

As illustrated in FIG. 48, the light-projection-side convex portion 502 is formed with a concave light-projection-side accommodating portion 502a that accommodates the light projection optical waveguide 410. The light-projection-side accommodating portion 502a is open on an outer peripheral surface of the light-projection-side convex portion 502. The light-projection-side accommodating portion 502a is provided with a pressing member 505 configured to press down and hold the light projection optical waveguide 410. The pressing member 505 engages with an inner surface of the light-projection-side accommodating portion 502a and is held in a predetermined position. As a result, a relative position of the light projection optical waveguide 410 with respect to the light-projection-side convex portion 502 is determined. Therefore, the distal end of the light projection optical waveguide 410 is positioned at the center position of the light emitting surface of the light emitting element 104 illustrated in FIG. 3 in the state where the light-projection-side convex portion 502 is inserted into the light projection hole 376 of the optical sensor 1. The pressing member 505 may be omitted, and the light projection optical waveguide 410 may be attached to the inner surface of the light-projection-side accommodating portion 502a.

In addition, the light-reception-side convex portion 503 is formed with a concave light-projection-side accommodating portion 503a that accommodates the light reception optical waveguide 420. The light-reception-side accommodating portion 503a is open on an outer peripheral surface of the light-reception-side convex portion 503. The light-reception-side accommodating portion 503a is provided with a pressing member 506 configured to press down and hold the light reception optical waveguide 420. The pressing member 506 engages with an inner surface of the light-reception-side accommodating portion 503a and is held in a predetermined position. As a result, a relative position of the light reception optical waveguide 420 with respect to the light-reception-side convex portion 503 is determined. Therefore, the distal end of the light reception optical waveguide 420 is positioned at the center position of the light receiving surface of the light receiving element 204 illustrated in FIG. 3 in the state where the light-reception-side convex portion 503 is inserted into the light reception hole 378 of the optical sensor 1.

Figure 49:
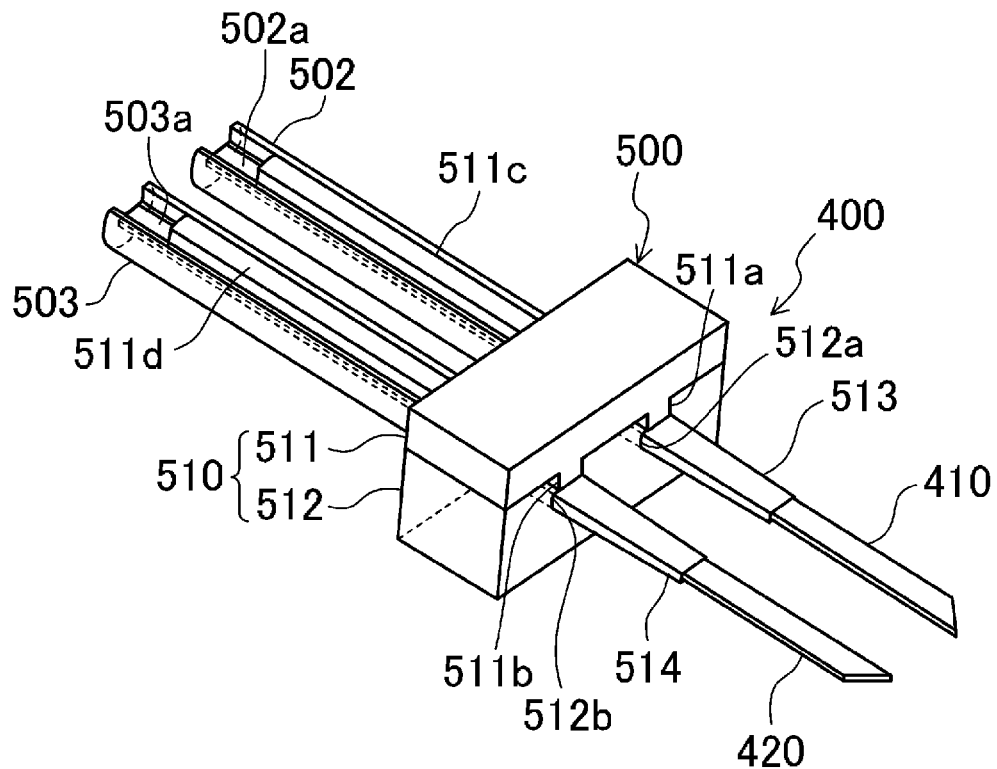
FIG. 49 is a perspective view of a connector section according to a second example.

FIG. 49 illustrates the connector section 500 according to a second example of the present embodiment. A body portion 510 of the connector section 500 of the second example is constituted by an upper member 511 and a lower member 512. The upper member 511 and the lower member 512 may be integrated with a screw or the like, or may be integrated with an adhesive or the like.

The lower member 512 is formed with a first groove 512a that holds the light projection optical waveguide 410 protected by a protective elastic material 513 and a second groove 512b that holds the light reception optical waveguide 420 protected by a protective elastic material 514. The upper member 511 is formed with a first fitting portion 511a that fits into the first groove 512a and a second fitting portion 511b that fits into the second groove 512b. The light projection optical waveguide 410 can be sandwiched and held between a distal end surface of the first fitting portion 511a and a bottom surface of the first groove 512a by fitting the first fitting portion 511a into the first groove 512a, and the light reception optical waveguide 420 can be sandwiched and held between a distal end surface of the second fitting portion 511b and a bottom surface of the second groove 512b by fitting the second fitting portion 511b into the second groove 512b.

In addition, the upper member 511 is formed with a third fitting portion 511c which fits into the light-projection-side accommodating portion 502a and a fourth fitting portion 511d which fits into the light-projection-side accommodating portion 503a. The third fitting portion 511c and the fourth fitting portion 511d are portions that replace the pressing members 505 and 506 of the first example, and the light projection optical waveguide 410 and the light reception optical waveguide 420 can be pressed down by the third fitting portion 511c and the fourth fitting portion 511d.

Figure 50:
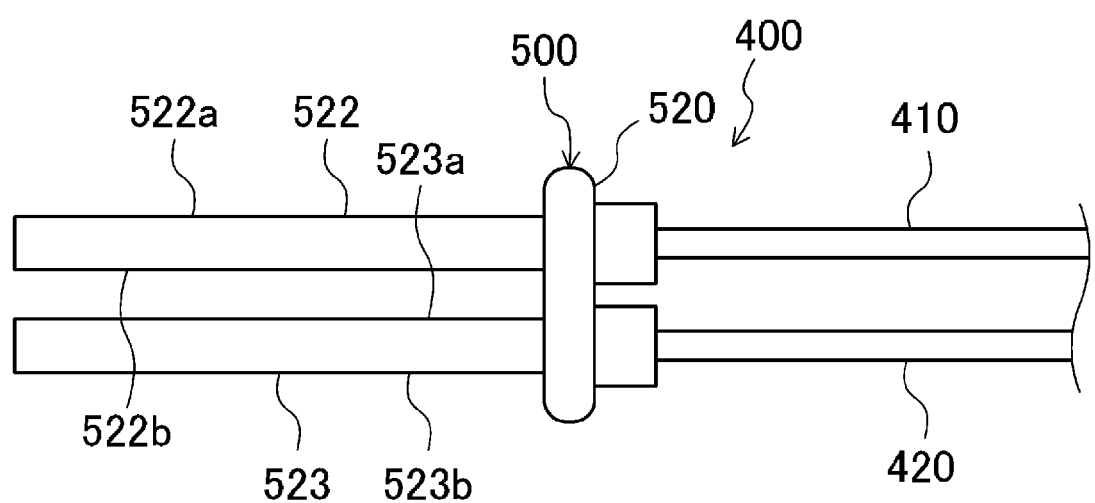
FIG. 50 is a plan view of a connector section according to a third example.

FIG. 50 illustrates the connector section 500 according to a third example of the present embodiment. In the connector section 500 of the third example, a body portion 520, a light-projection-side convex portion 522, and a light-reception-side convex portion 523 are configured using separate members. Each of the light-projection-side convex portion 522 and the light-reception-side convex portion 523 is configured using a rod-shaped member. The light-projection-side convex portion 522 is constituted by a base member 522a having a partially cutout shape and a fitting member 522b that fits into the cutout portion. As the light projection optical waveguide 410 is arranged in the cutout portion of the base member 522a, the light projection optical waveguide 410 can be positioned with respect to the base member 522a. As the fitting member 522b fits into the cutout portion of the base member 522a in the state where the light projection optical waveguide 410 is positioned, the light projection optical waveguide 410 can be held so as not to move. The light-reception-side convex portion 523 is also configured in the same manner, and has a base member 523a and a fitting member 523b.

Figure 51:
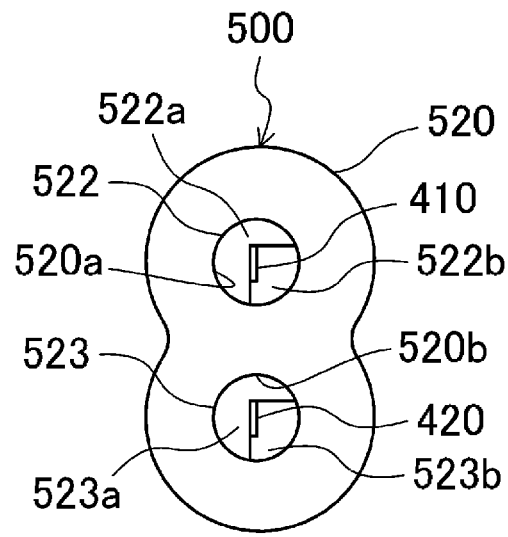
FIG. 51 is a view of the connector section according to the third example as viewed from a distal side.

As illustrated in FIG. 51, the body portion 520 is formed with a light-projection-side holding hole 520a in which the light-projection-side convex portion 522 is held in the inserted state and a light-reception-side holding hole 520b in which the light-reception-side convex portion 523 is held in the inserted state. The light-projection-side convex portion 522 can be rotated about the center line thereof in a state where the light-projection-side convex portion 522 is inserted into the light-projection-side holding hole 520a. In addition, the light-reception-side convex portion 523 can be rotated in the same manner. The body portion 520 can be made of rubber or the like. The body portion 520 may be omitted.

Figure 52:
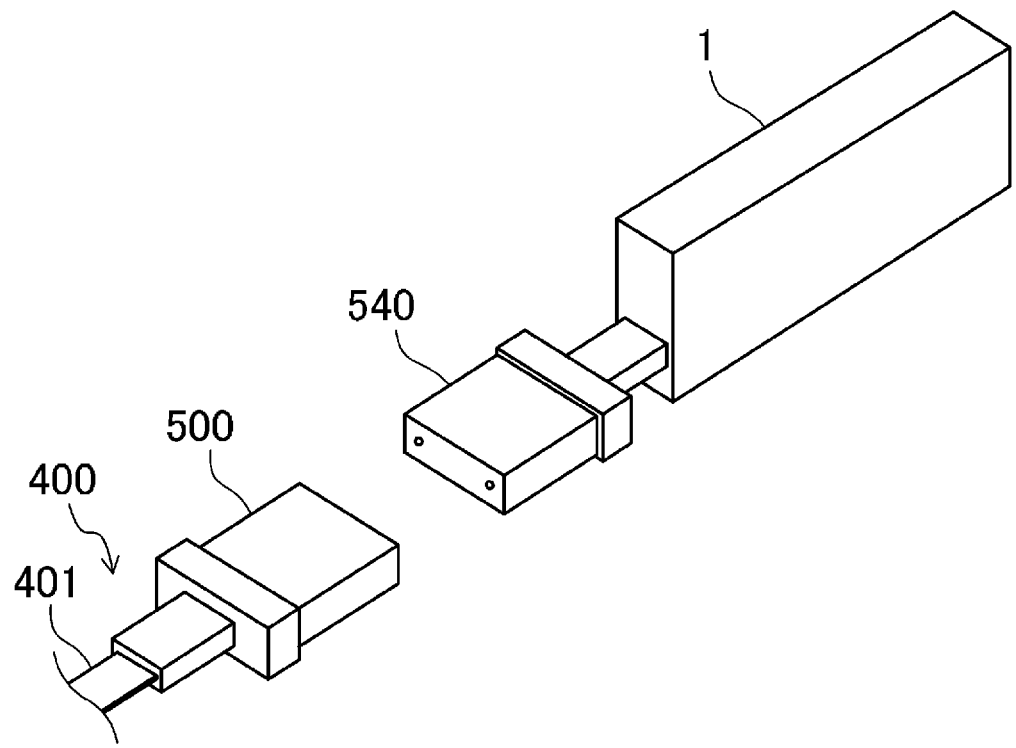
FIG. 52 is a view illustrating an example in which a pre-installed adapter is provided.

As illustrated in FIG. 52, the optical sensor 1 may be provided with a pre-installed adapter 540 in advance. In this example, the light detection unit 400 can be connected to the optical sensor 1 via the pre-installed adapter 540.

Figure 53:
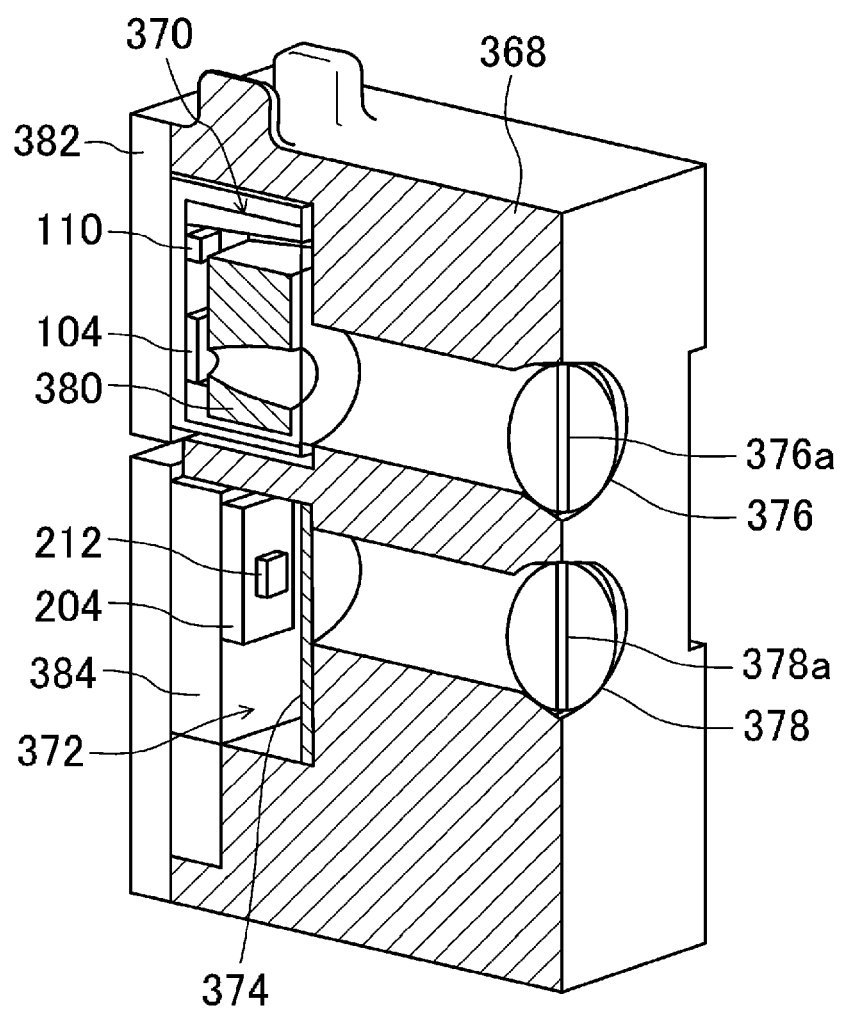
FIG. 53 is a view illustrating an example in which a light projection hole and a light reception hole of an optical sensor have a slit shape.

As illustrated in FIG. 53, shapes of the insertion ports 376a and 378a of the light projection hole 376 and the light reception hole 378 of the optical sensor 1 may be a slit shape. Since the slit-shaped insertion ports 376a and 378a substantially match the cross-sectional shapes of the light projection optical waveguide 410 and the light reception optical waveguide 420, the proximal ends of the light projection optical waveguide 410 and the light reception optical waveguide 420 can be directly connected to the light projection hole 376 and the light reception hole 378 without providing the connector section 500.

Figure 54:
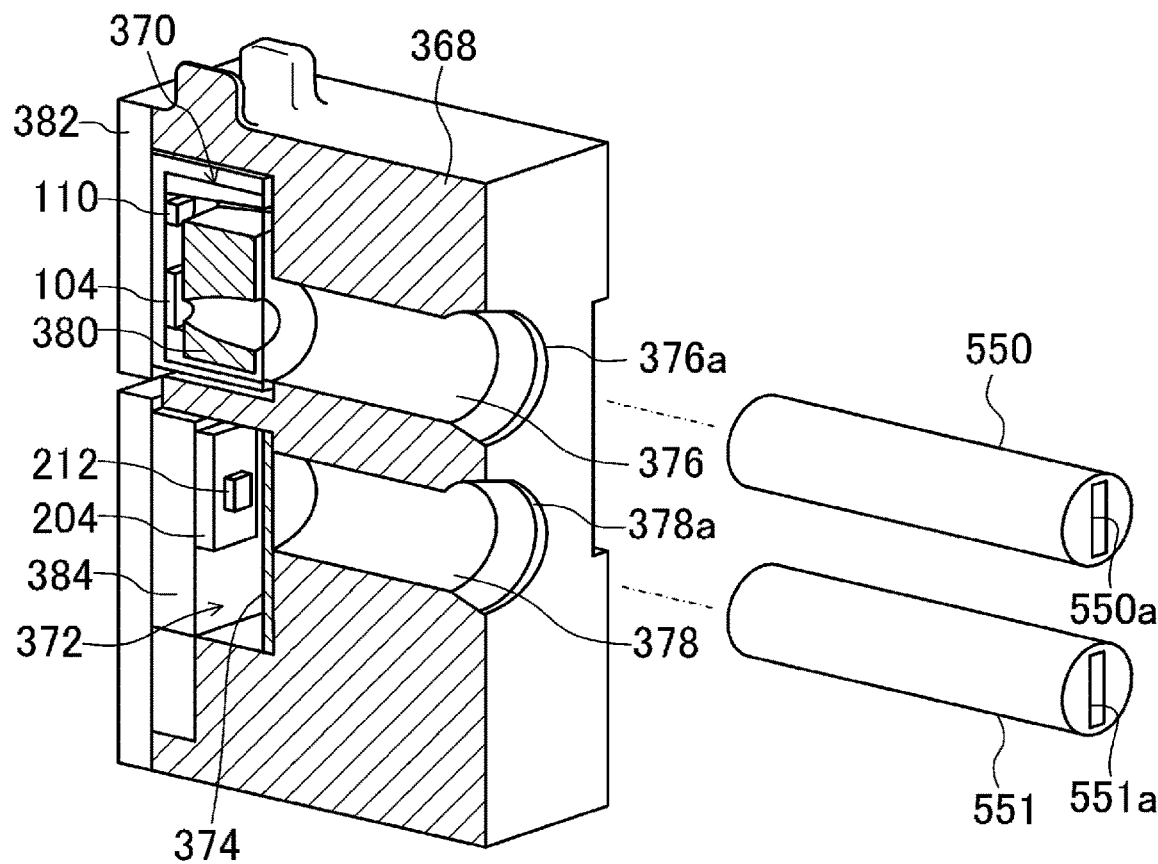
FIG. 54 is a perspective view illustrating a connector section according to a fourth example.

FIG. 54 illustrates a light-projection-side connector section 550 and a light-reception-side connector section 551 according to a fourth example of the embodiment. The light-projection-side connector section 550 is formed in a columnar shape that can be positioned by being inserted into the light projection hole 376 of the optical sensor 1. The light-projection-side connector section 550 is formed with a slit-shaped hole portion 550a into which the light projection optical waveguide 410 is inserted. The light-reception-side connector section 551 is also configured in the same manner, is formed in a columnar shape that can be positioned by being inserted into the light reception hole 378 of the optical sensor 1, and has a slit-shaped hole portion 551a.

The optical sensor 1 can be connected by deeply inserting the light-projection-side connector section 550 and the light-reception-side connector section 551 into the light projection hole 376 and the light reception hole 378 of the optical sensor 1 and deeply inserting the light projection optical waveguide 410 and the light reception optical waveguide 420 into the hole portions 550a and 551a.

(Configuration of Relay Portion)

As in the structure of the first example of a relay portion illustrated in FIGS. 55A, 55B, 55C, 56A, and 56B, the light projection optical waveguide 410 and the light reception optical waveguide 420, and the bundled optical fiber can be connected by a relay connector section 580. The relay connector section 580 is a member that integrally bundles a light-projection-side optical fiber 560, which is connected to the proximal end of the light projection optical waveguide 410 and optically coupled to the light projection hole 376 of the optical sensor 1 to be insertable and removable, and a light-reception-side optical fiber 561 which is connected to the proximal end of the light reception optical waveguide 420 and is optically coupled to the light reception hole 378 of the optical sensor 1 to be insertable and removable. The light-projection-side optical fiber 560 and the light-reception-side optical fiber 561 are configured using bundled optical fibers in which a plurality of optical fiber lines are bundled.

The relay connector section 580 can be used in the case of extending the light detection unit 400. The relay connector section 580 includes a connector case 581 made of a resin material or the like that does not transmit light or hardly transmits light. The light-projection-side optical fiber 560 and the light-reception-side optical fiber 561 are held by fiber adapters 560b and 561b, respectively, in a state where optical fiber lines 560a and 561a are arrayed in the horizontal direction (width direction of the optical waveguides 410 and 420). The fiber adapters 560b and 561b are fixed in the state of being accommodated in the connector case 581. In the connector case 581, the light projection side and the light reception side are optically isolated.

A light-projection-side adapter 490 and a light-reception-side adapter 491 are attached to the proximal ends of the light projection optical waveguide 410 and the light reception optical waveguide 420, respectively. The light-projection-side adapter 490 and the light-reception-side adapter 491 are fixed in the state of being accommodated in the connector case 581.

An array direction of the optical fiber lines 560a constituting the light-projection-side optical fiber 560 coincides with the width direction of the light projection optical waveguide 410, and the optical fiber lines 560a are arranged from a portion corresponding to one end of the light projection optical waveguide 410 in the width direction to a portion corresponding to the other end. Similarly, on the light reception side, an array direction of the optical fiber lines 561a coincides with the width direction of the light reception optical waveguide 420, and the optical fiber lines 561a are arranged from a portion corresponding to one end of the light reception optical waveguide 420 in the width direction to a portion corresponding to the other end.

A light-projection-side rod lens 582, which is long in the width direction of the light projection optical waveguide 410, is provided between the distal end of the light-projection-side optical fiber 560 and the proximal end of the light projection optical waveguide 410. In addition, a light-reception-side rod lens 583, which is long in the width direction of the light reception optical waveguide 420, is provided between the distal end of the light-reception-side optical fiber 561 and the proximal end of the light reception optical waveguide 420. A transparent elastic material or adhesive may be provided instead of the light-projection-side rod lens 582 and the light-reception-side rod lens 583. In addition, the light-projection-side rod lens 582 and the light-reception-side rod lens 583 may be omitted and the distal end of the light-projection-side optical fiber 560 and the proximal end of the light projection optical waveguide 410 may abut against each other, and the distal end of the light-reception-side optical fiber 561 and the proximal end of the light reception optical waveguide 420 may abut against each other. Note that one core may be used without using a plurality of optical fiber lines.

Further, a mode may be adopted in which the light projection optical waveguide 410 and the light reception optical waveguide 420 are divided, instead of collecting the light projection optical waveguide 410 and the light reception optical waveguide 420 into the single case 581.

Figure 55A:
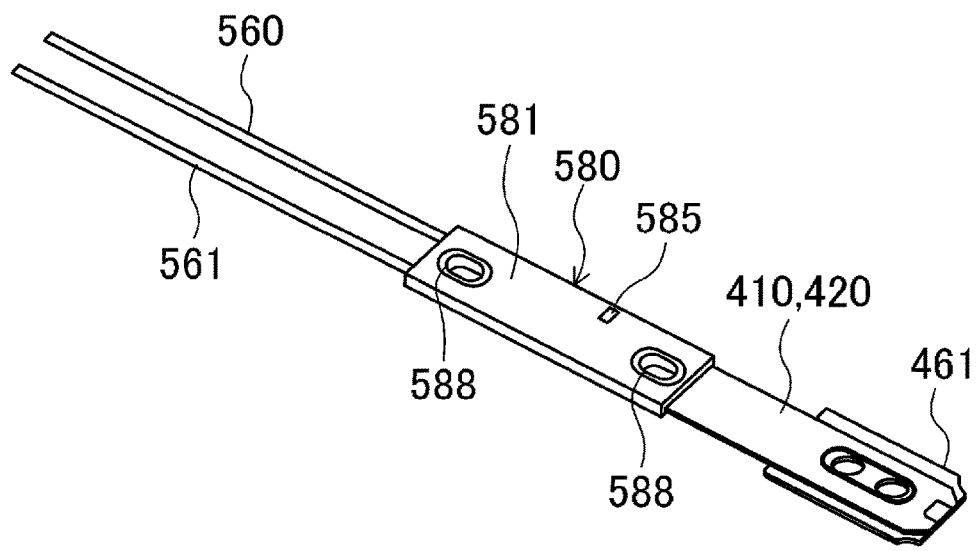
FIG. 55A is a perspective view illustrating a structure of a first example of a relay portion as viewed from a front side.

In addition, light leaked due to the coupling of the distal end of the light-projection-side optical fiber 560 and the proximal end of the light projection optical waveguide 410 can also be used as an operation indicating lamp, and light leaked due to the coupling of the distal end of the light-reception-side optical fiber 561 and the proximal end of the light reception optical waveguide 420 can also be used as an output indicating lamp 585 (illustrated in FIG. 55A).

Note that the indicating lamp 585 is provided on the light reception side in FIG. 55A, but may be provided on the light projection side. In addition, a light source of the indicating lamp may be the LED 212 illustrated in FIG. 3, or may be light emitted from the light emitting element 104 used for detection or light obtained as the light is reflected by the workpiece WK. In addition, the indicating lamp may be realized by partially cutting the surface of the optical waveguide. When the leakage light generated at coupling end surfaces of the optical waveguides 410 and 420 and the optical fibers 560 and 561 is successfully used as the indicating lamp, the loss of detection light can be reduced.

Figure 55B:
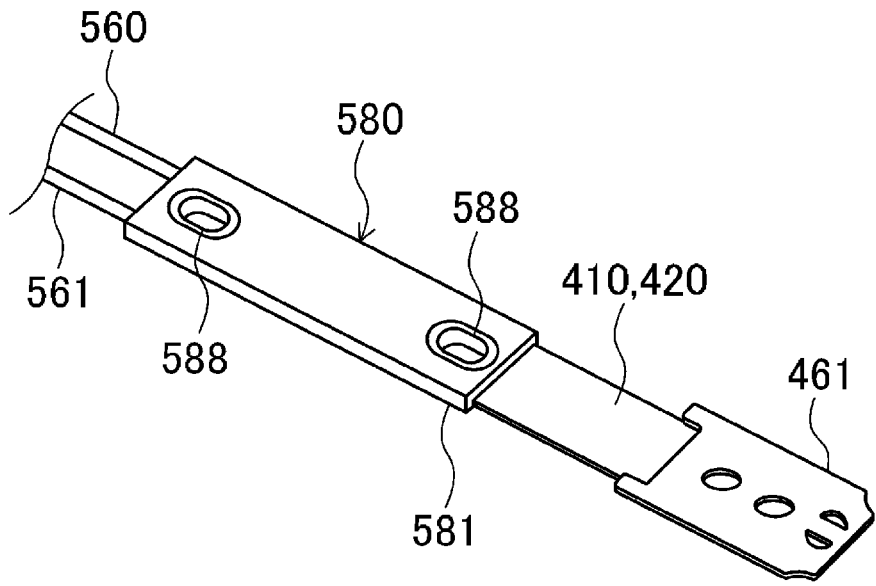
FIG. 55B is a perspective view illustrating the structure of the first example of the relay portion as viewed from a back side.

As illustrated in FIGS. 55A and 55B, the relay connector 580 may also be provided with through-holes 588. Among the through-holes 588 of the relay connector 580, a through-hole on the distal side communicates with a through-hole provided between the optical waveguides or in the optical light guide path.

In addition, the reinforcing plates 461 are provided at the distal ends of the optical waveguides 410 and 420. The reinforcing plate 461 is preferably made of metal or resin, and is thin and highly strong. In addition, bending or deformation of a distal end detection unit can be suppressed by attaching the reinforcing plate 461 onto the lower cover member 450 with an adhesive or double-sided tape.

Figure 56A:
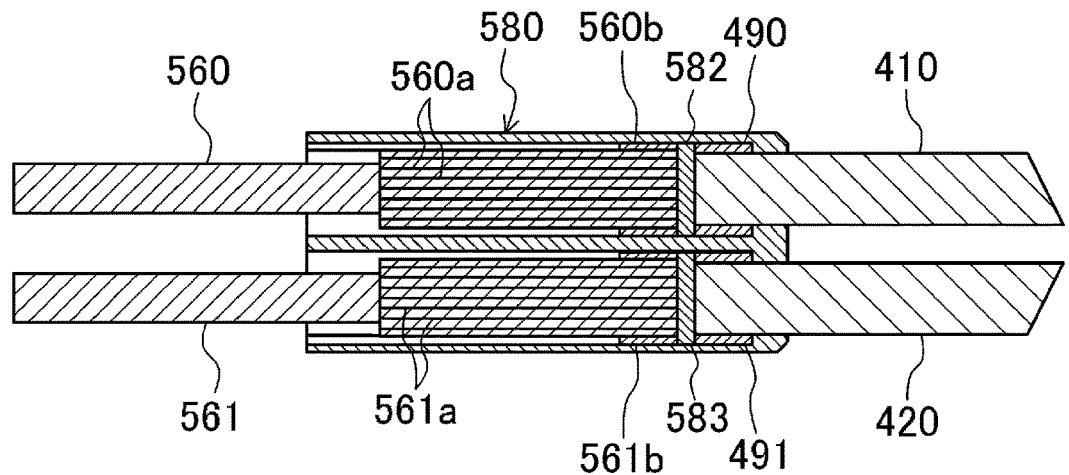
FIG. 56A is a cross-sectional view illustrating the first example of the relay portion.
Figure 56B:
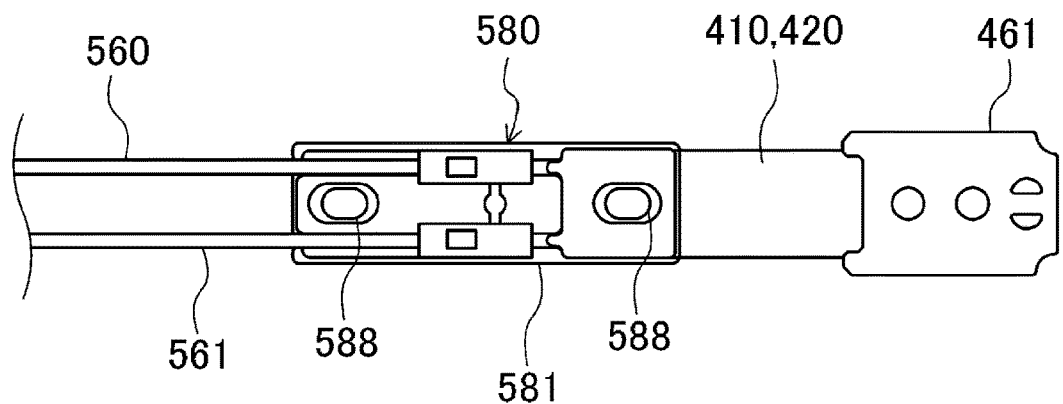
FIG. 56B is a plan view illustrating the first example of the relay portion.

The reinforcing plate 461 may be provided only on the back surfaces, only the front surfaces, or both the surfaces of the optical waveguides 410 and 420. In FIGS. 56A and 56B, the reinforcing plate 461 is provided only on the back surfaces of the optical waveguides 410 and 420. In addition, the surface on which the reinforcing plate 461 is provided is not limited to the main surfaces of the optical waveguides 410 and 420, and end surfaces on the three sides of the detection unit can be surrounded by the reinforcing plate 461. In addition, the reinforcing plate 461 is wider than the optical waveguides 410 and 420 or the sheet-shaped cover member.

The reinforcing plate 461 can also be provided with a hole that communicates with the third through-hole 404 and the fourth through-hole 405 of the optical waveguides 410 and 420. This hole can be used as a fixing hole for screwing.

A method for fixing the reinforcing plate 461 is not limited to the screwing, and the reinforcing plate 461 can also be set to a fixed surface using a method such as adhesion, a double-sided tape, and sandwiching.

Note that characters can be written on front and back surfaces of the relay connector case 581 or tapes of the optical waveguides 410 and 420 for display discrimination using a sticker, silk printing, engraving, or the like although not illustrated.

Figure 55C:
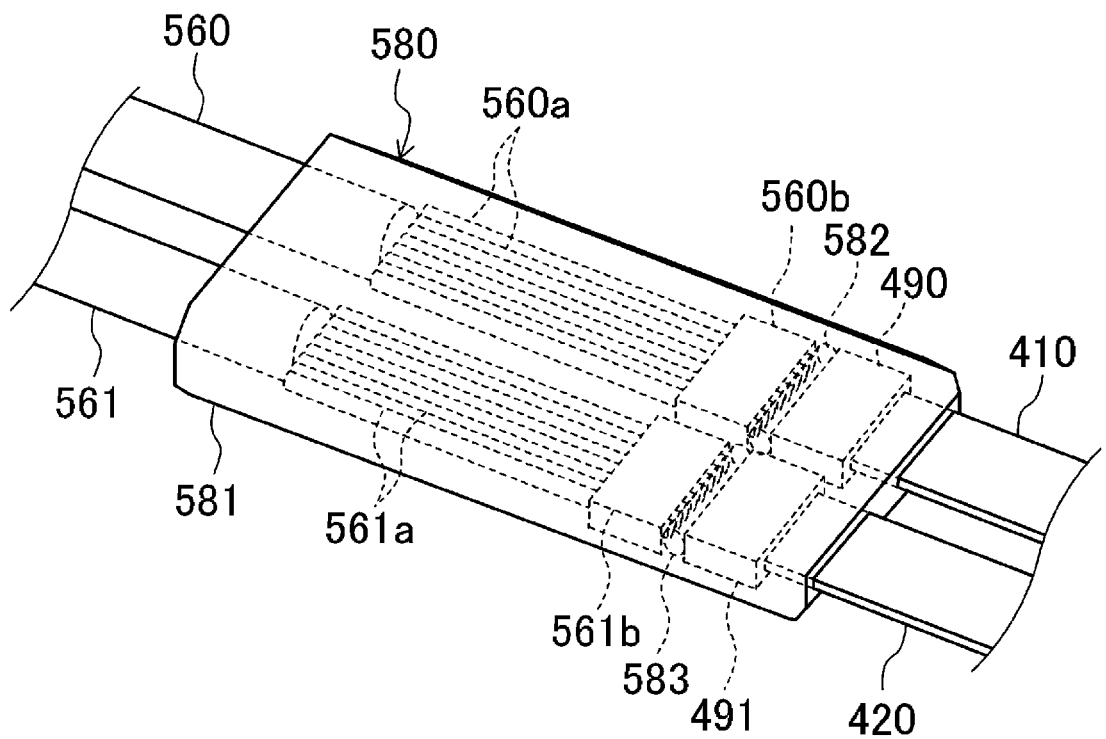
FIG. 55C is a perspective view illustrating the structure of the first example of the relay portion.

Although the outline of the relay connector section 581 has been described with reference to FIGS. 55A to 55C, an assembly method at the time of performing optical coupling between the optical waveguides 410 and 420 and the optical fibers 560 and 561 by the relay connector section 581 will be briefly described with reference to FIG. 56B. When the configuration as illustrated in FIG. 56B is adopted, the abutment between the distal end of the light-reception-side optical fiber 561 and the proximal end of the light reception optical waveguide 420 can be efficiently performed.

(Description of Configuration of Relay Connector Section in FIG. 56B)

1. A distal coating is peeled off from the optical fibers 560 and 561 (bundled fibers), and the bundled fibers are arrayed in a row on the fiber adapters 560b and 561b.
2. The optical waveguides 410 and 420 are attached to each other using a tape to determine a pitch interval in the width direction, and coupling portions with the optical fibers 560 and 561 are made to slightly protrude.

3. The fiber adapters 560*b* and 561*b* are fit into the connector case 581 and positioned in the width direction with a positioning boss (on the ellipse).
4. The optical waveguides 410 and 420 are fit into the connector case 581 and positioned in the width direction with a positioning boss (on the ellipse).
5. The fiber adapters 560*b* and 561*b* and the optical waveguides 410, 420 fitted in the connector case 581 are moved in the longitudinal direction, the roots of the fiber adapters 560*b* and 561*b* and the optical waveguides 410 and 420 are fixed with a firm adhesive in a state where optically coupled end surface abut against each other or have a small gap, and the optically coupled portion is fixed by filling the coupling gap with a transparent elastic material or adhesive.
6. Finally, a lid of the connector case 581 is closed. At this time, the lid is prevented from being open using an adhesive, a double-sided tape, or welding.

Figure 57:
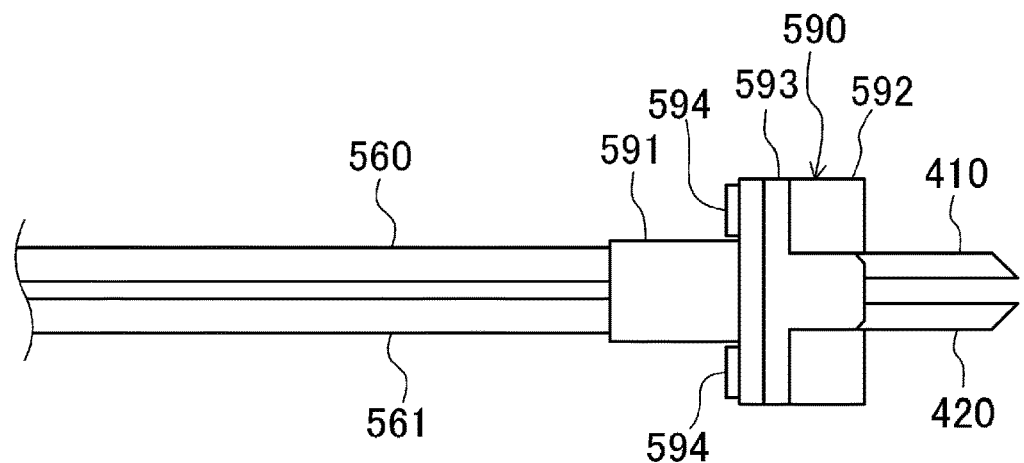
FIG. 57 is a plan view illustrating a second example of the relay portion.
Figure 58:
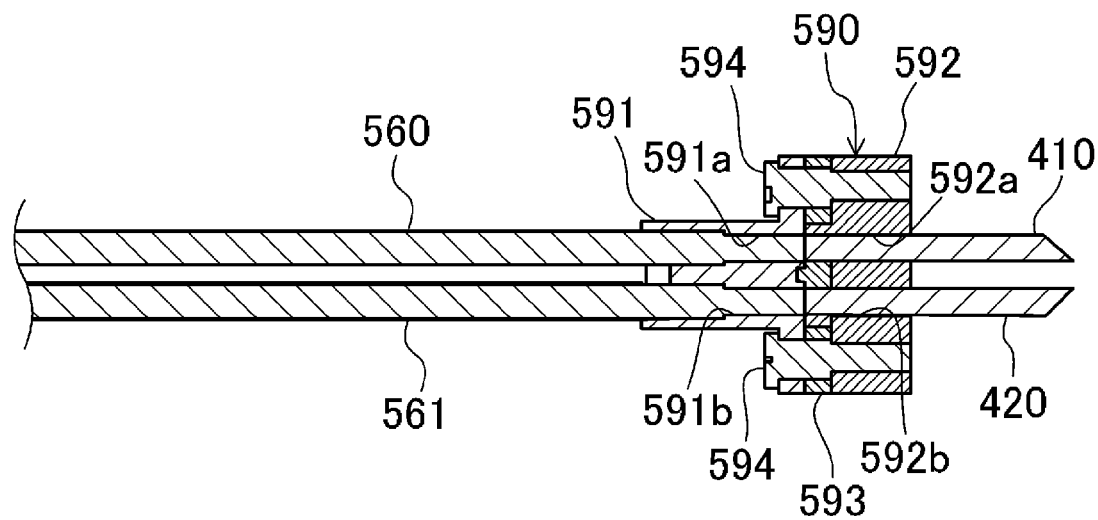
FIG. 58 is a cross-sectional view illustrating the second example of the relay portion.

As in the structure of the second example of the relay portion illustrated in FIGS. 57 and 58, a relay connector section 590 can be constituted by three parts. The relay connector section 590 includes: a first holding member 591 that holds the light-projection-side optical fiber 560 and the light-reception-side optical fiber 561; a second holding member 592 that holds the light projection optical waveguide 410 and the light reception optical waveguide 420; and an intermediate member 593 arranged between the first holding member 591 and the second holding member 592.

As illustrated in FIG. 58, the first holding member 591 is formed with holding holes 591*a* and 591*b* in which the distal ends of the light-projection-side optical fiber 560 and the light-reception-side optical fiber 561 are held in the state of being inserted. The second holding member 592 is formed with holding holes 592*a* and 592*b* in which the proximal ends of the light projection optical waveguide 410 and the light reception optical waveguide 420 are held in the state of being inserted.

Figure 59:
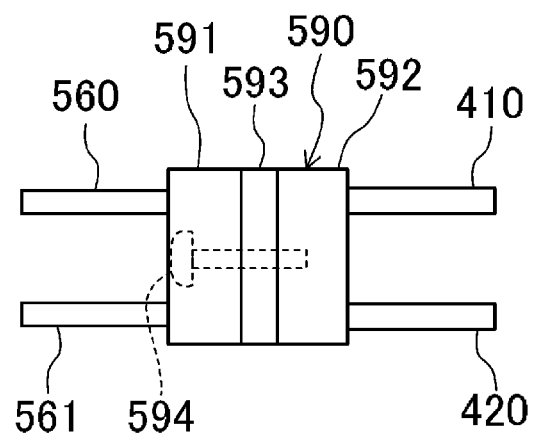
FIG. 59 is a plan view illustrating a third example of the relay portion.

The first holding member 591, the intermediate member 593, and the second holding member 592 are integrated by screws 594. That is, the screw 594 penetrates through the first holding member 591 and the intermediate member 593 from the first holding member 591 side, and then, is screwed into the second holding member 592. A position of the screw 594 is not limited to the position illustrated in FIG. 58, and the screw 594 can be provided between the light-projection-side optical fiber 560 and the light-reception-side optical fiber 561 if the interval between the light-projection-side optical fiber 560 and the light-reception-side optical fiber 561 is wide, for example, as in the third example of the relay portion illustrated in FIG. 59.

In addition, the optical fibers 560 and 561 extending from the relay connector 580 may be configured as free-cut optical fibers. For the free-cut optical fiber, the length of the optical fiber can be adjusted by using a free-cut jig.

In addition, when a small-diameter optical fiber is used as the optical fibers 560 and 561 extending from the relay connector section 580 to the optical sensor 1 side in the first to third examples of the relay portion, an adapter configured to connect the optical fiber and the optical sensor 1 may be used to facilitate the optical coupling.

Any fiber diameter of the optical fibers 560 and 561 can be used. The reduction in thickness is also desired in the relay connector section 580 in order to increase the degree of freedom in the installation space, which is similar to the distal end of the optical waveguide. As the diameter of the optical fiber increases, the thickness of the relay connector 580 also increases. Therefore, it is preferable that the fiber diameter be as small as possible, but there is a degree of freedom in design that can be freely designed in consideration of the coupling efficiency with the optical waveguide.

Note that the description has been given with the cores 411 provided in one layer in the present embodiment as illustrated in FIGS. 6 and 8, but the cores 411 may be provided in two or more layers without being limited thereto.

In addition, when the optical sensor 1 is installed upright such that the display unit 334 is located on the upper surface as illustrated in FIG. 1, the light projection hole 376 and the light reception hole 378 are arranged side by side in the vertical direction with respect to the housing 10, and a light projection path and a light reception path of the optical waveguide are arrayed in a sheet shape in the horizontal direction. Therefore, the two vertically arrayed parts are arrayed in the horizontal direction, and thus, a twisting unit is required between the optical sensor 1 and the distal end of the optical waveguide to horizontally array the parts that have been vertically arrayed. It is easier to twist a thin linear optical fiber than to twist a sheet-shaped optical waveguide, and it is possible to reduce disconnection, light leakage, and loss.

(Stray Light Countermeasure Structure)

Figure 60:
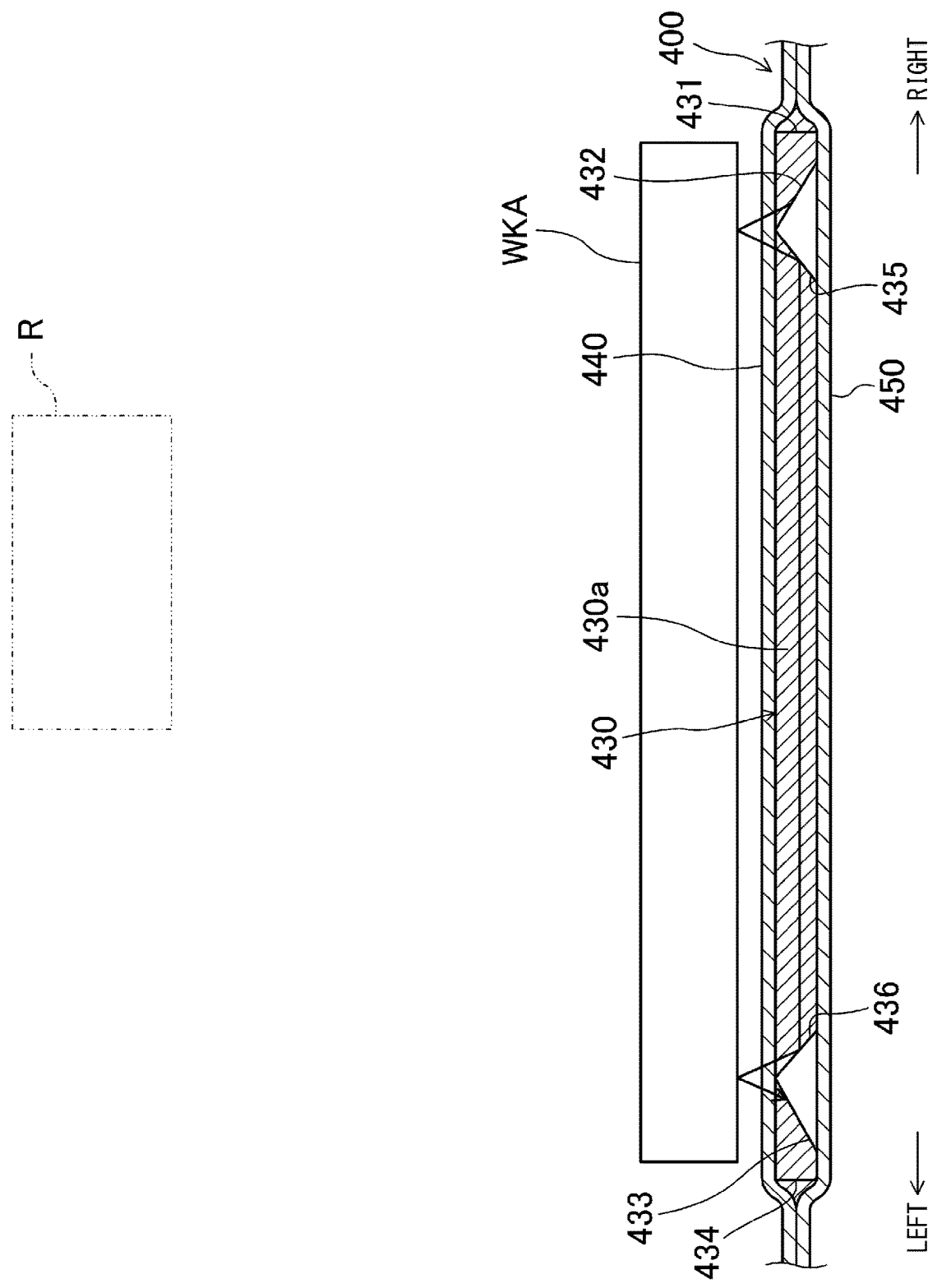
FIG. 60 is a view corresponding to FIG. 10 for describing a principle of stray light generation.

The light detection unit 400 according to the present embodiment is provided with a countermeasure against stray light. That is, as a premise, the light detection unit 400 is a unit capable of detecting whether or not the workpiece WK exists in the detection area R set at a predetermined distance from the light detection unit 400, for example, as illustrated in FIG. 10. For example, as illustrated in FIG. 60, it is assumed that there is no workpiece WK in the detection area R and a workpiece WKA exists in a place closer to the light detection unit 400 than the detection area R. When the workpiece WKA exists, light emitted from the light emitting mirror surface 432 is emitted to the workpiece WKA, reflected, and then, incident on a surface 435. The light incident on the surface 435 travels in the core 430*a* of the light extraction member 430 toward the light reception side, and is incident on a surface 436 formed on the light reception side. The light incident on the surface 436 is reflected upward and emitted to the workpiece WKA, and is sometimes incident on the light incident mirror surface 433 after being reflected by the workpiece WKA. The light incident on the light incident mirror surface 433 reaches the optical sensor 1, and as a result, the optical sensor 1 determines that there is a workpiece WK in the detection area R though there is actually no workpiece WK. This is the principle that erroneous determination occurs due to stray light.

Figure 61:
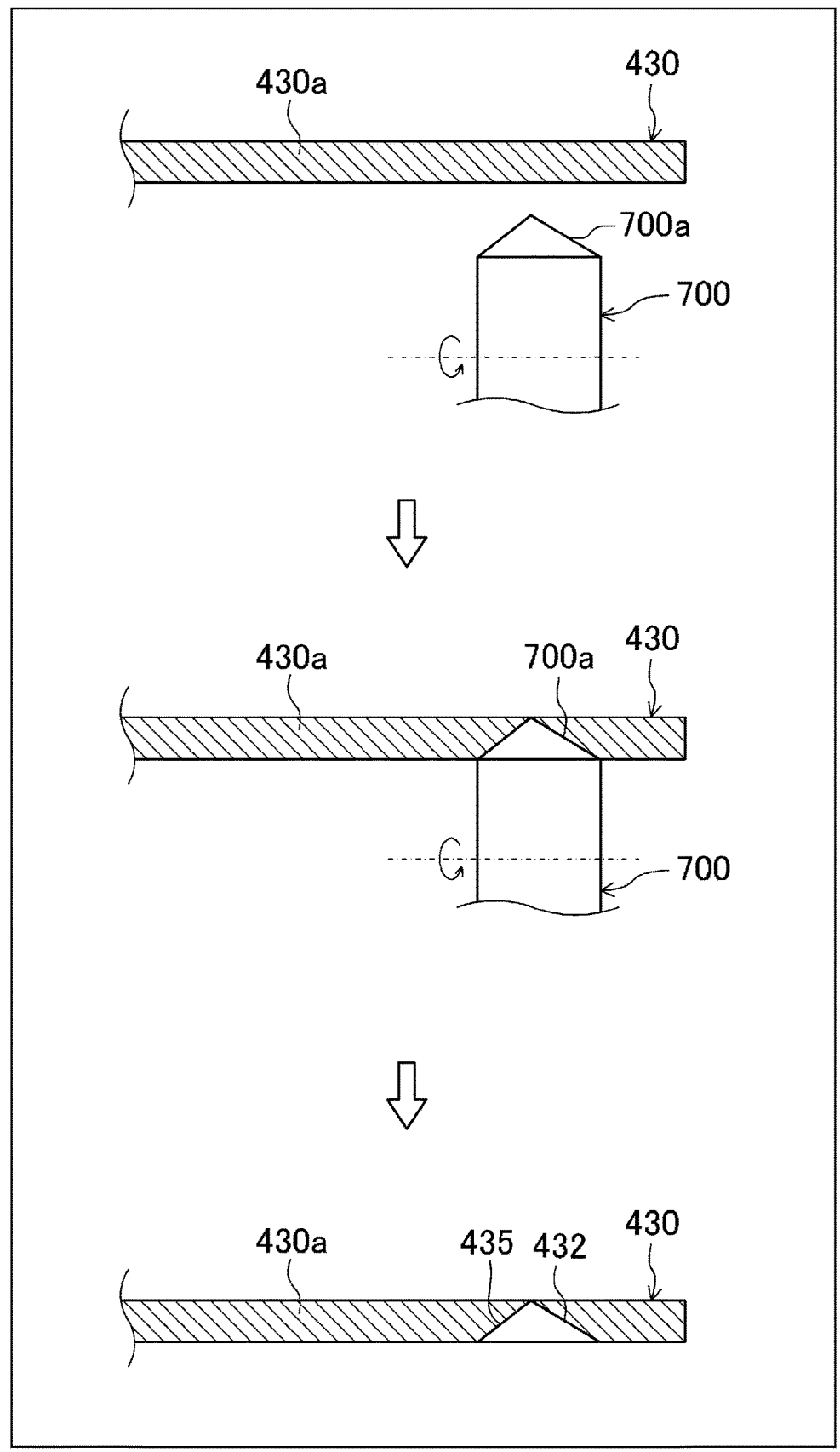
FIG. 61 is a view illustrating a procedure for forming the light emitting mirror surface with a cutting tool.

Here, when the light emitting mirror surface 432 is formed on the light extraction member 430 as illustrated in FIG. 61, for example, a rotating circular cutting tool 700 is applied to the light extraction member 430 to scrape a part of the light extraction member 430 by a cutting edge 700*a* of the cutting tool 700. As a result, the light emitting mirror surface 432 can be obtained, but the surface 435 is also formed at the same time. An angle of this surface 435 can be set by the cutting edge 700*a* of the cutting tool 700, but the above-mentioned erroneous determination caused by the stray light is likely to occur if the angle is set as illustrated in FIG. 60.

Figure 62:
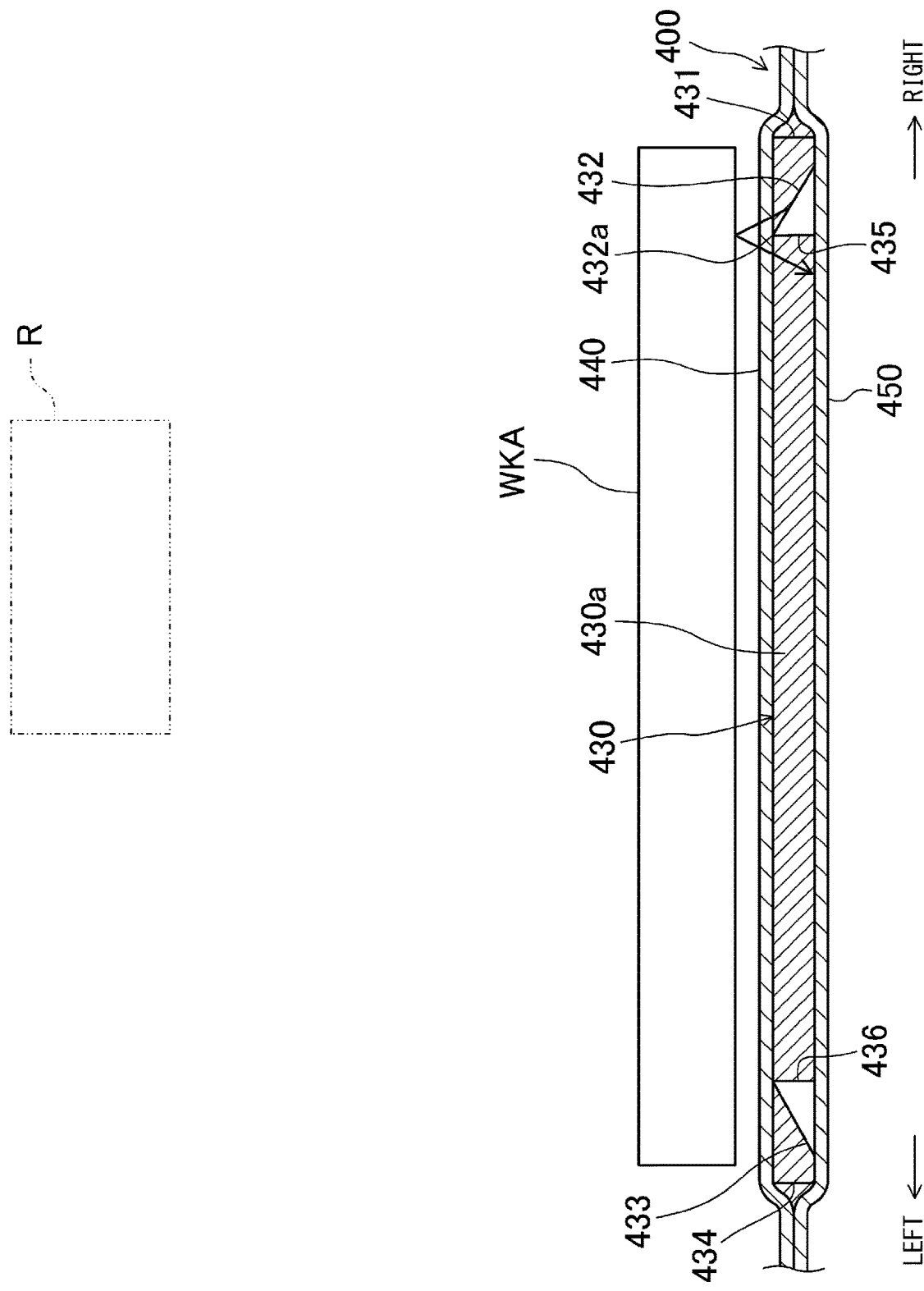
FIG. 62 is a view corresponding to FIG. 10 illustrating an example in which a first stray light countermeasure is applied.

FIG. 62 illustrates an example in which a first stray light countermeasure is applied to prevent the erroneous determination caused by the stray light. The first stray light countermeasure is characterized by an angle of the surface 435 formed at the time of obtaining the light emitting mirror surface 432. That is, the surface 435 extending downward from an upper edge portion 432a of the light emitting mirror surface 432 is formed on the light extraction member 430, and the angle of the surface 435 is set to an angle that prevents reception of light reflected from the workpiece WKA located in an area closer than the detection area R. Specifically, the surface 435 is formed as a steep surface such that the light reflected from the workpiece WKA is incident on the light incident mirror surface 433 side (left side in the drawing) rather than the surface 435. As a result, even if the light reflected from the workpiece WKA is incident on the light extraction member 430, the light only travels in the incident direction and can be suppressed from reaching the light incident mirror surface 433. The light reflected from the workpiece WKA enters the light extraction member 430, and then, reaches the lower cover member 450, thereby being absorbed by the lower cover member 450. That is, the angle of the surface 435 is set such that the light reflected from the workpiece WKA can reach the lower cover member 450, and the surface 435 having such an angle is a stray light suppressing unit that prevents the light reflected from the workpiece WKA from reaching the light incident mirror surface 433, and it can be said that the light extraction member 430 is provided with the stray light suppressing unit. In addition, the surface 435 can also be referred to as a stray light removing unit that removes stray light entering the light incident mirror surface 433. Note that the light incident mirror surface 433 and the surface 435 may be formed by, for example, a laser machining method in addition to the cutting tool 700.

In addition, the surface 436 is formed similarly to the light emitting side at the time of forming the light incident mirror surface 433 in FIG. 62, and this surface 436 can also be formed as a steep surface similarly to the surface 435.

Figure 63:
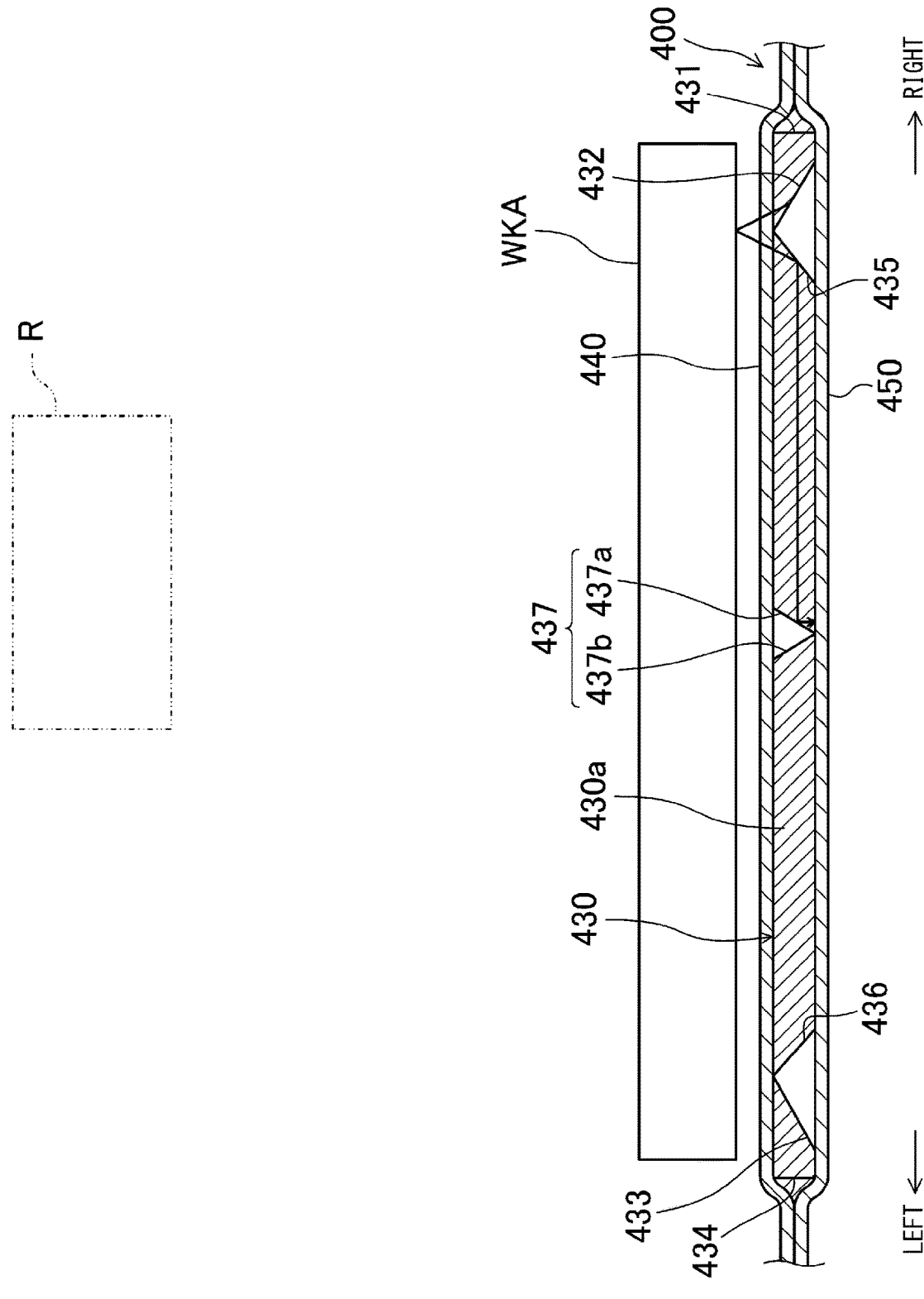
FIG. 63 is a view corresponding to FIG. 10 illustrating an example in which a second stray light countermeasure is applied.

FIG. 63 illustrates an example in which a second stray light countermeasure is applied. In the second stray light countermeasure, a stray light suppressing groove 437 that prevents the light reflected from the workpiece WKA from reaching the light incident mirror surface 433 is formed in the light extraction member 430. The stray light suppressing groove 437 is positioned between the light emitting mirror surface 432 and the light incident mirror surface 433 of the light extraction member 430. The stray light suppressing groove 437 is open on the upper side of the light extraction member 430, that is, on the side where the detection area R of the workpiece WK exists. An inner surface of the stray light suppressing groove 437 includes a side surface 437a on the light emitting side and a side surface 437b on the light incident side. The side surface 437a and the side surface 437b approach each other as being separated from an opening of the stray light suppressing groove 437 and are continuous with each other on the opposite side of the opening (lower side), thereby forming a V-shaped cross section.

In the example of FIG. 63, the light reflected from the workpiece WKA located in an area closer than the detection area R is incident on the surface 435 and travels in the core 430a of the light extraction member 430 toward the light reception side. The light traveling in the core 430a toward the light reception side is incident on the side surface 437a of the stray light suppressing groove 437, is reflected by the side surface 437a to be directed downward, and reaches the lower cover member 450. The light reaching the lower cover member 450 is absorbed by the lower cover member 450. As a result, even if the light reflected from the workpiece WKA is incident on the light extraction member 430, the light does not reach the light incident mirror surface 433. That is, the side surface 437a of the stray light suppressing groove 437 can be referred to as a stray light suppressing unit that prevents the light reflected from the workpiece WKA from reaching the light incident mirror surface 433 or a stray light removing unit that removes the stray light entering the light incident mirror surface 433.

In addition, the side surface 437a and the side surface 437b of the stray light suppressing groove 437 may be a smooth mirror surface or may be a surface having a large number of irregularities or a rough surface. Light can be diffusely reflected and attenuated by forming the surface having irregularities or the rough surface. The surface having a large number of irregularities or the rough surface attenuates the light, and thus, can be referred to as a light attenuation surface. In this case, the light attenuation surface is provided between the light emitting mirror surface 432 and the light incident mirror surface 433 of the light extraction member 430.

Figure 64:
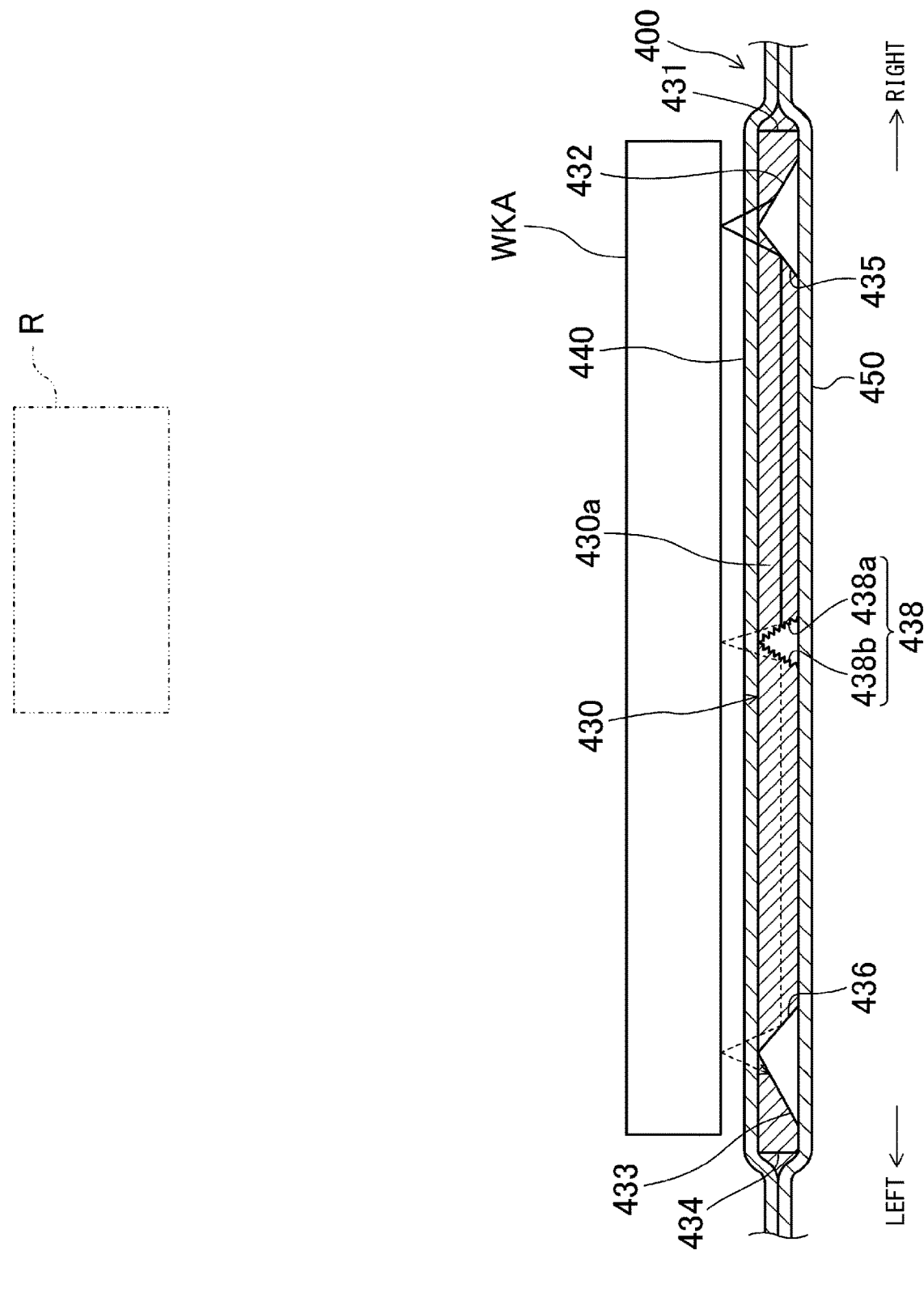
FIG. 64 is a view corresponding to FIG. 10 illustrating an example in which a third stray light countermeasure is applied.

FIG. 64 illustrates an example in which a third stray light countermeasure is applied. In the third stray light countermeasure, a stray light suppressing groove 438 that prevents the light reflected from the workpiece WKA from reaching the light incident mirror surface 433 is formed on the opposite side to that of the second stray light countermeasure. The stray light suppressing groove 438 is open on the lower side of the light extraction member 430, that is, on the side opposite to the side where the detection area R of the workpiece WK exists. An inner surface of the stray light suppressing groove 438 includes a side surface 438a on the light emitting side and a side surface 438b on the light incident side. The side surface 438a and the side surface 438b approach each other as being separated from an opening of the stray light suppressing groove 438, and are continuous with each other on the opposite side of the opening (upper side), thereby forming a V-shaped cross section. The side surface 438a and the side surface 438b of the stray light suppressing groove 438 are configured using the above-mentioned light attenuation surface.

In the example of FIG. 64, the light reflected from the workpiece WKA located in an area closer than the detection area R is incident on the surface 435 and travels in the core 430a of the light extraction member 430 toward the light reception side. The light traveling in the core 430a toward the light reception side is incident on the side surface 438a of the stray light suppressing groove 438. Since the side surface 438a is configured using the light attenuation surface, the light is attenuated.

The light incident on the side surface 438a may be attenuated such that there is no component emitted from the side surface 438a to the workpiece WKA, or there may be a component emitted from the side surface 438a to the workpiece WKA. The component emitted from the side surface 438a to the workpiece WKA is reduced by the effect of the light attenuation surface, and is indicated by the broken line in FIG. 64. The light emitted from the side surface 438a to the workpiece WKA is reflected by the workpiece WKA and is incident on the side surface 438b of the stray light suppressing groove 438. Since this side surface 438b is also the light attenuation surface, the light incident on the side surface 438b is also attenuated and further weakened. If there is a component reflected on the side surface 438b, the light is incident on the surface 436 and emitted to the workpiece WKA. Thereafter, the light reflected from the workpiece WKA is sometimes incident on the light incident mirror surface 433, but the light is already greatly attenuated, and thus, becomes light weaker than a determination threshold of the optical sensor 1 so that the erroneous determination can be suppressed. In this manner, the plurality of light attenuation surfaces may be provided between the light emitting mirror surface 432 and the light incident mirror surface 433 of the light extraction member 430.

Note that the stray light suppressing groove 437 and the stray light suppressing groove 438 illustrated in FIGS. 63 and 64 are grooves each having a depth in which the bottom surface is located near the surface on the opposite side from the opening side, but the depth of the groove is not particularly limited. As the groove is deeper, it is easier to suppress or remove the stray light.

Figure 65:
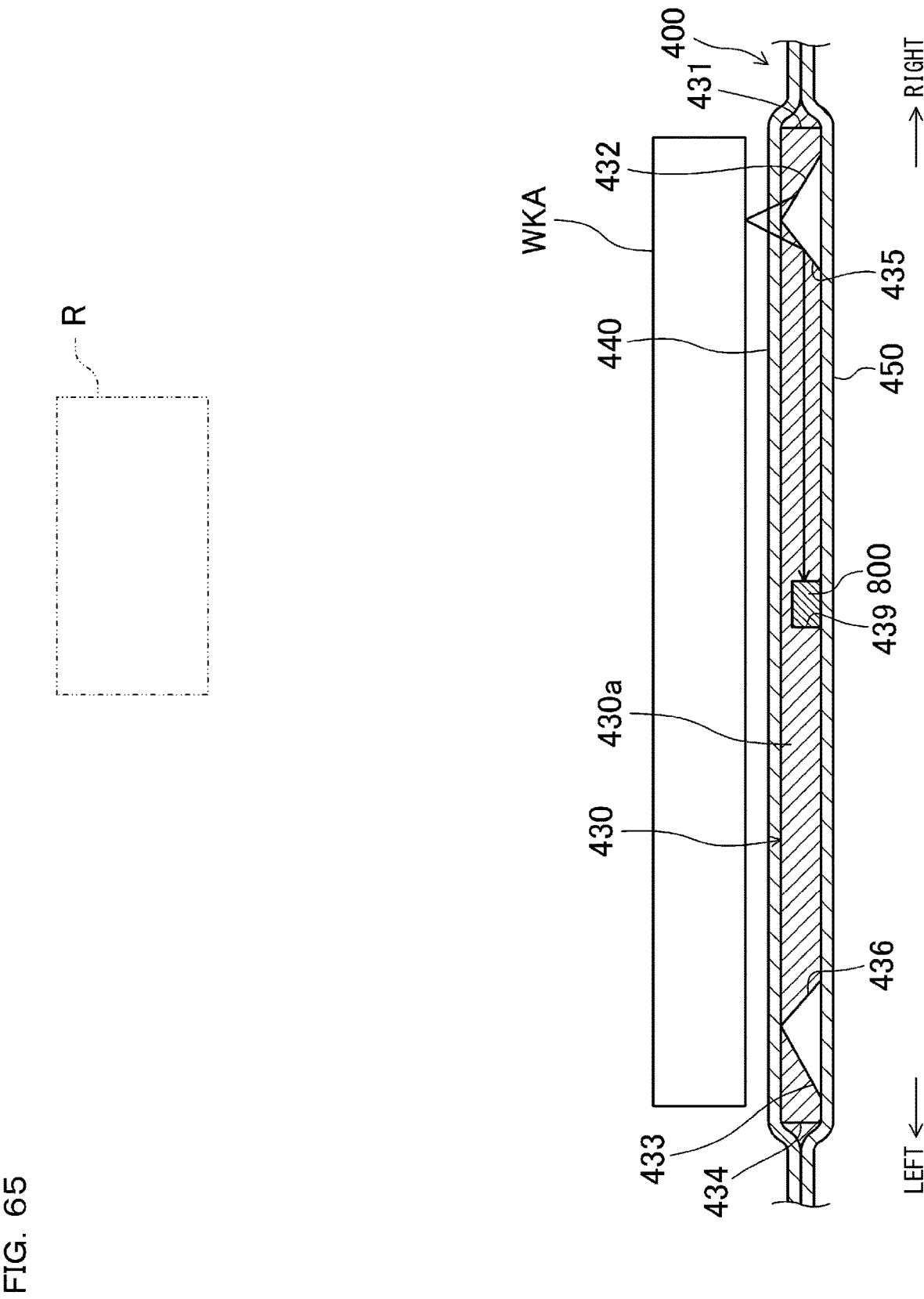
FIG. 65 is a view corresponding to FIG. 10 illustrating an example in which a fourth stray light countermeasure is applied.

FIG. 65 illustrates an example in which a fourth stray light countermeasure is applied. In the fourth stray light countermeasure, a stray light suppressing member 800 is provided to prevent the light reflected from the workpiece WKA from reaching the light incident mirror surface 433. The stray light suppressing member 800 can be provided between the light emitting mirror surface 432 and the light incident mirror surface 433 of the light extraction member 430. That is, an accommodating groove 439 in which the stray light suppressing member 800 is accommodated is formed between the light emitting mirror surface 432 and the light incident mirror surface 433 of the light extraction member 430. The accommodating groove 439 may be open on the upper side of the light extraction member 430 or may be open on the lower side. The accommodating groove 439 is preferably deep.

The stray light suppressing member 800 is, for example, a member that absorbs light, a light-shielding member, or the like, and can be made of, for example, the same material as the materials of the cover members 440 and 450. The stray light suppressing member 800 is a member capable of removing stray light, and thus, may be referred to as a stray light removing member. These stray light suppressing members can be used as a kind of stray light suppressing unit. In addition, the stray light removing member can be used as a kind of stray light suppressing unit.

In the example illustrated in FIG. 65, the light reflected from the workpiece WKA located in an area closer than the detection area R is incident on the surface 435 and travels in the core 430a of the light extraction member 430 toward the light reception side. The light traveling in the core 430a toward the light reception side is incident on the stray light suppressing member 800 and absorbed or shielded by the stray light suppressing member 800, and thus, there is no component that travels toward the light incident mirror surface 433. It is unnecessary to absorb the entire light incident on the stray light suppressing member 800. In such a case, weak light is incident on the light incident mirror surface 433, but the light is weaker than the determination threshold of the optical sensor 1, so that the erroneous determination can be suppressed.

In this manner, in the examples where the first to fourth stray light countermeasures are applied, the stray light is weakened by repeating reflection by the upper cover member 440 and the lower cover member 450 of the light extraction member 430, and the countermeasures against the stray light are applied.

Figure 66:
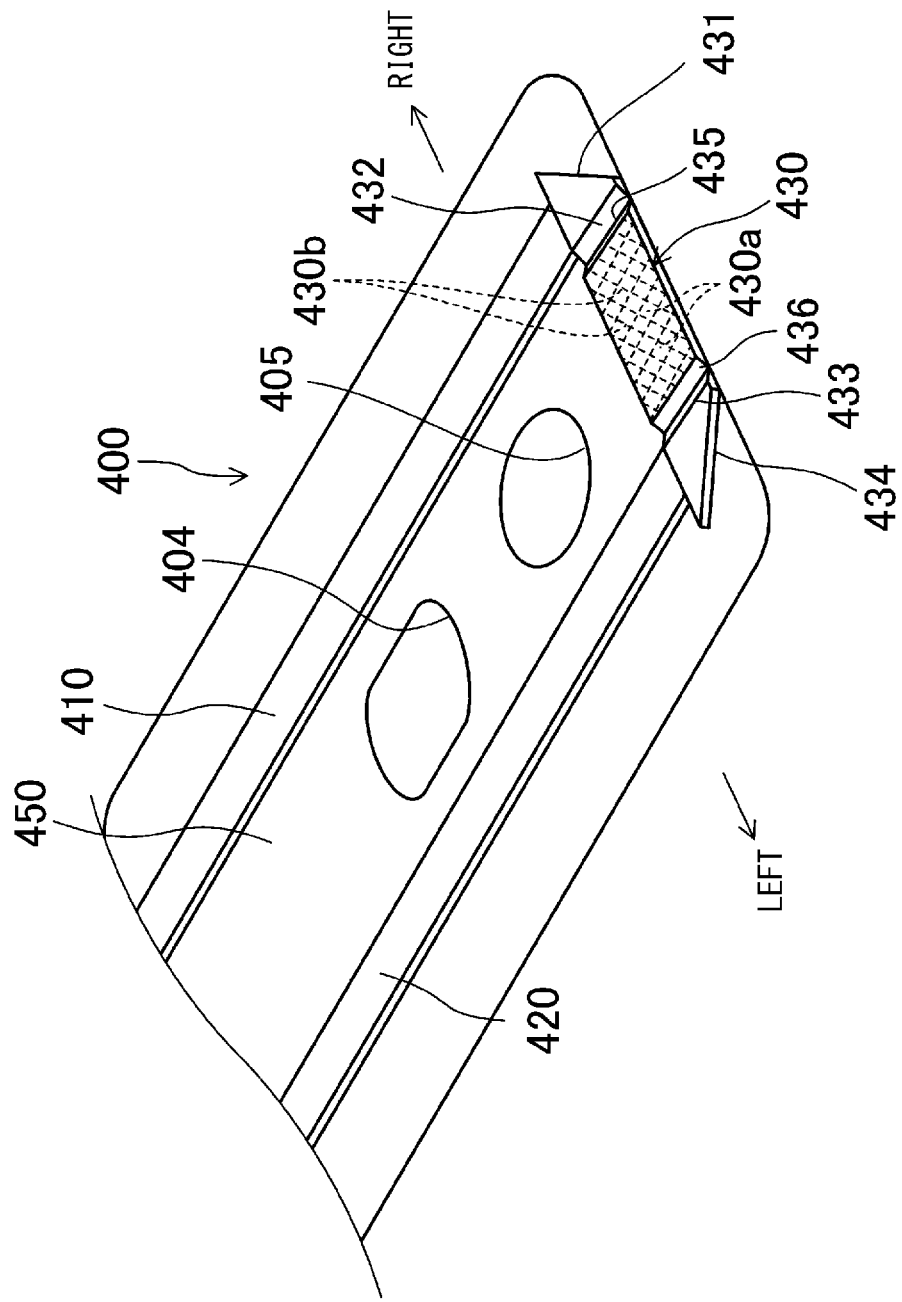
FIG. 66 is a view corresponding to FIG. 10 illustrating an example in which a fifth stray light countermeasure is applied.

FIG. 66 illustrates an example in which a fifth stray light countermeasure is applied. In the fifth stray light countermeasure, the core 430a is formed on the light extraction member 430 so as to draw a stray light suppressing pattern or a stray light removing pattern. That is, the plurality of cores 430a are formed in the light extraction member 430, and a cladding 430b is provided between the adjacent cores 430a and 430a. Each of the cores 430a extends diagonally toward the distal end of the light detection unit 400. As a result, when the light reflected from the workpiece in the area closer than the detection area is incident on the surface 435 and reaches the core 430a of the light extraction member 430, the light travels toward the distal end of the light detection unit 400 through the core 430a and is emitted to the outside. In this case, a cover member that covers the distal end of the light extraction member 430 may be provided. The cover member can be configured using a member which is opaque like, for example, the upper cover member 440. The stray light removing pattern is an example in which the stray light removing unit is provided on the light extraction member 430. In addition, the stray light suppression pattern is an example in which the stray light suppressing unit is provided on the light extraction member 430.

In this manner, in the example in which the fifth stray light countermeasure is applied, the stray light generated in the light extraction member 430 is released to the distal side or the proximal side to apply the stray light countermeasure.

(Functions and Effects of Embodiment)

According to the present embodiment, the optical waveguides 410 and 420 form the sheet shape that is wide in the horizontal direction, and have the cores 411 and 421 and the claddings 412 and 422 provided in layers in the vertical direction so that it is possible to ensure the amount of light of the optical waveguides 410 and 420 while making the optical waveguides 410 and 420 thin. The claddings 412 and 422 of the optical waveguides 410 and 420 are covered by the sheet-shaped cover members 440 and 450, and the cover members 440 and 450 form the installation surface for the attachment target, and thus, the thin optical waveguides 410 and 420 can be easily mounted on the attachment target.

In addition, the optical waveguides 410 and 420 can be connected to the optical sensor 1 by the connector section 500. Since the connector section 500 is detachably attached to the optical sensor 1, it becomes easy to connect the light detection unit 400 to the optical sensor 1 and replace the light detection unit 400 as needed.

In addition, the light detection unit 400 is easy to handle as a unit since the light projection and reception sides are integrated by the cover member, the connector section, the relay connector section, and the like.

The above-mentioned embodiment is merely an example in all respects, and should not be construed in a limited manner. Further, all modifications and changes belonging to the equivalent range of the claims are included within the scope of the aspect.

As described above, the aspect can be used, for example, in the case of detecting the presence or absence of the article.

What is claimed is:

1. A light detection unit connected to an optical sensor, which includes:
    a light emitting element that projects detection light toward a detection area;
    a light receiving element that receives the detection light from the detection area; and
    a signal generation unit that compares a light reception signal generated by the light receiving element with a threshold and generates a detection signal indicating a comparison result,
    the light detection unit comprising:
    an optical waveguide that guides light between a first end and a second end, has a sheet shape that has a width in a horizontal direction, which is longer than a thickness in a vertical direction, has a core and a cladding surrounding the core, and projects light to the detection area or receives light from the detection area, the core and the cladding being provided in layers in a vertical direction, the first end connected to a light projection connecting section or a light reception connecting section so as to be optically coupled to the light emitting element or the light receiving element of the optical sensor, the second end being used as a light projecting end or a light receiving end; and a cover member that is sheet-shaped and covers the cladding at or adjacent to the second end of the optical waveguide or between the first end and the second end and is integrally formed with the optical waveguide, wherein the optical waveguide includes:
- a light projection optical waveguide which is connected to the light projection connecting section of the optical sensor and projects light to the detection area with the second end as the light projecting end; and
- a light reception optical waveguide which is connected to the light reception connecting section of the optical sensor and receives light from the detection area with the second end as the light receiving end, and the cover member is integrally formed with the light projection optical waveguide and the light reception optical waveguide.

2. The light detection unit according to claim 1, wherein the cover member has a light-shielding property that shields light emitted from the light emitting element and shields the optical waveguide at a portion other than the light projecting end or the light receiving end at or adjacent to the second end of the optical waveguide.

3. The light detection unit according to claim 1, wherein the cover member covers both main surfaces of the optical waveguide and both side surfaces of the optical waveguide.

4. The light detection unit according to claim 3, wherein the cover member covers both main surfaces and both side surfaces of an intermediate portion of the optical waveguide between the first end and the second end of the optical waveguide.

5. The light detection unit according to claim 1, wherein the cover member has an adhesive layer.

6. The light detection unit according to claim 1, wherein the cover member integrates the light projection optical waveguide and the light reception optical waveguide in a state of being separated from each other in a width direction.

7. The light detection unit according to claim 6, wherein an insertion hole through which a fixing member used when installing an attachment target is inserted is formed in a portion of the cover member corresponding to a portion between the light projection optical waveguide and the light reception optical waveguide.

8. The light detection unit according to claim 1, further comprising a light extraction member that is provided to extend from the second end of the light projection optical waveguide to the second end of the light reception optical waveguide, and includes: a light emitting section that is optically coupled to the second end of the light projection optical waveguide and emits light from a main surface side of the light projection optical waveguide to the detection area; and a light incident section that is optically coupled to the second end of the light reception optical waveguide and receives light from a main surface side of the light reception optical waveguide.

9. The light detection unit according to claim 8, wherein the optical waveguide has a plurality of the cores arrayed in the horizontal direction, and the light extraction member has a single core that is optically coupled to the plurality of cores.

10. The light detection unit according to claim 1, wherein the cover member includes a through-hole fixed to an attachment target.

11. The light detection unit according to claim 1, wherein the cover member has a laminated structure having a first cover member that covers the cladding and a second cover member that covers the first cover member, the first cover member covers a main surface of the cladding, and the second cover member covers a main surface of the first cover member and both the side surfaces of the optical waveguide.

12. The light detection unit according to claim 1, further comprising a reinforcing plate which has a higher rigidity than the optical waveguide and is provided on a main surface of the optical waveguide at or adjacent to the second end of the optical waveguide.

13. The light detection unit according to claim 12, wherein the reinforcing plate has a through-hole, and the through-hole of the reinforcing plate communicates with a through-hole of the sheet-shaped cover member.

14. The light detection unit according to claim 1, further comprising a reinforcing plate which has a higher rigidity than the optical waveguide and is provided on a main surface of the sheet-shaped cover member, wherein the sheet-shaped cover member is provided on the main surface at or adjacent to the second end of the optical waveguide.

15. The light detection unit according to claim 1, wherein the sheet-shaped cover member is black in appearance, and the light detection unit having the optical waveguide covered by the sheet-shaped cover member has a sheet shape.

16. The light detection unit according to claim 1, wherein an end that projects light to the detection area from the optical waveguide or receives light from the detection area is any of a main surface, a side surface adjacent to the second end, or a horizontal side surface of the optical waveguide.

17. The light detection unit according to claim 1, wherein a connecting portion of the light detection unit with respect to the light projection connecting section or the light reception connecting section of the optical sensor is an optical fiber optically coupled to the optical waveguide.

18. The light detection unit according to claim 1, wherein the light detection unit is limited or convergent reflection detection unit.

19. The light detection unit according to claim 1, further comprising an indicating lamp that extracts light passing through the core of the optical waveguide to an outside, and is provided on the optical waveguide on a light projection side or a light reception side between the first end and the second end of the optical waveguide.

* * * * *